United States Patent
Babaei et al.

(10) Patent No.: US 12,081,328 B2
(45) Date of Patent: *Sep. 3, 2024

(54) OFFSET PARAMETERS FOR UPLINK CONTROL INFORMATION

(71) Applicant: BEIJING XIAOMI MOBILE SOFTWARE CO., LTD., Beijing (CN)

(72) Inventors: Alireza Babaei, Fairfax, VA (US); Esmael Dinan, McLean, VA (US); Hyoungsuk Jeon, Centreville, VA (US); Kyungmin Park, Vienna, VA (US); Hua Zhou, Herndon, VA (US)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 32 days.

This patent is subject to a terminal disclaimer.

(21) Appl. No.: 17/128,314

(22) Filed: Dec. 21, 2020

(65) Prior Publication Data

US 2021/0111831 A1 Apr. 15, 2021

Related U.S. Application Data

(63) Continuation of application No. 16/101,347, filed on Aug. 10, 2018, now Pat. No. 10,873,415.
(Continued)

(51) Int. Cl.
*H04W 72/20* (2023.01)
*H04L 1/00* (2006.01)
(Continued)

(52) U.S. Cl.
CPC .......... *H04L 1/0013* (2013.01); *H04L 1/1664* (2013.01); *H04L 1/1812* (2013.01);
(Continued)

(58) Field of Classification Search
CPC ... H04L 1/0013; H04L 1/1664; H04L 1/1812; H04L 1/1851; H04L 1/1883; H04L 5/001;
(Continued)

(56) References Cited

U.S. PATENT DOCUMENTS

| | | | |
|---|---|---|---|
| 9,674,790 B2* | 6/2017 | Lee | H04W 72/21 |
| 10,638,462 B2* | 4/2020 | Park | H04W 72/21 |

(Continued)

OTHER PUBLICATIONS

3GPP TS 36.300 V14.3.0 (Jun. 2017); Technical Specification; 3rd Generation Partnership Project; Technical Specification Group Radio Access Network; Evolved Universal Terrestrial Radio Access (E-UTRA) and Evolved Universal Terrestrial Radio Access Network; (E-UTRAN); Overall description; Stage 2 (Release 14).

(Continued)

*Primary Examiner* — Chirag G Shah
*Assistant Examiner* — Joshua Smith
(74) *Attorney, Agent, or Firm* — Arch & Lake LLP

(57) ABSTRACT

A wireless device receives radio resource control message(s) indicating: first uplink resources, of an uplink data channel, for a periodic resource allocation; a first offset parameter for uplink control information (UCI) transmission via the periodic resource allocation; and a plurality of second offset parameters for UCI transmission via a dynamic grant. A first UCI is transmitted via a number of the first uplink resources. The number of the first uplink resources is determined based on the first offset parameter. A downlink control information is received. The downlink control information comprises: an uplink grant indicating second uplink resources of the uplink data channel; and an offset indicator value indicating one of the plurality of second offset parameters. A second UCI is transmitted via a number of the second uplink resources. The number of the second uplink resources is determined based on the offset indicator value.

20 Claims, 46 Drawing Sheets

Related U.S. Application Data

(60) Provisional application No. 62/543,859, filed on Aug. 10, 2017, provisional application No. 62/543,855, filed on Aug. 10, 2017.

(51) Int. Cl.
    *H04L 1/1607*     (2023.01)
    *H04L 1/1812*     (2023.01)
    *H04W 72/0446*     (2023.01)
    *H04W 72/0453*     (2023.01)
    *H04W 72/23*     (2023.01)
    *H04W 76/27*     (2018.01)
    *H04L 1/1829*     (2023.01)
    *H04L 1/1867*     (2023.01)
    *H04L 5/00*     (2006.01)
    *H04W 80/02*     (2009.01)
    *H04W 80/08*     (2009.01)

(52) U.S. Cl.
    CPC ... *H04W 72/0446* (2013.01); *H04W 72/0453* (2013.01); *H04W 72/20* (2023.01); *H04W 72/23* (2023.01); *H04W 76/27* (2018.02); *H04L 1/1851* (2013.01); *H04L 1/1883* (2013.01); *H04L 5/001* (2013.01); *H04W 80/02* (2013.01); *H04W 80/08* (2013.01)

(58) Field of Classification Search
    CPC ......... H04W 72/0406; H04W 72/0446; H04W 72/0453; H04W 72/14; H04W 76/27; H04W 80/02; H04W 80/08
    See application file for complete search history.

(56) References Cited

U.S. PATENT DOCUMENTS

| | | | |
|---|---|---|---|
| 10,873,415 B2* | 12/2020 | Babaei | H04L 1/1812 |
| 2008/0009285 A1 | 1/2008 | Cho | |
| 2009/0103561 A1* | 4/2009 | Qi | H04L 1/1812 |
| | | | 370/468 |
| 2009/0232101 A1 | 9/2009 | Papasakellarios | |
| 2010/0271970 A1 | 10/2010 | Pan | |
| 2011/0243066 A1 | 10/2011 | Nazar | |
| 2012/0057547 A1 | 3/2012 | Löhr | |
| 2012/0113962 A1 | 5/2012 | Jen | |
| 2013/0010611 A1 | 1/2013 | Wiemann et al. | |
| 2013/0083766 A1 | 4/2013 | Chung et al. | |
| 2013/0100917 A1 | 4/2013 | Seo et al. | |
| 2014/0029459 A1 | 1/2014 | Kwon et al. | |
| 2014/0161108 A1 | 6/2014 | Lohr | |
| 2014/0286255 A1* | 9/2014 | Nam | H04L 1/1861 |
| | | | 370/329 |
| 2015/0117342 A1 | 4/2015 | Loehr et al. | |
| 2015/0189630 A1 | 7/2015 | Aiba | |
| 2015/0215875 A1 | 7/2015 | Nakashima | |
| 2015/0312071 A1* | 10/2015 | Chen | H04L 1/0003 |
| | | | 370/329 |
| 2016/0013902 A1 | 1/2016 | Cui et al. | |
| 2016/0037552 A1 | 2/2016 | Svedman et al. | |
| 2016/0057805 A1 | 2/2016 | Eriksson et al. | |
| 2016/0198408 A1 | 7/2016 | Jhang et al. | |
| 2016/0234830 A1 | 8/2016 | Kim | |
| 2017/0013612 A1 | 1/2017 | Nazar | |
| 2017/0126367 A1 | 5/2017 | Gao et al. | |
| 2017/0127392 A1 | 5/2017 | Aiba | |
| 2017/0202054 A1 | 7/2017 | Rathonyi et al. | |
| 2017/0223480 A1 | 8/2017 | Han et al. | |
| 2017/0245262 A1 | 8/2017 | Nazar | |
| 2017/0257849 A1 | 9/2017 | Oketani | |
| 2017/0257851 A1* | 9/2017 | Ye | H04W 72/23 |
| 2017/0339682 A1 | 11/2017 | Lee et al. | |
| 2017/0347353 A1* | 11/2017 | Yerramalli | H04W 72/21 |
| 2018/0006787 A1* | 1/2018 | Chen | H04W 72/20 |
| 2018/0048430 A1 | 2/2018 | Wu et al. | |
| 2018/0049166 A1 | 2/2018 | Sun et al. | |
| 2018/0063835 A1 | 3/2018 | Abedini et al. | |
| 2018/0070369 A1 | 3/2018 | Papasakellariou | |
| 2018/0102915 A1 | 4/2018 | Rico Alvarino | |
| 2018/0110085 A1 | 4/2018 | Tseng et al. | |
| 2018/0131493 A1 | 5/2018 | Luo | |
| 2018/0132230 A1 | 5/2018 | Han et al. | |
| 2018/0145798 A1 | 5/2018 | Suzuki et al. | |
| 2018/0167931 A1 | 6/2018 | Papasakellariou et al. | |
| 2018/0192469 A1 | 7/2018 | Rathonyi et al. | |
| 2018/0205525 A1 | 7/2018 | He et al. | |
| 2018/0206225 A1 | 7/2018 | Li et al. | |
| 2018/0220419 A1 | 8/2018 | Takeda et al. | |
| 2018/0241518 A1* | 8/2018 | Takeda | H04W 72/048 |
| 2018/0255550 A1 | 9/2018 | Takeda et al. | |
| 2018/0262311 A1 | 9/2018 | Wang | |
| 2018/0279344 A1 | 9/2018 | Bagheri | |
| 2018/0302896 A1 | 10/2018 | Nazar | |
| 2018/0324768 A1 | 11/2018 | Shaheen et al. | |
| 2018/0343673 A1 | 11/2018 | Chen et al. | |
| 2018/0359064 A1 | 12/2018 | Kim et al. | |
| 2018/0359766 A1 | 12/2018 | Shih | |
| 2018/0368117 A1 | 12/2018 | Ying et al. | |
| 2018/0368133 A1 | 12/2018 | Park et al. | |
| 2018/0375623 A1 | 12/2018 | Suzuki et al. | |
| 2019/0007181 A1 | 1/2019 | Marinier | |
| 2019/0007248 A1 | 1/2019 | Takeda | |
| 2019/0007942 A1 | 1/2019 | Takeda et al. | |
| 2019/0014548 A1 | 1/2019 | Pelletier et al. | |
| 2019/0028162 A1* | 1/2019 | Lee | H04W 72/21 |
| 2019/0037586 A1 | 1/2019 | Park et al. | |
| 2019/0037637 A1 | 1/2019 | Suzuki et al. | |
| 2019/0098644 A1 | 3/2019 | Loehr et al. | |
| 2019/0116489 A1* | 4/2019 | Harada | H04W 72/0453 |
| 2019/0116592 A1 | 4/2019 | Moon et al. | |
| 2019/0116611 A1 | 4/2019 | Lee et al. | |
| 2019/0149272 A1 | 5/2019 | Gao et al. | |
| 2019/0150176 A1 | 5/2019 | Pelletier et al. | |
| 2019/0159191 A1 | 5/2019 | Kim et al. | |
| 2019/0174513 A1 | 6/2019 | Loehr et al. | |
| 2019/0208538 A1 | 7/2019 | Lee et al. | |
| 2019/0223201 A1 | 7/2019 | Lee et al. | |
| 2019/0238276 A1 | 8/2019 | Wu et al. | |
| 2019/0238277 A1 | 8/2019 | Wu et al. | |
| 2019/0274143 A1 | 9/2019 | Loehr et al. | |
| 2019/0281622 A1 | 9/2019 | Hwang et al. | |
| 2019/0319698 A1 | 10/2019 | Sridharan et al. | |
| 2019/0326934 A1 | 10/2019 | Kim et al. | |
| 2019/0334677 A1 | 10/2019 | Hwang et al. | |
| 2019/0349918 A1 | 11/2019 | Nazar et al. | |
| 2019/0356446 A1 | 11/2019 | Kim | |
| 2019/0357178 A1 | 11/2019 | Bae et al. | |
| 2019/0363832 A1 | 11/2019 | Yang et al. | |
| 2019/0387383 A1 | 12/2019 | Ye | |
| 2020/0008191 A1 | 1/2020 | Wang et al. | |
| 2020/0015256 A1 | 1/2020 | Lee et al. | |
| 2020/0022175 A1 | 1/2020 | Xiong et al. | |
| 2020/0036501 A1 | 1/2020 | Gao et al. | |
| 2020/0037314 A1 | 1/2020 | Xiong et al. | |
| 2020/0059345 A1 | 2/2020 | Pelletier et al. | |
| 2020/0077386 A1 | 3/2020 | Papasakellariou et al. | |
| 2020/0092874 A1 | 3/2020 | Kim et al. | |
| 2020/0092899 A1 | 3/2020 | Ryu et al. | |
| 2020/0107317 A1 | 4/2020 | Ryu et al. | |
| 2020/0112397 A1 | 4/2020 | Park et al. | |
| 2020/0136750 A1 | 4/2020 | Baldemair | |
| 2020/0163115 A1 | 5/2020 | Wang et al. | |
| 2020/0169994 A1 | 5/2020 | Papasakellariou et al. | |
| 2020/0196302 A1 | 6/2020 | Takeda | |
| 2020/0196343 A1 | 6/2020 | Marinier et al. | |
| 2020/0213055 A1 | 7/2020 | Kim et al. | |
| 2020/0267753 A1 | 8/2020 | Adjakple et al. | |
| 2020/0296707 A1 | 9/2020 | Kim et al. | |
| 2020/0336249 A1 | 10/2020 | Yi et al. | |
| 2020/0367246 A1 | 11/2020 | Loehr et al. | |
| 2021/0014035 A1 | 1/2021 | Kuang et al. | |
| 2021/0037543 A1 | 2/2021 | Shih | |
| 2021/0092757 A1 | 3/2021 | Park et al. | |
| 2021/0144793 A1 | 5/2021 | Kim et al. | |

(56) References Cited

U.S. PATENT DOCUMENTS

| | | |
|---|---|---|
| 2021/0185682 A1 | 6/2021 | Lee et al. |
| 2021/0212067 A1 | 7/2021 | Hwang et al. |
| 2021/0212094 A1 | 7/2021 | Bagheri et al. |
| 2021/0219328 A1 | 7/2021 | Xiong et al. |
| 2021/0281375 A1 | 9/2021 | Wang et al. |
| 2021/0282169 A1 | 9/2021 | Zhang et al. |
| 2021/0288705 A1 | 9/2021 | Lee et al. |
| 2022/0173879 A1 | 6/2022 | Pelletier et al. |
| 2022/0353896 A1 | 11/2022 | Jung et al. |
| 2023/0015488 A1 | 1/2023 | Xiong et al. |

OTHER PUBLICATIONS

3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).

R1- 1710089; 3GPP TSG RAN WG1 NR Ad-Hoc#2; Qingdao, P.R. China Jun. 27-30, 2017; Source: CATT; Title: Multiplexing of UCI and UL data on PUSCH; Agenda Item: 5.1.3.2.5.1 Document for: Discussion.

R1- 1710090; 3GPP TSG RAN WG1 NR Ad-Hoc#2; Qingdao, P.R. China Jun. 27-30, 2017; Source: CATT; Title: Simultaneous PUCCH-PUSCH transmission in NR; Agenda Item: 5.1.3.2.5.2; Document for: Discussion.

R1- 1710119; 3GPP TSG RAN WG1 NR Ad-Hoc#2; Qingdao, P.R. China Jun. 27-30, 2017; Source: ZTE; Title: Multiplexing of PUSCH and short PUCCH; Agenda Item: 5.1.3.2.5.2; Document for:Discussion and Decision.

R1-1709963; 3GPP TSG RAN WG1 NR Ad-Hoc Meeting; Qingdao, China, Jun. 27-30, 2017; Agenda Item: 5.1.3.2.5.1; Source: Huawei, HiSilicon; Title: UCI piggyback on PUSCH; Document for: Discussion and decision.

R1-1709975; 3GPP TSG RAN WG1 NR Ad-Hoc Meeting; Qingdao, China, Jun. 27-30, 2017; Agenda Item: 5.1.3.4.1.1; Source: Huawei, HiSilicon; Title: On NR carrier aggregation; Document for: Discussion and decision.

R1-1709989; 3GPP TSG RAN WG1 NR Ad Hoc Meeting; Qingdao, China, Jun. 27-30, 2017; Agenda Item:5.1.3.2.5; Source: Huawei, HiSilicon Title: Discussion on UCI feedback for URLLC; Document for: Discussion and decision.

R1-1710102; 3GPP TSG RAN WG1 NR Ad Hoc##2; Qingdao, China Jun. 27-30, 2017; Agenda item: 5.1.3.4.1.1; Source: CATT; Title: Scheduling and HARQ support for NR CADocument for: Discussion and Decision.

R1-1710118; 3GPP TSG RAN WG1 NR Ad-Hoc#2; Qingdao, P.R. China Jun. 27-30, 2017; Title: UCI multiplexing on PUSCH; Source: ZTE; Agenda Item: 5.1.3.2.5.1; Document for: Discussion and Decision.

R1-1710162; 3GPP TSG RAN WG1 NR Ad-Hoc#2; Qingdao, P.R. China Jun. 27-30, 2017; Source: Guangdong OPPO Mobile Telecom; Title: On UCI and data multiplexing in PUSCH; Agenda Item:5.1.3.2.5.1; Document for: Discussion and Decision.

R1-1710163; 3GPP TSG RAN WG1 NR Ad-Hoc#2; Qingdao, P.R. China Jun. 27-30, 2017; Source: Guangdong OPPO Mobile Telecom; Title: Multiplexing of short PUCCH and long PUCCHAgenda Item: 5.1.3.2.4.2; Document for: Discussion and Decision.

R1-1710171; 3GPP TSG RAN WG1 NR Ad-Hoc#2; Qingdao, P.R. China Jun. 27-30, 2017; Source: Guangdong OPPO Mobile Telecom; Title: Bandwidth part based resource scheduling for carrier aggregation; Agenda Item: 5.1.3.4.1.1; Document for: Discussion and Decision.

R1-1710320; 3GPP TSG RAN WG1 NR Ad-Hoc#2; Qingdao, P.R. China Jun. 27-30, 2017; Agenda Item: 5.1.3.2.5.1; Source: LG Electronics; Title: Support of UCI piggyback on PUSCH for NRDocument for: Discussion and decision.

R1-1710321; 3GPP TSG RAN WG1 NR Ad-Hoc#2; Qingdao, P.R. China Jun. 27-30, 2017; Agenda Item: 6.1.3.2.5.2; Source: LG Electronics; Title: Support of uplink channel multiplexing for NRDocument for: Discussion and decision.

R1-1710339; 3GPP TSG RAN WG1 NR Ad-Hoc#2; Qingdao, P.R. China Jun. 27-30, 2017; Agenda Item: 5.1.3.4.1.1; Source: LG Electronics; Title: Support of cross-CC DCI/UCI transmission for NR CADocument for: Discussion and decision.

R1-1710464; 3GPP TSG RAN WG1 NR Ad-Hoc Meeting; Qingdao, China, Jun. 27-30, 2017; Agenda Item: 5.1.3.2.5.2; Source: Huawei, HiSilicon; Title: Multiplexing of PUCCH and PUSCH; Document for:Discussion and decision.

R1-1710558; 3GPP TSG RAN WG1 NR Ad-Hoc#2; Qingdao, P.R. China Jun. 27-30, 2017; Source: Intel Corporation; Title: UCI multiplexing onto PUSCH; Agenda item: 5.1.3.2.5.1; Document for:Discussion and Decision.

R1-1710559; 3GPP TSG RAN WG1 NR Ad-Hoc#2; Qingdao, China, Jun. 27-30, 2017; Source: Intel Corporation; Title: PUCCH-PUSCH multiplexing; Agenda item: 5.1.3.2.5.2; Document for: Discussion and Decision.

R1-1710578; 3GPP TSG-RAN WG1 NR Ad-Hoc #2; Qingdao, P.R. China, Jun. 27-30, 2017; Source: Intel Corporation; Title: Scheduling and UCI feedback for carrier aggregation; Agenda item:5.1.3.4.1.1; Document for: Discussion and Decision.

R1-1710710; 3GPP TSG RAN WG1 NR ad-Hoc#2; Qingdao, China, Jun. 27-30, 2017; Agenda item: 5.1.3.2.5.1; Source: Samsung; Title: On UCI Multiplexing in PUSCH; Document for: Discussion and Decision.

R1-1710711; 3GPP TSG RAN WG1 NR ad-Hoc#2; Qingdao, China, Jun. 27-30, 2017; Agenda item: 5.1.3.2.5.2; Source: Samsung; Title: On Simultaneous PUSCH and PUCCH Transmissions Document for: Discussion and Decision.

R1-1710739; 3GPP TSG RAN WG1 NR ad-Hoc#2; Qingdao, China, Jun. 27-30, 2017; Agenda item: 5.1.3.4.1.1; Source: Samsung; Title: Cross-Carrier Scheduling and HARQ-ACK FeedbackDocument for: Discussion and Decision.

R1-1710820; 3GPP TSG RAN WG1 NR Ad-Hoc#2; Qingdao, P.R. China Jun. 27-30, 2017; Agenda Item: 5.1.3.2.5.1; Source: MediaTek Inc.; Title: Discussion on UCI on PUSCHDocument for: Discussion.

R1-1710821; 3GPP TSG RAN WG1 NR Ad-Hoc#2; Qingdao, P.R. China Jun. 27-30, 2017; Agenda Item: 5.1.3.2.5.2; Source: MediaTek Inc.; Title: Discussion on multiplexing of PUCCH and PUSCHDocument for: Discussion.

R1-1710885; 3GPP TSG RAN WG1 NR#2; Qingdao, China, Jun. 27-30, 2017; Agenda item: 5.1.3.4.1.1; Source: Nokia, Alcatel-Lucent Shanghai Bell; Title: On cross-carrier scheduling and joint UCI designDocument for: Discussion and Decision.

R1-1710899; 3GPP TSG RAN WG1 NR Ad-Hoc #2; Qingdao, P.R. China, Jun. 27-30, 2017; Agenda item: 5.1.3.2.5.1; Source: Nokia, Alcatel-Lucent Shanghai Bell; Title: UCI multiplexing on PUSCHDocument for: Discussion and Decision.

R1-1710900; 3GPP TSG RAN WG1 NR Ad-Hoc #2; Qingdao, P.R. China, Jun. 27-29, 2017; Agenda item: 5.1.3.2.5.2; Source: Nokia, Alcatel-Lucent Shanghai Bell; Title:On the multiplexing between PUCCHs and PUSCH; Document for: Discussion and Decision.

R1-1710939; 3GPP TSG RAN WG1 NR Ad-Hoc#2; Qingdao, P.R. China, Jun. 27-30, 2017; Source: Panasonic; Title: Discussion on UCI on PUSCH; Agenda Item: 5.1.3.2.5.1; Document for: Discussion.

R1-1710940; 3GPP TSG RAN WG1 NR Ad-Hoc#2; Qingdao, P.R. China, Jun. 27-30, 2017; Source: Panasonic; Title: Discussion on UCI and data multiplexing; Agenda Item: 5.1.3.2.5.2Document for: Discussion.

R1-1710952; 3GPP TSG RAN WG1 NR Ad-Hoc##2; Qingdao, P.R. China Jun. 27-30, 2017; Agenda Item: 5.1.3.2.5.1; Source: InterDigital Inc.; Title: Considerations on UCI transmission on PUSCHDocument for: Discussion and Decision.

R1-1710964; 3GPP TSG RAN WG1 NR Ad-Hoc Meeting #02; Qingdao, China, Jun. 27-30, 2017; Agenda Item: 5.1.6.1; Source: NEC; Title: On UE-to-UE measurement for CLI managementDocument for: Discussion/Decision.

(56) References Cited

OTHER PUBLICATIONS

R1-1711104; 3GPP TSG RAN WG1 NR Ad-Hoc#2; Qingdao, P.R. China Jun. 27-30, 2017; Source: NTT Docomo, Inc.; Title: UCI on PUSCH; Agenda Item: 5.1.3.2.5.1; Document for: Discussion and Decision.
R1-1711105; 3GPP TSG RAN WG1 NR Ad-Hoc#2; Qingdao, P.R. China Jun. 27-30, 2017; Source: NTT Docomo, Inc.; Title: Multiplexing of PUCCH and PUSCH; Agenda Item: 5.1.3.2.5.2Document for: Discussion and Decision.
R1-1711122; 3GPP TSG RAN WG1 NR Ad-Hoc#2; Qingdao, P.R. China Jun. 27-30, 2017; Source: NTT Docomo, Inc.; Title: NR carrier aggregation; Agenda Item: 5.1.3.4.1.1; Document for: Discussion and Decision.
R1-1711195; TSG-RAN WG1 NR AH Meeting#2; Qingdao, China, Jun. 27-30, 2017; Agenda item: 5.1.3.2.5.1; Source: Qualcomm Incorporated; Title: UCI piggyback on PUSCH; Document for:Discussion/Decision.
R1-1711196; 3GPP TSG RAN WG1 NR Ad-Hoc#2; Jun. 27-30, 2017; Qingdao, China; Agenda item: 5.1.3.2.5.2; Source: Qualcomm Incorporated; Title: Multiplexing of PUCCH and PUSCHDocument for: Discussion/Decision.
R1-1711209; 3GPP TSG RAN WG1 NR Ad-Hoc#2; Jun. 27-30, 2017; Qingdao, P.R. China; Agenda Item:5.1.3.4.1.1; Source: Qualcomm Incorporated; Title: CA with mixed numerologyDocument for: Discussion/Decision.
R1-1711244; 3GPP TSG RAN WG1 NR Ad-Hoc#2; Qingdao, P.R. China Jun. 27-30, 2017; Source: Sharp; Title: PUCCH and PUSCH multiplexing methods; Agenda Item: 5.1.3.2.5.2; Document for Discussion and Decision.
R1-1711359; 3GPP TSG RAN WG1 NR Ad-Hoc#2; Qingdao, P.R. China Jun. 27-30, 2017; Source: WILUS Inc.; Title: Discussion on UCI piggyback on PUSCH; Agenda item: 5.1.3.2.5.1; Document for: Discussion/Decision.
R1-1711360; 3GPP TSG RAN WG1 NR Ad-Hoc#2; Qingdao, P.R. China Jun. 27-30, 2017; Source: WILUS Inc.; Title: Simultaneous transmission for long-PUCCH and PUSCH; Agenda item: 5.1.3.2.5.2Document for: Discussion/Decision.
R1-1711495; 3GPP TSG-RAN WG1 NR Ad-Hoc#2; Qingdao, China, Jun. 27-30, 2017; Agenda Item: 5.1.3.2.5.1; Source: Ericsson; Title: On UCI on PUSCH; Document for: Discussion, Decision.
R1-1711496; 3GPP TSG-RAN WG1 NR Ad-Hoc#2; Qingdao, China, Jun. 27-30, 2017; Agenda Item: 5.1.3.2.5.2; Source: Ericsson; Title: On Simultaneous Transmission of PUSCH and PUCCHDocument for: Discussion, Decision.
R1-1711517; 3GPP TSG RAN WG1 NR Ad-Hoc#2; Qingdao, P.R. China, Jun. 27-30, 2017; Agenda Item: 5.1.3.4.1.1; Source: Ericsson; Title: On Scheduling and UCI Handling in Carrier Aggregation Document for: Discussion and Decision.
R1-1712008; 3GPP TSG RAN WG1 NR AH#2; Qingdao, P.R. China, Jun. 27-30, 2017; Title: LS on HARQ operation.
R2- 1704912; 3GPP TSG-RAN WG2 #98; Hangzhou, P.R. China, May 15-19, 2017; Agenda Item: 10.3.1.8; Source: InterDigital Inc.; Title: HARQ Processing for NR; Document for: Discussion, Decision.
R2-1704337; 3GPP TSG-RAN WG2 Meeting 98; Hangzhou, China, May 15-19, 2017; Resubmission of R2-1703168; Source: NTT Docomo, Inc.; Title: Consideration on UL async HARQ for NRDocument for: Discussion and decisions; Agenda Item: 10.3.1.8.
R2-1704479; 3GPP TSG-RAN WG2 Meeting #98; Hangzhou, China, May 15-19, 2017; Agenda item: 10.3.1.8; Source: Samsung; Title: The number of TBs per UL HARQ process; Document for: Discussion and Agreement.
R2-1704505; 3GPP TSG-RAN WG2 NR #98 Meeting; Hangzhou, China, May 15-19, 2017; Agenda item: 10.3.1.8; Source: Samsung; Title: HARQ for numerology multiplexing.
R2-1704577; 3GPP TSG-RAN WG2 Meeting #98; Hangzhou, China, May 15-19, 2017; Source: vivo; Title: HARQ process for UL grant-free transmission; Agenda Item: 10.3.1.8; Document for: Discussion and Decision.

Office Action, mailed Feb. 17, 2021, in European Patent Application No. 18760196.8.
R1-1707893; 3GPP TSG RAN WG1 Meeting #89; Hangzhou, P.R. China May 15-19, 2017; Agenda Item: 6.2.1.2.3.3; Source: Samsung; Title: UCI on sPUSCH; Document for: Discussion and decision.
R1-1708013; 3GPP TSG RAN WG1 #89; Hangzhou, China, May 15-19, 2017; Agenda item: 7.1.3.2.4; Source: Samsung Title: On UCI Multiplexing in PUSCH; Document for: Discussion and Decision.
R1-1708772; 3GPP TSG RAN WG1 #89; May 15-19, 2017; Hangzhou, China; Agenda item: 6.2.1.2.3.2; Source: Qualcomm Incorporated; Title: Shortened PUCCH Resource Management; Document for: Discussion and Decision.
1st Non-Final Office Action of U.S. Appl. No. 16/101,361 dated Jan. 27, 2020, (14p).
2nd Non-Final Office Action of U.S. Appl. No. 16/101,361 dated Aug. 18, 2020, (13p).
1st Final Office Action of U.S. Appl. No. 16/101,361 dated Feb. 8, 2021, (16p).
Advisory Action of U.S. Appl. No. 16/101,361 dated Jul. 8, 2021, (4p).
3rd Non-Final Office Action of U.S. Appl. No. 16/101,361 dated Sep. 15, 2021, (14p).
2nd Final Office Action of U.S. Appl. No. 16/101,361 dated Feb. 9, 2022, (14p).
Non-Final Office Action of U.S. Appl. No. 16/101,359 dated Aug. 22, 2019, (14p).
Final Office Action of U.S. Appl. No. 16/101,359 dated Mar. 3, 2020, (16p).
R2-1705059; 3GPP TSG-RAN WG2 NR#98; Hangzhou, China, May 15-19, 2017; Agenda item: 10.3.1.8; Source: Samsung; Title: HARQ Procedure for URLLC-eMBB MultiplexingDocument for: Discussion and Decision.
R2-1705628; 3GPP TSG-RAN WG2 #98; Hangzhou, China, May 15-19, 2017; Agenda item: 10.3.1.8; Source: Huawei, HiSilicon; Title: HARQ with multiple numerologies; Document for: Discussion and Decision.
R2-1706426; (Update of R2-1704505); 3GPP TSG-RAN WG2 NR Ad-hoc#2 Meeting; Qingdao, China, Jun. 27-29, 2017; Agenda item: 10.3.1.9; Source: Samsung; Title: HARQ for numerology multiplexingDocument for: Discussion and Decision.
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
R2-1706646; 3GPP TSG-RAN WG2 Meeting# NR_AdHoc#2; Qingdao, China, Jun. 27-29, 2017; Source: ZTE; Title: Consideration on the HARQ for SPS; Agenda item: 10.3.1.9; Document for: Discussion and Decision.
R2-1706834; 3GPP TSG-RAN WG2 NR Adhoc; Qingdao, China, Jun. 27-29, 2017; Agenda item: 10.3.1.9 (HARQ); Source: LG Electronics Inc.; Title: Asynchronous HARQ impact on the Msg3.
R2-1707003; 3GPP TSG-RAN WG2 Meeting NR#2; Qingdao, China, Jun. 27-29, 2017; Agenda item: 10.3.1.9; Source: Huawei, HiSilicon; Title: HARQ with multiple numerologies.
R2-1707066; 3GPP TSG-RAN WG2 NR Ad Hoc #2; Qingdao, China, Jun. 27-29, 2017; (revised R2-1704577); Source: vivo; Title: HARQ process for UL grant-free transmissionAgenda Item: 10.3.1.9.
R2-1707099; 3GPP TSG-RAN WG2#NR_AdHoc#2 Meeting; Qingdao, China, Jun. 27-29, 2017; Agenda item: 10.3.1.9; Source: Samsung; Title: HARQ Procedure for URLLC-eMBB Multiplexing.
Tdoc R2-1704407; 3GPP TSG-RAN WG2 #98; Hangzhou, P.R. of China, May 15-19, 2017; Agenda Item: 10.3.1.8; Source: Ericsson; Title: HARQ Feedback Transmission Schemes for NR Document for: Discussion, Decision.
Tdoc R2-1704408; 3GPP TSG-RAN WG2 #98; Hangzhou, P.R. of China, May 15-19, 2017; Agenda Item: 10.3.1.8; Source: Ericsson; Title: Impact from multi-bit HARQ; Document for: Discussion, Decision.

(56) References Cited

OTHER PUBLICATIONS

Tdoc R2-1704409; 3GPP TSG-RAN WG2 #98; Hangzhou, P.R. of China, May 15-19, 2017; Agenda Item: 10.3.1.8; Source: Ericsson; Title: HARQ Processes for Spatial MultiplexingDocument for: Discussion, Decision.
Tdoc R2-1704410; 3GPP TSG-RAN WG2 #98; Hangzhou, P.R. of China, May 15-19, 2017; Agenda Item: 10.3.1.8; Source: Ericsson; Title: HARQ configurations in NR; Document for: Discussion, Decision.
Tdoc R2-1704412; 3GPP TSG-RAN WG2 #98; Hangzhou, P.R. of China, May 15-19, 2017; Agenda Item: 10.3.1.8; Source: Ericsson; Title: DL puncturing HARQ considerations; Document for: Discussion.
Tdoc R2-1704683; update of R2-1702666; 3GPP TSG-RAN WG2 #98; Hangzhou, P.R. of China, May 15-19, 2017; Agenda Item: 10.3.1.8; Source: Ericsson; Title: General HARQ aspects of SPS ULDocument for: Discussion, Decision.
Tdoc R2-1704684; 3GPP TSG-RAN WG2 #98; Hangzhou, P.R. of China, May 15-19, 2017; Agenda Item: 10.3.1.8; Source: Ericsson; Title: Enhanced HARQ feedback mode in SPS; Document for Discussion, Decision.
Tdoc R2-1707113; 3GPP Tsg-Ran WG2 #98 AdHoc Tdoc; Qingdao, China, Jun. 27-29, 2017; Title: [Draft] _S on HARQ RTT and transport layer performance; Release: Rel-15; Work Item:FS_NR_newRAT; Source: Ericsson (to be RAN2).
Tdoc R2-1707128; 3GPP TSG-RAN WG2 #98-AH; Qingdao, P.R. of China, Jun. 27-29, 2017; Agenda Item: 10.3.1.9; Source: Ericsson; Title: HARQ configurations in NR.
Tdoc R2-1707130; 3GPP TSG-RAN WG2 #98 AdHoc; Qingdao, China, Jun. 27-29, 2017; Agenda Item: 10.3.1.9; Source: Ericsson; Title: Investigation on UP Latency.
Tdoc R2-1707175; update of R2-1704683; 3GPP TSG-RAN WG2 #AH; Qingdao, P.R. of China, Jun. 26-30, 2017; Agenda Item: 10.3.1.8; Source: Ericsson; Title: General HARQ aspects of SPS UL.
Tdoc R2-1707176; Update of R2-1704684; 3GPP TSG-RAN WG2 #AH; Qingdao, P.R. of China, Jun. 26-30, 2017; Agenda Item: 10.3.1.8; Source: Ericsson; Title: Enhanced HARQ feedback mode in SPS.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
Non-Final Office Action of U.S. Appl. No. 16/101,361 dated on Aug. 7, 2022, (15p).
Final Office Action issued in U.S. Appl. No. 16/101,361 dated on Nov. 21, 2022, (19p).
The Non-Final Office Action issued in U.S. Appl. No. 16/101,361, dated Mar. 2, 2023,(15p).
U.S. Patent Office, Office Action issued in U.S. Appl. No. 16/101,361, Final Rejection, dated on Jan. 4, 2024(16P).

* cited by examiner

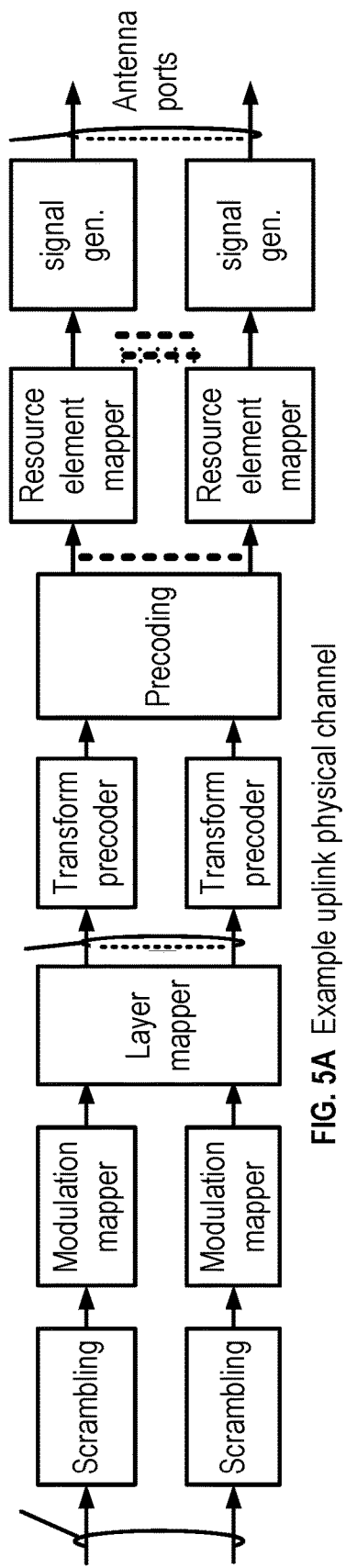
FIG. 5A Example uplink physical channel
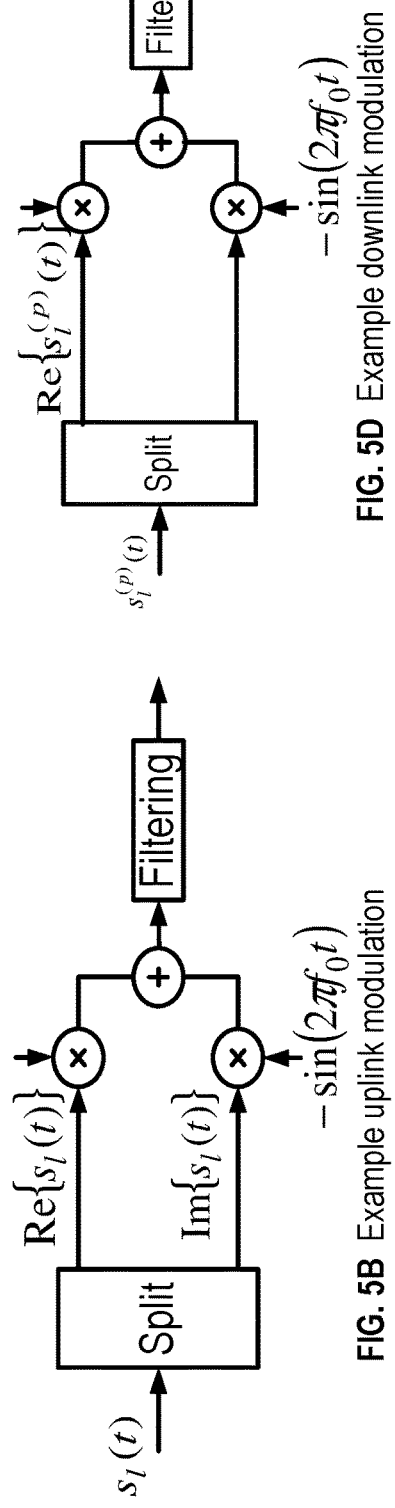
FIG. 5B Example uplink modulation
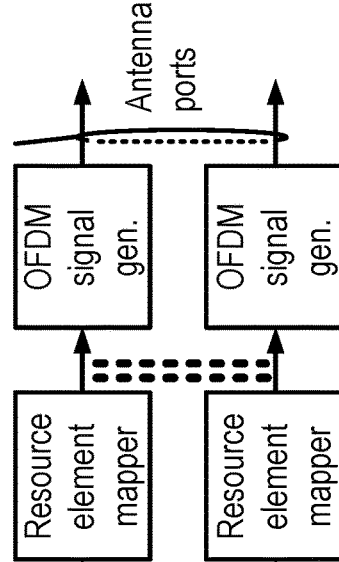
FIG. 5D Example downlink modulation
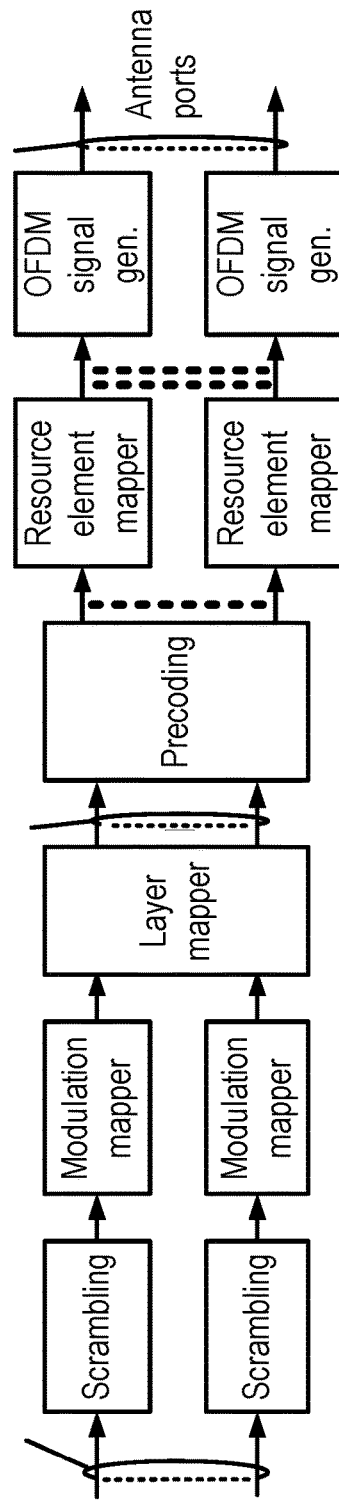
FIG. 5C Example downlink physical channel Dual-Connectivity- two MAC entities at UE side

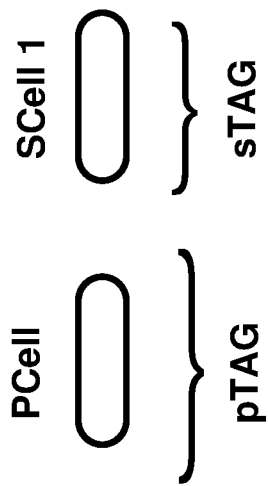
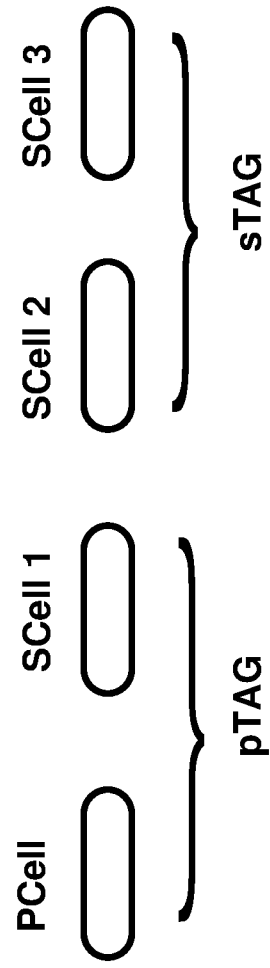
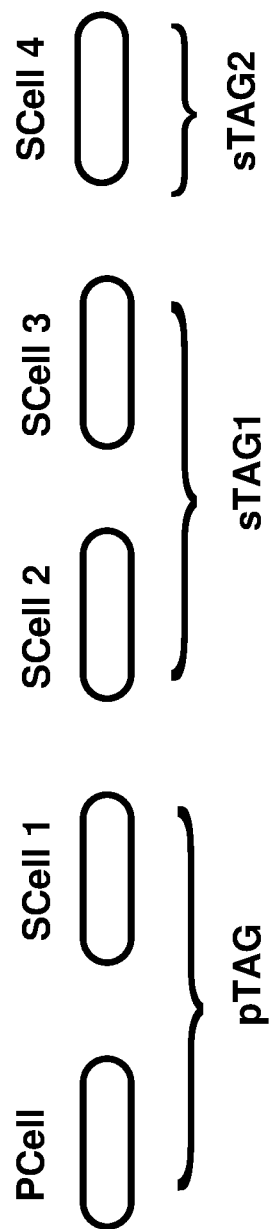
FIG. 8

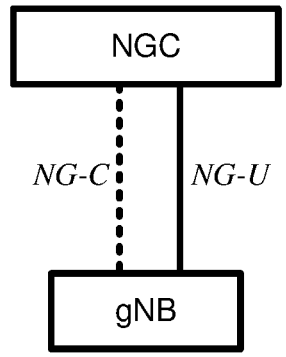
FIG. 10A gNB connected to NGC
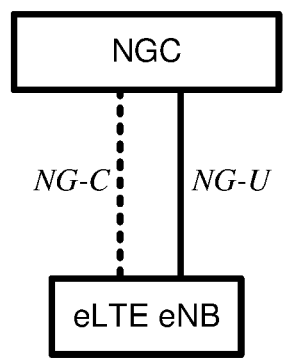
FIG. 10B eLTE eNB connected to NGC

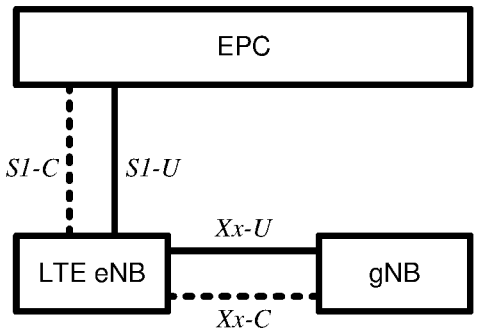

FIG. 11A LTE eNB connected to EPC with non-standalone gNB.
gNB user plane connected to EPC via LTE eNB.

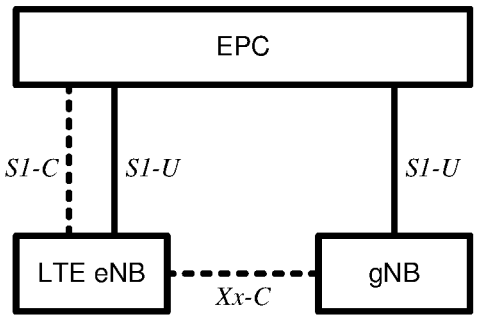

FIG. 11B LTE eNB connected to EPC with non-standalone gNB.
gNB user plane connected to EPC directly.

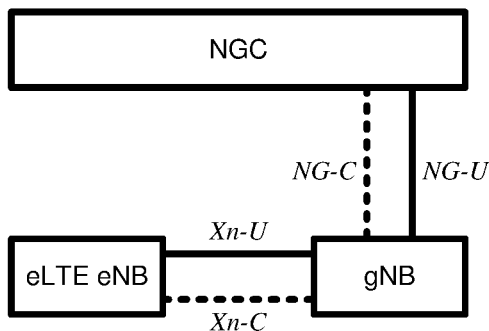

FIG. 11C gNB connected to NGC with non-standalone eLTE eNB.
eLTE eNB user plane connected to NGC via gNB.

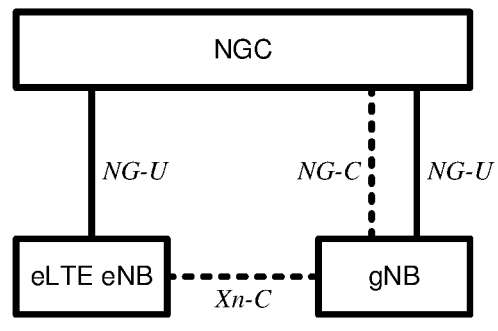

FIG. 11D gNB connected to NGC with non-standalone eLTE eNB.
eLTE eNB user plane connected to NGC directly.

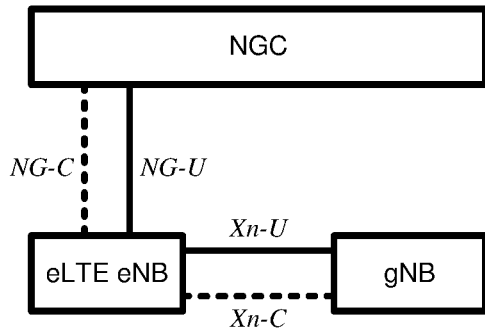

FIG. 11E eLTE eNB connected to NGC with non-standalone gNB.
gNB user plane connected to NGC via eLTE eNB.

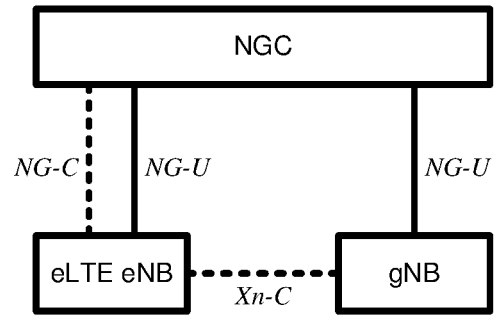

FIG. 11F eLTE eNB connected to NGC with non-standalone gNB.
gNB user plane connected to NGC directly.

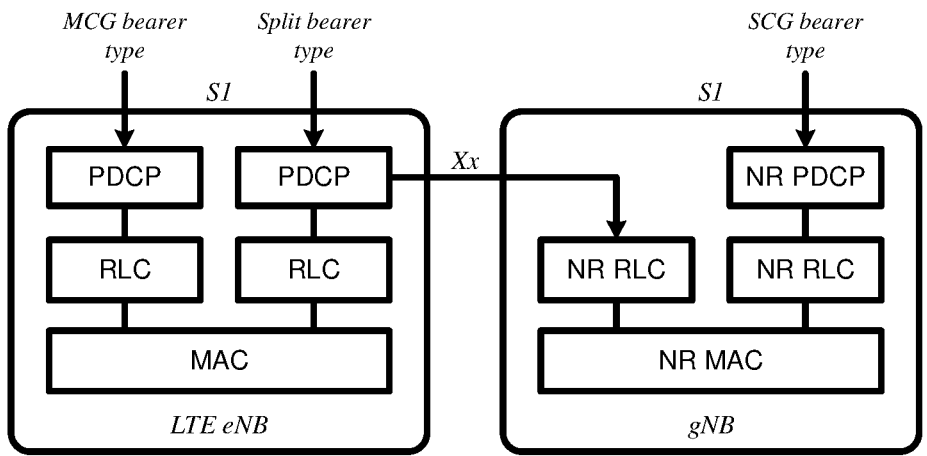
FIG. 12A Radio protocol architecture for split bearer and SCG bearer. LTE eNB connected to EPC with non-standalone gNB.
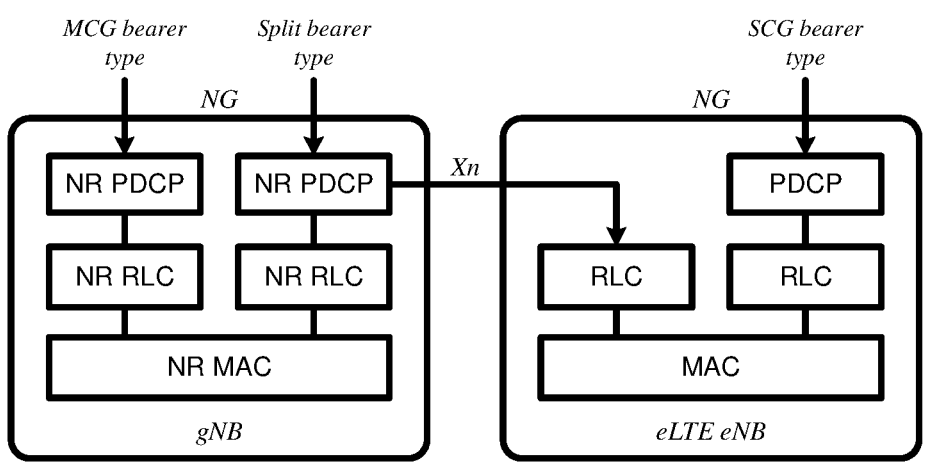
FIG. 12B Radio protocol architecture for split bearer and SCG bearer. gNB connected to NGC with non-standalone eLTE eNB.
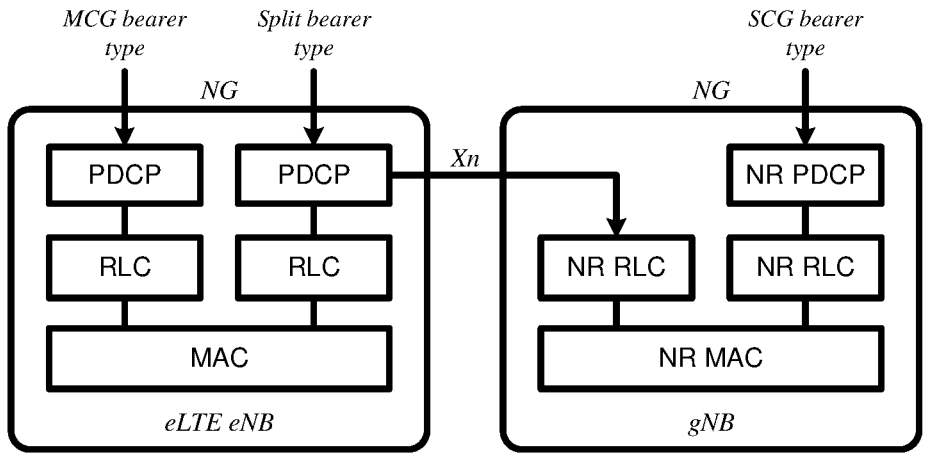
FIG. 12C Radio protocol architecture for split bearer and SCG bearer. eLTE eNB connected to NGC with non-standalone gNB.

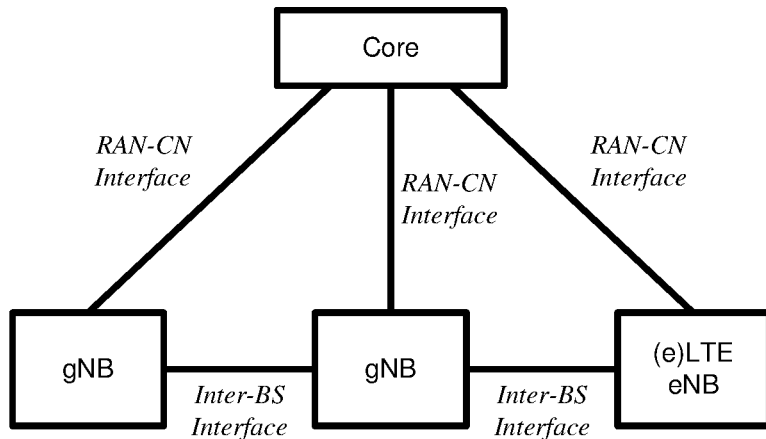
FIG. 13A Non-centralized deployment
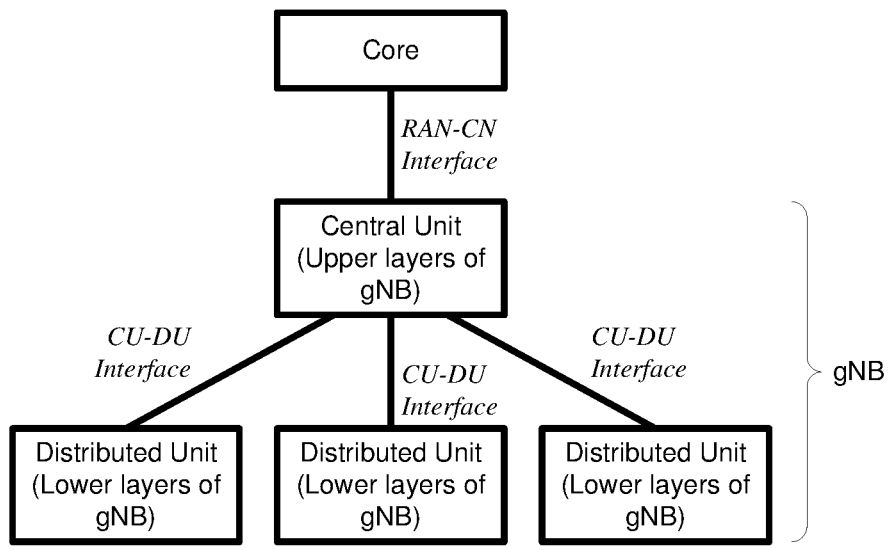
FIG. 13B Centralized deployment Receive, by a wireless device, message(s) comprising: configuration parameters for a periodic resource allocation indicating a 1st plurality of uplink resources of an uplink data channel of a cell; and offset parameter(s) for determining a number of uplink control information (UCI) resources
2910

Receive, by the wireless device, a downlink control information comprising: an uplink grant indicating uplink radio resources of the uplink data channel of the cell; and an offset indicator value
2920

Transmit a 1st transport block and 1st UCI(s) via the uplink radio resources of the uplink data channel of the cell, where: the uplink radio resources comprise 1st resources of the 1st UCI(s); and a 1st number of the 1st resources are determined based on the offset indicator value
2930

Transmit a 2nd transport block and 2nd UCI(s) via one of the 1st uplink resources of the uplink data channel of the cell, where: the one of the 1st uplink resources comprise 2nd resources of the 2nd UCI(s); and a 2nd number of the 2nd resources are determined based on the offset parameter(s)
2940

FIG. 29

Receive, by a wireless device, a radio resource control message indicating: a 1st uplink resources for a periodic resource allocation of an uplink data channel of a cell; and offset parameter(s)
3110

Receive, a downlink control information indicating: 2nd uplink resources of the uplink data channel; and an offset indicator value
3120

Transmit 2nd UCI(s) via 2nd resources of the 2nd uplink resources, where a 2nd number of the 2nd resources are determined based on the offset indicator value
3130

Transmit 1st UCI(s) via 1st resources of one of the 1st uplink resources, where a 1st number of the 1st resources are determined based on the offset parameter(s)
3140

FIG. 31

Transmit, by a base station, a radio resource control message indicating: 1st uplink resources for a periodic resource allocation of an uplink data channel of a cell; and offset parameter(s)
3310

Transmit, by the base station, a downlink control information indicating: 2nd uplink resources of the uplink data channel; and an offset indicator value
3320

Receive 2nd UCI(s) via 2nd resources of the 2nd uplink resources, where a 2nd number of the 2nd resources are determined based on the offset indicator value
3330

Receive 1st UCI(s) via 1st resources of one of the p1st uplink resources, where a 1st number of the 1st resources are determined based on the offset parameter(s)
3340

FIG. 33

Transmit a radio resource control message indicating configuration parameters for a periodic resource allocation indicating 1st uplink resources of an uplink data channel of a cell; and offset parameter(s) for determining a number of UCI resources
3410

Transmit a downlink control information indicating: 2nd uplink resources of the uplink data channel; and an offset indicator value
3420

Receive 2nd UCI(2) via 2nd resources of the 2nd uplink resources, where a 2nd number of the 2nd resources are determined based on the offset indicator value
3430

Receive 1st UCI(s) via 1st resources of one of the 1st uplink resources, where a 1st number of the 1st resources are determined based on the offset parameter(s)
3440

FIG. 34

Receive, by a wireless device, message(s) comprising configuration parameters comprising a skipping parameter
3510

Receive a downlink control information indicating: transmission parameters for transmission of a transport block via an uplink data channel; and an offset indicator value for determining a number of resources of uplink control information in the uplink data channel
3520

Ignore the skipping parameter when the wireless device has no data for the transport block in response to the downlink control information comprising the offset indicator value
3530

Transmit the uplink control information via the uplink data channel
3540

FIG. 35

```
┌─────────────────────────────────────────────────────────────┐
│ Receive, by a wireless device, a uplink grant for transmission of a │
│ transport block associated with a 1st uplink hybrid automatic repeat │
│          request (HARQ) process of a cell                   │
│                         3810                                │
└─────────────────────────────────────────────────────────────┘
                              │
                              ▼
┌─────────────────────────────────────────────────────────────┐
│ Start an uplink HARQ round-trip-time timer of the first uplink HARQ │
│ process of the cell in response to transmitting the transport block, │
│ wherein the starting the uplink HARQ round-trip-time timer increases │
│ a number of running uplink HARQ round-trip-time timers of uplink │
│         HARQ processes of the cell to a 1st number          │
│                         3820                                │
└─────────────────────────────────────────────────────────────┘
                              │
                              ▼
┌─────────────────────────────────────────────────────────────┐
│ Stop monitoring a control channel for the cell in response to the 1st │
│              number being equal to a 2nd number            │
│                         3830                                │
└─────────────────────────────────────────────────────────────┘
```

FIG. 38

Receive, by a wireless device, message(s) comprising configuration parameters of logical channel(s)
3910

Select a multiplexing process for transmitting uplink control information via an uplink channel employed for transmission of a transport block, where: the transport block comprises data of the logical channel(s); and the selecting is based on the configuration parameters of the logical channel(s)
3920

Multiplex the uplink control information in the uplink channel employing the multiplexing process
3930

Transmit the transport block and the uplink control information via the uplink channel
3940

FIG. 39

Receive, by a wireless device, a downlink control information for transmission of a transport block via an uplink data channel, where the downlink control information indicates a 1st numerology of the uplink data channel
4010

Select, based on the 1st numerology, a multiplexing process for transmitting uplink control information via the uplink data channel employed for transmission of the transport block
4020

Multiplex the uplink control information in the uplink data channel employing the multiplexing process
4030

Transmit the transport block and the uplink control information via the uplink data channel
4040

FIG. 40

Transmit, by a base station, a downlink control information for transmission of a transport block via an uplink data channel, where the downlink control information indicates a 1st numerology of the uplink data channel
4110

Receive the transport block and uplink control information via the uplink data channel, where: the uplink control information is multiplexed in the uplink data channel based on a multiplexing process; and the multiplexing process is selected based on the 1st numerology
4120

FIG. 41

Receive, by a wireless device, a downlink control information for transmission of a transport block via an uplink data channel, where the downlink control information indicates a 1st numerology of the uplink data channel
4310

Determine to multiplex uplink control information in the uplink data channel based on the 1st numerology
4320

Transmit, by the wireless device, the uplink control information via the uplink data channel based on the determining
4330

FIG. 43

Transmit, by a base station, a downlink control information for transmission of a transport block via an uplink data channel, where the downlink control information indicates a 1st numerology of the uplink data channel
4410

Determine that uplink control information is multiplexed in the uplink data channel based on the 1st numerology
4420

Receive, by the base station, the uplink control information via the uplink data channel based on the determining
4430

FIG. 44

OFFSET PARAMETERS FOR UPLINK CONTROL INFORMATION

CROSS REFERENCE TO RELATED APPLICATIONS

This application is a continuation of U.S. patent application Ser. No. 16/101,347, filed Aug. 10, 2018, now U.S. Pat. No. 10,873,415, which claims the benefit of U.S. Provisional Application No. 62/543,855, filed Aug. 10, 2017, and U.S. Provisional Application No. 62/543,859, filed Aug. 10, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 12A, FIG. 12B, and FIG. 12C are example diagrams for radio protocol structures of tight interworking bearers as per an aspect of an embodiment of the present invention.

FIG. 13A and FIG. 13B are example diagrams for gNB deployment scenarios as per an aspect of an embodiment of the present invention.

FIG. 29 is a flow diagram of an aspect of an embodiment of the present disclosure.

FIG. 31 is a flow diagram of an aspect of an embodiment of the present disclosure.

FIG. 33 is a flow diagram of an aspect of an embodiment of the present disclosure.

FIG. 34 is a flow diagram of an aspect of an embodiment of the present disclosure.

FIG. 35 is a flow diagram of an aspect of an embodiment of the present disclosure.

FIG. 38 is a flow diagram of an aspect of an embodiment of the present disclosure.

FIG. 39 is a flow diagram of an aspect of an embodiment of the present disclosure.

FIG. 40 is a flow diagram of an aspect of an embodiment of the present disclosure.

FIG. 41 is a flow diagram of an aspect of an embodiment of the present disclosure.

FIG. 43 is a flow diagram of an aspect of an embodiment of the present disclosure.

FIG. 44 is a flow diagram of an aspect of an embodiment of the present disclosure.

DETAILED DESCRIPTION OF EMBODIMENTS

Figure 1:
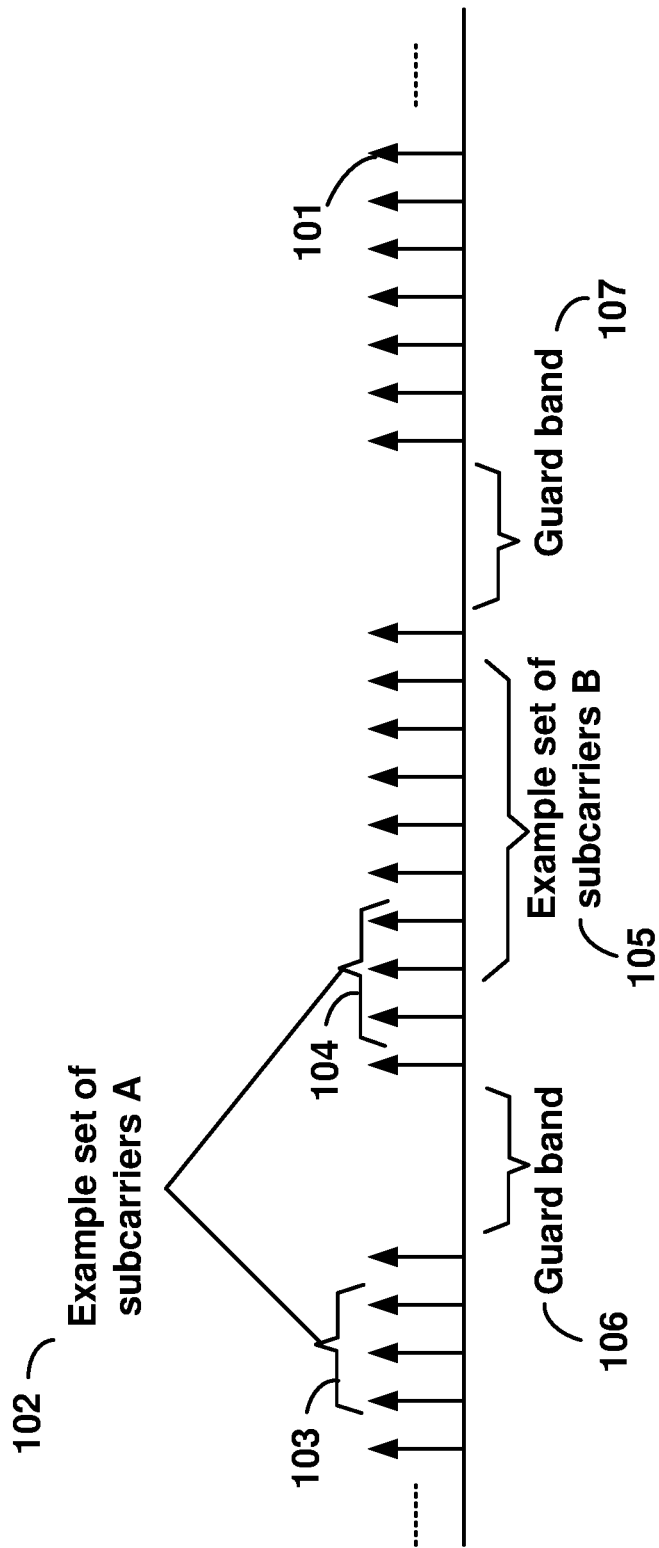
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to uplink control information and control channel monitoring in a multicarrier communication system.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time interval TB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
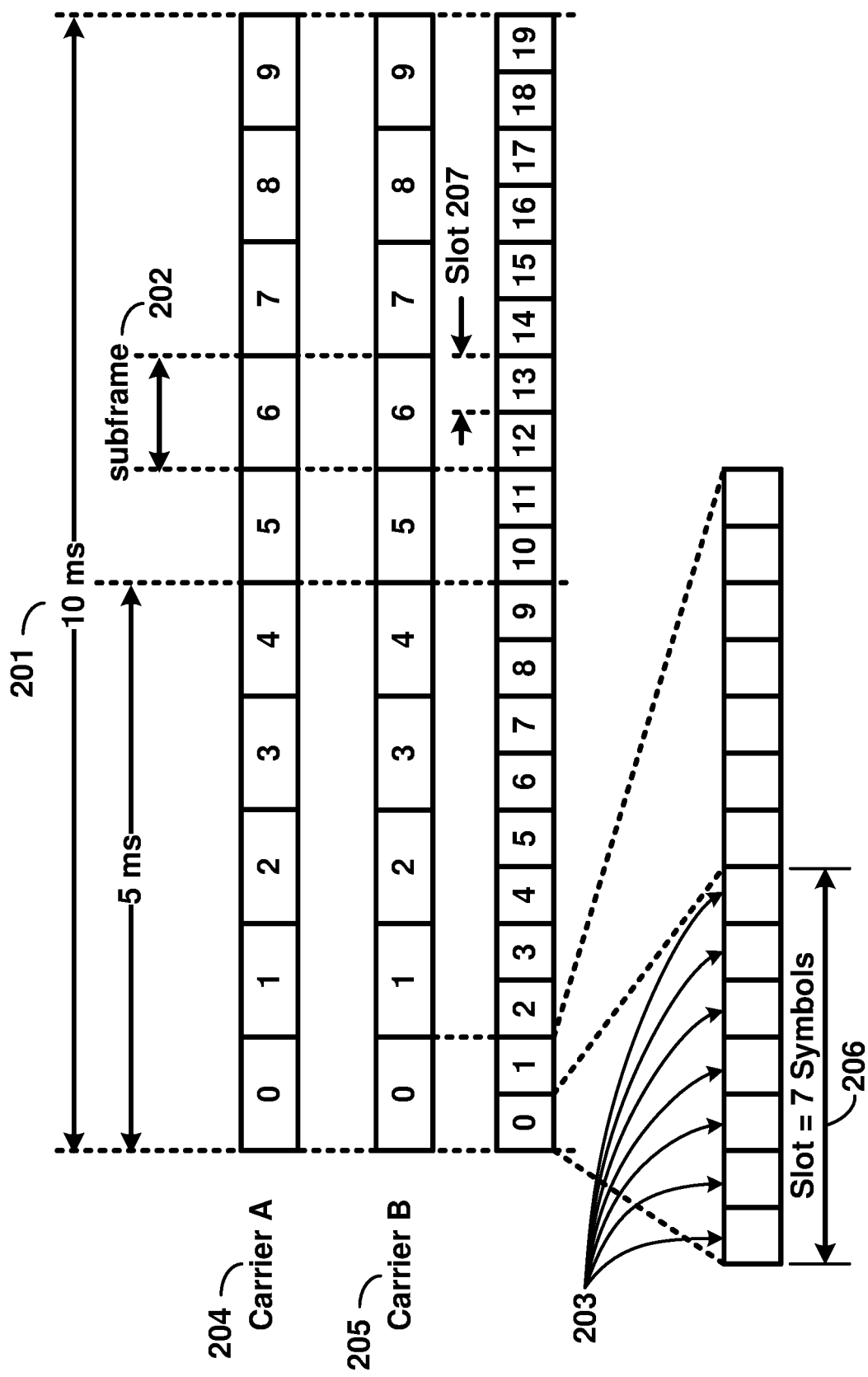
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
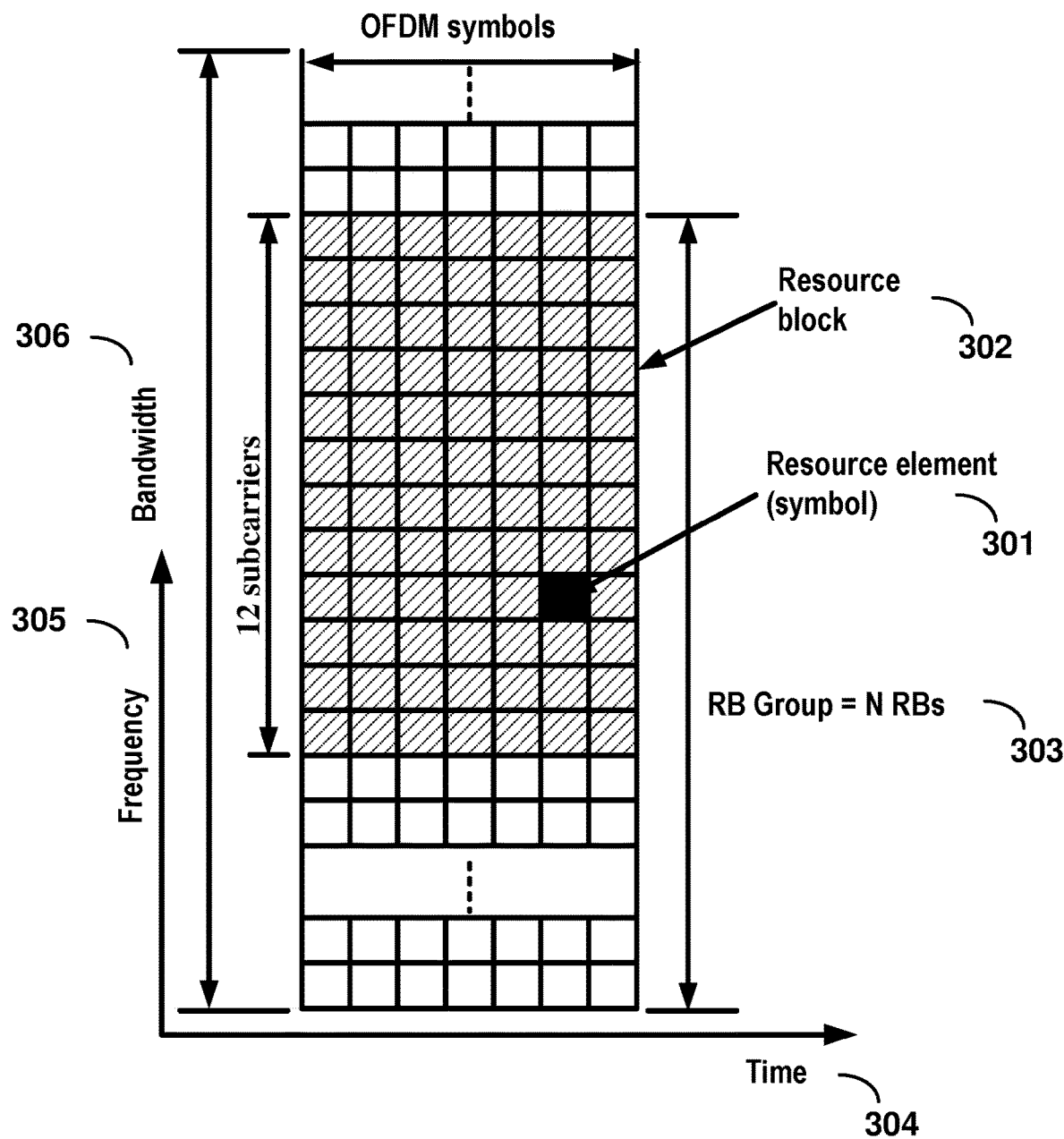
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
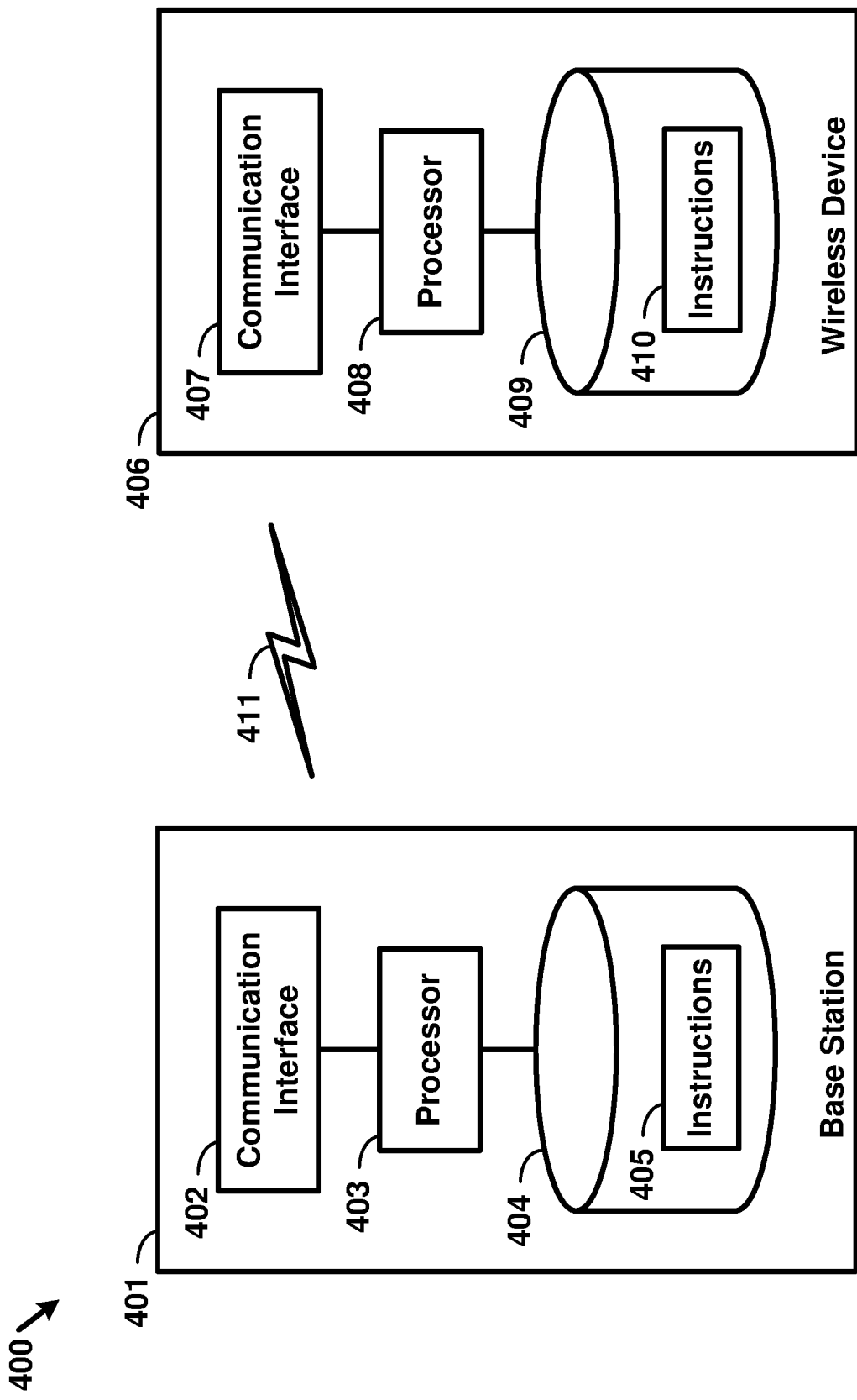
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
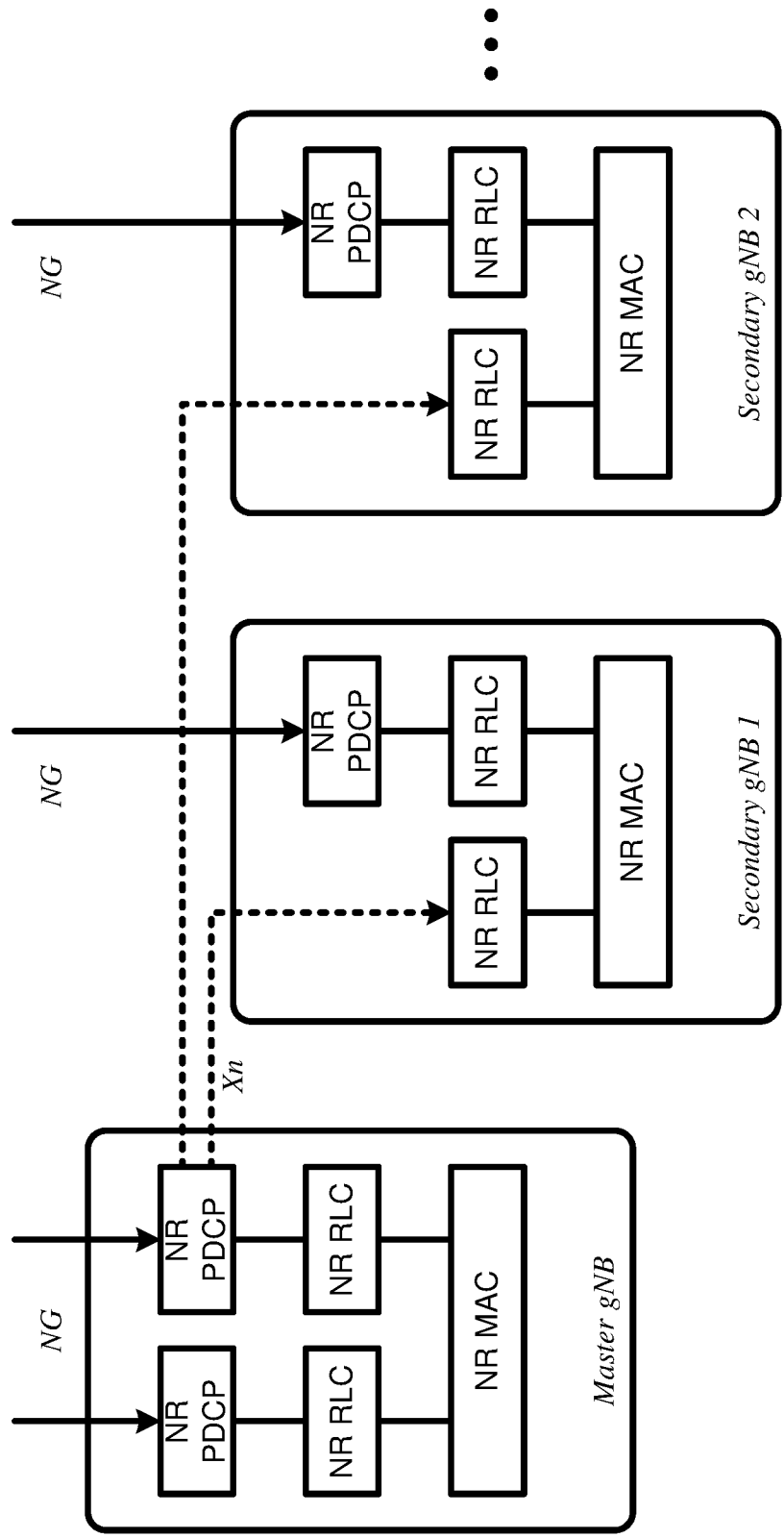
FIG. 6 is an example diagram for a protocol structure with multi-connectivity as per an aspect of an embodiment of the present invention.
Figure 7:
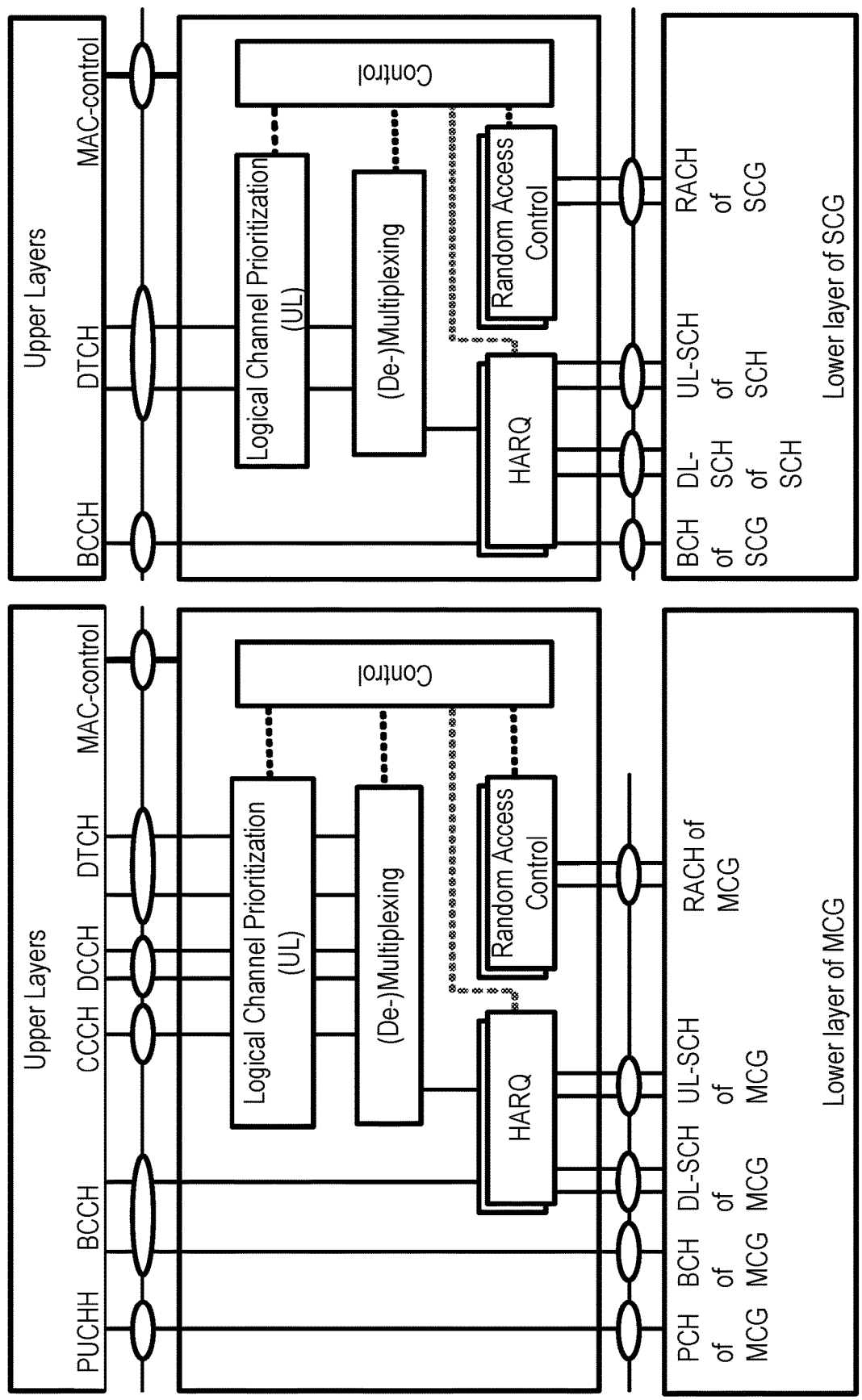
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNB s for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
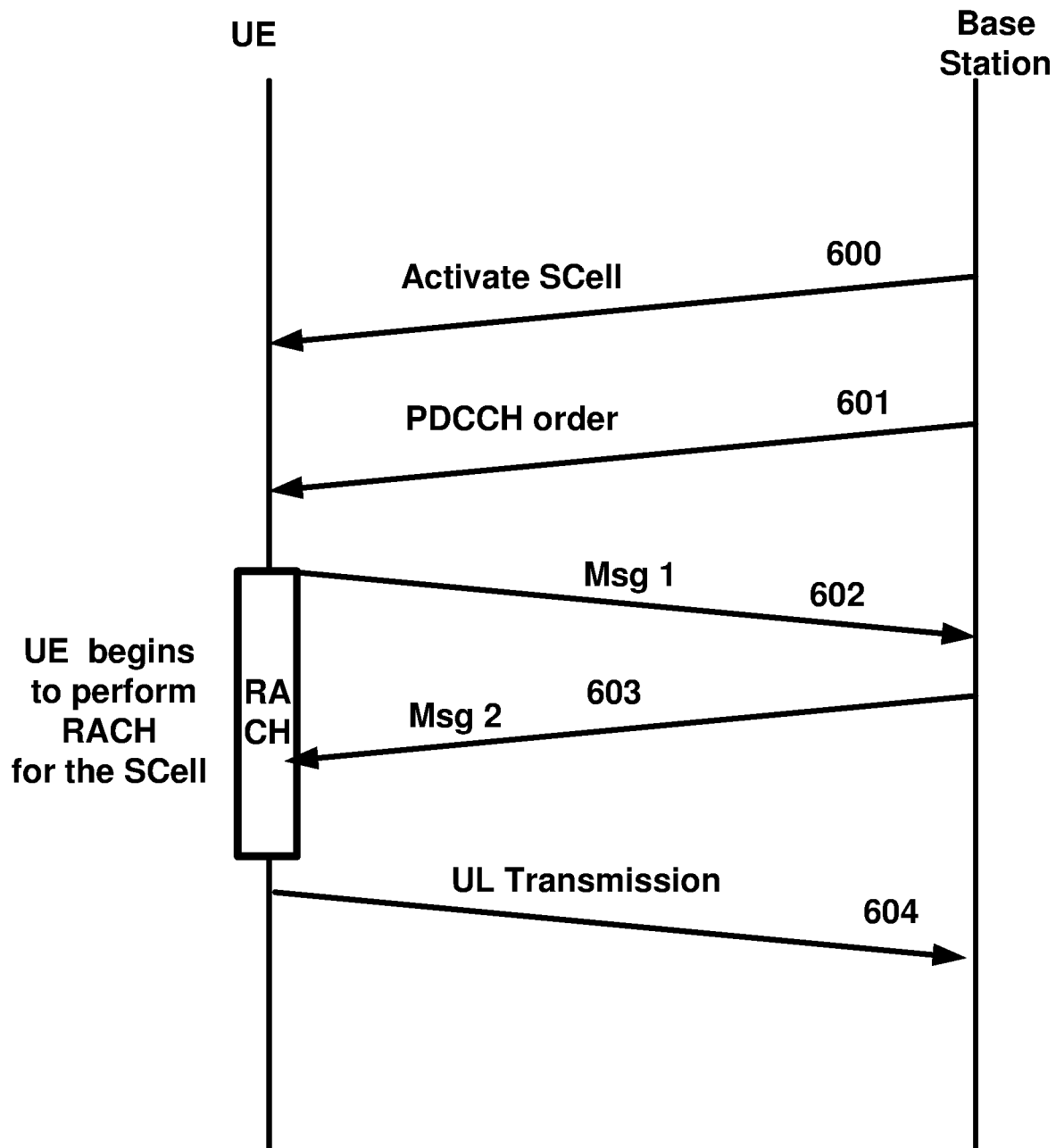
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RB s, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC-_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
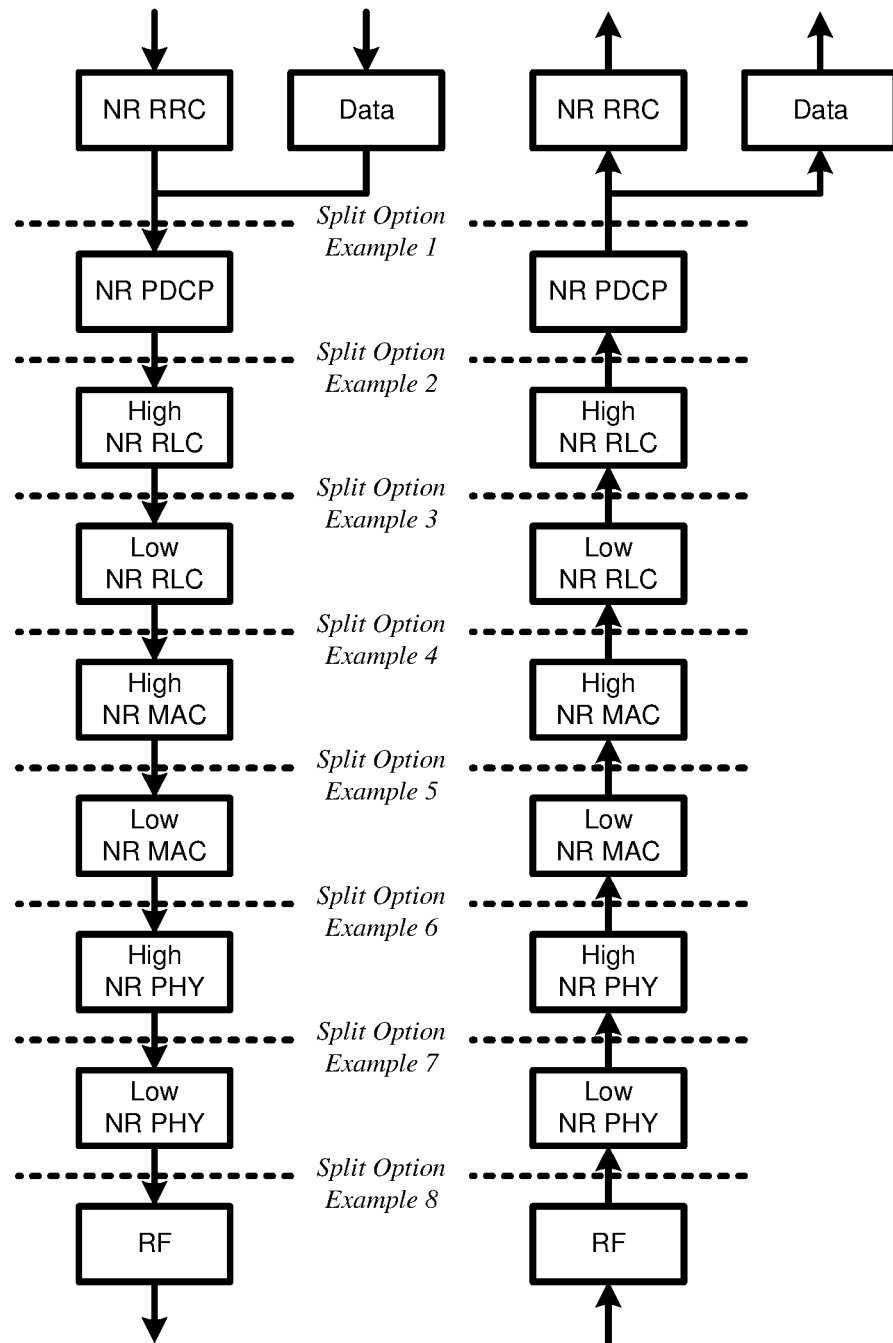
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or more messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra-reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifier n, 0≤n≤N (e.g., N=3, or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerologies and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells.

In an example, the priorities may indicate mapping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example embodiment, a HARQ feedback timing may be indicated in a DCI scheduling a downlink transmission (e.g., a PDSCH). In an example, DCI may comprise a field with a value/number/integer that indicates the time between the downlink transmission and HARQ feedback corresponding to the downlink transmission (e.g., ACK or NACK). The HARQ feedback may be transmitted on a PUCCH and/or PUSCH. In an example, HARQ feedback corresponding to a plurality of transport blocks may be transmitted on a PUSCH and/or PUCCH. In an example, the plurality of transport blocks may be associated with a same numerology/TTI. In an example, at least one of the plurality of transport blocks may be associated with a numerology/TTI different from numerologies/TTIs of the other transport blocks in the plurality of transport blocks.

In an example embodiment, a wireless device may monitor a plurality of PDCCH candidates in a common search space (e.g., in a primary cell) and UE-specific search space (e.g., in secondary cell). In an example, the wireless device may receive a PDCCH/EPDCCH on a first cell scheduling the wireless device (e.g., for PUSCH and/or PDSCH transmission) on the first cell (e.g., self-carrier scheduling). In an example, the PDCCH/EPDCCH received on the first cell may schedule the wireless device on a second cell (e.g., cross-carrier scheduling). In an example, for the cross-carrier scheduling, PDCCH and a scheduled PDSCH may same and/or different numerologies. In an example, for self-carrier scheduling, a PDCCH and the scheduled PDSCH may have a same or different numerology. In an example, for self- and/or cross-carrier scheduling, PDCCH and the scheduled PUSCH may have a same or different numerology.

In an example embodiment, when numerology between PDCCH and the scheduled transmission is different, the time granularity indicated in the DCI for the timing relationship between the end of the PDCCH and the corresponding scheduled transmission may be based on the numerology of the scheduled transmission.

In an example embodiment, HARQ feedback of a plurality of downlink component carriers with a same or different numerology may be transmitted together. In an example embodiment, a time granularity of HARQ feedback transmission indicated in a DCI scheduling a PDSCH may be based on a numerology of a PUCCH transmission. In an example, the PUCCH may correspond to the PDSCH (e.g., based on the numerology of PDSCH and/or content of TB(s) in PDSCH and/or service type of TB(s) and/or size of TB(s) in PDSCH etc.).

In an example, the wireless device may apply one or more offset parameters for multiplexing of one or more uplink control information (UCI) (e.g., HARQ feedback and/or RI and/or CQI, etc.) in PUSCH. In an example, the one or more offset parameters may be configured by higher layers (e.g., RRC configuration). In an example, the one or more offset parameters may be indicated to the wireless device, e.g., in a DCI scheduling the PUSCH. In an example, the DCI scheduling the PUSCH may comprise a field, the value of the field indicating the one or more offset parameters. In an example, in response to multiplexing one or more UCI (e.g., HARQ feedback and/or RI and/or CQI, etc.) in the PUSCH, the wireless device may employ the one or more offset parameters to determine the number of resources and/or resource elements and/or number of coded modulation symbols and/or coding/coding rate for multiplexing of the one or more UCI in the PUSCH. In an example, in response to multiplexing one or more UCI (e.g., HARQ feedback and/or RI and/or CQI, etc.) in the PUSCH, the wireless device may employ the one or more offset parameters to determine coding parameters, e.g., rates, for multiplexing of the one or more UCI in the PUSCH. In an example, the offset parameters may be configured and/or indicated as decibel (dB) values. The wireless device may employ the one or more offset parameters to determine resources and/or number of coded modulation symbols and/or coding and/or block error rate (BLER) requirements etc. of the one or more UCI and differentiate the one or more UCI from PUSCH. In an example, RRC may configure a plurality of offset parameters and the DCI may indicate one or more offset parameters in the plurality of offset parameters.

In an example, UCI may be piggybacked/multiplexed on PUSCH may for DFT-s-OFDM and/or CP-OFDM waveforms. In an example, for all types of UCI, uplink data may be rate-matched. In an example, for all types of UCI, uplink data may be punctured. In an example, at least for UCI other than HARQ feedback, uplink data may be rate-matched while for HARQ ACK, uplink data may be punctured.

In an example embodiment, PUSCH may be rate-matched around resource elements carrying HARQ feedback. In an example, to avoid error cases if the UE misses some downlink assignments, the uplink grant DCI may indicate whether to multiplex and/or which UCI to multiplex in the PUSCH. In an example, a wireless device may multiplex HARQ feedback employing rate-matching in response to HARQ feedback comprising payload smaller than a first threshold and/or TB size being larger than a second threshold and/or HARQ feedback payload size in combination with the TB size satisfying a first condition. The wireless device may multiplex HARQ feedback employing puncturing in response to the HARQ feedback comprising a payload larger than the first threshold and/or the TB size being larger than the second threshold and/or the HARQ feedback payload size in combination with the TB size not satisfying the first condition.

In an example, a UE may be configured for a single serving cell. The UE may not be configured for simultaneous PUSCH and PUCCH transmissions. In an example, the uplink control information (UCI) may be transmitted on PUCCH if the UE is not transmitting PUSCH. In an example, the UCI may be transmitted on PUSCH if the UE is transmitting PUSCH unless the PUSCH transmission corresponds to a Random Access Response Grant or a retransmission of the same transport block as part of the contention based random access procedure, in which case UCI may not be transmitted.

In an example, a UE may be configured for a single serving cell. The UE may be configured with simultaneous PUSCH and PUCCH transmission. In an example, UCI may be transmitted on PUCCH. The UE may transmit periodic/aperiodic CSI on PUSCH unless the PUSCH transmission corresponds to a Random Access Response Grant or a retransmission of the same transport block as part of the contention based random access procedure, in which case periodic/aperiodic CSI may not be transmitted.

In an example, a UE may be configured with more than one serving cell. The UE may not be configured for simultaneous PUSCH and PUCCH transmission. In an example, the UCI may be transmitted on PUCCH if the UE is not transmitting PUSCH. In an example, the UCI may be transmitted on PUSCH of a serving cell given if the UCI consists of aperiodic CSI or aperiodic CSI and HARQ-ACK. In an example, the UI may be transmitted on a primary cell PUSCH if the UCI consists of periodic CSI and/or HARQ-ACK and if the UE is transmitting on the primary cell PUSCH unless the primary cell PUSCH transmission corresponds to a Random Access Response Grant or a retransmission of the same transport block as part of the contention based random access procedure, in which case UCI may not be transmitted. In an example, the UCI may be transmitted on PUSCH of the secondary cell with smallest SCellIndex if the UCI consists of periodic CSI and/or HARQ-ACK and if the UE is not transmitting PUSCH on primary cell but is transmitting PUSCH on at least one secondary cell.

In an example, a UE may be configured with more than one serving cell. The UE may be configured with simultaneous PUSCH and PUCCH transmission. In an example, the UCI may be transmitted on PUCCH. In an example, the UCI may be transmitted on PUCCH and primary cell PUSCH if the UCI consists of HARQ-ACK and periodic CSI and the UE is transmitting PUSCH on the primary cell, in which case the HARQ-ACK may be transmitted on PUCCH and the periodic CSI may be transmitted on PUSCH unless the primary cell PUSCH transmission corresponds to a Random Access Response Grant or a retransmission of the same transport block as part of the contention based random access procedure, in which case periodic CSI may not be transmitted. In an example, the UCI may be transmitted on PUCCH and PUSCH of the secondary cell (other than a LAA SCell) with the smallest SCellIndex if the UCI consists of HARQ-ACK and periodic CSI and if the UE is not transmitting PUSCH on primary cell but is transmitting PUSCH on at least one secondary cell, in which case, the HARQ-ACK may be transmitted on PUCCH and the periodic CSI may be transmitted on PUSCH. In an example, the UCI may be transmitted on PUCCH and PUSCH if the UCI consists of HARQ-ACK/HARQ-ACK+SR/positive SR and aperiodic CSI in which case the HARQ-ACK/HARQ-ACK+SR/positive SR may be transmitted on PUCCH and the aperiodic CSI may be transmitted on PUSCH of a serving cell.

In an example, the MAC entity may be configured with a first parameter (e.g., skipUplinkTxSPS). In an example, an uplink grant received on PDCCH may be addressed to the Semi-Persistent Scheduling C-RNTI. In an example, the wireless device may ignore an uplink grant in response to the HARQ buffer for the process associated with the uplink grant being empty.

In an example, a MAC PDU may include only the MAC CE for padding BSR or periodic BSR with zero MAC SDUs. In an example, there may be no requested aperiodic CSI. The MAC entity may not generate a MAC PDU for the HARQ entity in response to the MAC entity being configured with skipUplinkTxDynamic and the grant indicated to the HARQ entity being addressed to first RNTI (e.g., C-RNTI). The MAC entity may not generate a MAC PDU for the HARQ entity in response to the MAC entity being configured with skipUplinkTxSPS and the grant indicated to the HARQ entity being a configured uplink grant.

In an example, long duration NR-PUCCH for up to 2 bits in a given slot may comprise HARQ ACK feedback, two-states SR e.g., based on on-off keying, time domain OCC. In an example, HARQ ACK feedback may be transmitted by BPSK or QPSK modulation and may be repeated in time domain and multiplied with sequence(s).

In an example, NR may support one long PUCCH format for UCI with up to 2 bits with high multiplexing capacity. In an example, NR may support one long PUCCH format for UCI with large payload with no multiplexing capacity. In an example, NR may support one long PUCCH format for UCI with moderate payload with some multiplexing capacity.

In an example, at least a first PUCCH with a short duration and/or a second PUCCH with a long duration may be configured for a wireless device. The first PUCCH and the second PUCCH may be transmitted on different numerologies/TTIs. In an example, the short PUCCH may employ a numerology with a shorter TTI than the long PUCCH. In an example, there may be a mapping between a type of uplink control information (UCI) and the type of PUCCH (e.g., short PUCCH or long PUCCH) that carriers the UCI. In an example, periodic CSI may be reported at least on short PUCCH or long PUCCH. In an example, the periodic CSI may be reported in a single slot. In an example, the periodic CSI may be reported us single slot and/or multiple slots. In an example, type I CSI feedback may be reported for P/SP/A-CSI. In an example, type I CSI feedback may be carrier on either PUCCH or PUSCH. In an example, type I CSI feedback may be carrier on either one of PUSCH or long PUCCH. In an example, type II CSI feedback may be carrier at least on PUSCH.

In an example, for a long PUCCH with up to 2 bits UCI, DMRS may occur in every symbol in long PUCCH. In an example, for a long PUCCH with up to 2 bits UCI, DMRS may occur in even and/or odd symbols in long PUCCH. In an example, for a PUCCH format for UCI with large payload and/or with no multiplexing capacity within a slot: the DMRS and UCI may be mapped to different symbols. In an example, for intra-slot frequency-hopping, one or two DMRS symbol(s) may be mapped on each frequency-hop of the long-PUCCH. In an example, there may be one DMRS per frequency-hop. The location may be around the middle of the frequency-hop. In an example, there may be one or two DMRS per frequency-hop.

In an example, a logical channel prioritization procedure in a MAC layer of a wireless device may take into account a plurality of information/parameters indicated by an uplink grant DCI for its multiplexing functionalities and creating transport blocks. In an example, at least part of the information/parameters indicated by the DCI/profile may be visible to the MAC layer and/or logical channel prioritization procedure. The plurality of information may be indicated to the wireless device explicitly or implicitly. In an example, RRC may configure the wireless device with a plurality of profiles and the uplink grant DCI may indicate an index to a profile in the plurality of profiles. In an example, the uplink grant DCI may comprise a field indicating the index. The profile may comprise a plurality of parameters comprising a numerology (e.g., numerology to be employed for transmission of PUSCH) and/or TTI (e.g., TTI to be employed for transmission of PUSCH) and/or a QoS profile for example indicating a service type associated with the grant/PUSCH and/or logical channels associated with the grant/PUSCH and/or power-related parameters (e.g., power headroom reporting, etc.) and/or one or more restrictions that the wireless device may consider when multiplexing data (e.g., MAC SDUs and/or MAC CEs) in at least one TB associated with the grant/PUSCH.

In an example, a DCI scheduling a transmission in downlink, uplink, etc., may indicate numerology/TTI corresponding to the scheduled transmission. In an example, a DCI indicating a downlink assignment may indicate a cell/numerology/TTI corresponding to the scheduled downlink assignment. In an example, the numerology/TTI may be implicitly indicated. For example, the wireless device may implicitly determine a numerology/TTI corresponding to a scheduled transmission from the numerology/TTI on which the DCI is received. In an example, the numerology/TTI may be implicitly indicated by the DCI by indicating a profile/index. The wireless device may be configured with a plurality of profiles and the index indicated by the DCI may determine the profile. In an example, the profile may comprise a plurality of parameters comprising the numerology/TTI. In an example, the DCI may comprise a field, the value of the field indicating the profile (e.g., using an index). In an example, the numerology/TTI of the scheduled transmission may be explicitly indicated, e.g., in the scheduling DCI. In an example, the scheduling DCI may comprise a field indicating the numerology/TTI of the scheduled transmission.

In an example, the DCI scheduling a transmission may indicate a timing between the DCI and the scheduled transmission (e.g., timing between DCI and PUSCH or timing between DCI and PDSCH, etc.). In an example, the timing may be explicitly indicated in the DCI. In an example, the timing may be indicated as a number (e.g., integer). In an example, the scheduling DCI may comprise a field, the value of the field may indicate the timing. In an example, the timing may be implicitly indicated to the wireless device by the DCI. In an example, the base station may configure the wireless device with a plurality of timing values and the DCI may indicate one of the plurality of the configured timing values. In an example, the wireless device may use the value of timing indicated in the DCI along with a timing granularity to determine the time between the DCI and the scheduled transmission. The timing granularity may be based on a rule. In an example, the timing granularity between a DCI and a scheduled PUSCH may be based on a numerology of the PUSCH (e.g., in terms of OFSM symbols, TTI, slot, etc.). In an example, the timing granularity between DCI and the PDSCH may be based on the numerology of the PDSCH. In an example, in case of self-carrier scheduling PDSCH, the PDCCH and the PDSCH may have a same numerology. The wireless device may implicitly determine that the time granularity between DCI and the PDSCH is based on the numerology of the PDCCH/DCI.

In an example embodiment, the wireless device may transmit HARQ feedback associated with a PDSCH on a PUCCH and/or multiplex the HARQ feedback associate with a PDSCH on a PUSCH. The timing between the PDSCH and the HARQ feedback may be indicated in the DCI. In an example, the timing may be explicitly indicated to the wireless device. In an example, the timing may be implicitly indicated to the wireless device. The base station may configure (e.g., with RRC) a plurality of timing values and the DCI may indicate a timing value among the plurality of timing values. In an example, the DCI may comprise a field indicating the timing between scheduled PDSCH and the HARQ feedback associated with the scheduled PDSCH. In an example, a DCI format may not comprise a HARQ feedback timing field. The wireless device may not transmit HARQ feedback for scheduled downlink transmission associated with the DCI. The wireless device may determine the time between PDSCH and HARQ feedback based on the timing indicated by the DCI and a timing granularity. In an example, the wireless device may determine the timing granularity between PDSCH and HARQ feedback based on numerology of a PUCCH associated with the PDSCH.

In an example, a wireless device may be configured with a plurality of cell groups. In an example, a cell group in the plurality of cell groups may be associated with one or more PUCCHs, e.g., one or more carriers transmitting PUCCH. In an example, the one or more PUCCHs within a cell group may have a same numerology/TTI. In an example, at least two of the one or more PUCCHs within a cell group may have different numerologies/TTIs. In an example, a PDSCH and/or TTI/numerology associated with a PDSCH transmitted on a cell in a cell group may be associated with a PUCCH in the cell group e.g., based on the numerology/TTI associated with the PDSCH, the TB(s) content/size/service type associated with the PDSCH, etc. The wireless device may determine timing between the PDSCH and HARQ feedback for the PDSCH based on a numerology corresponding to the PUCCH associated with PDSCH.

In an example, a wireless device may be configured with periodic resource allocation. The periodic resource allocation may comprise semi-persistent scheduling (SPS) and/or grant-free (GF) resource allocation. In an example, the configuration parameters for SPS and/or GF may comprise an interval and/or MCS and/or one or more power control parameters and/or an implicit release parameter and/or other parameters for identifying an allocated resources, etc. In an example SPS and/or GF may be activated for the wireless device in response to receiving an activation DCI. In an example, the SPS and/or GF resources may be released in response to receiving a release DCI. In an example, the SPS and/or GF resource may be implicitly released in response to not utilizing an allocated resource for a first number of times, e.g., based on the implicit release parameter. In an example, the RRC configuration of GF may activate associated resources for the GF. The wireless device may employ the parameters in an activating DCI and/or RRC parameters to identify allocated resource for SPS and/or GF and/or generate transport blocks for transmission employing the allocated resources.

In legacy procedures for UCI multiplexing in PUSCH, the wireless device may multiplex one or more UCI in a PUSCH without considering physical layer attributes and/or service type and/or content (e.g., logical channels included in TB(s)) of the PUSCH (except in some scenarios where the wireless device may not multiplex PUSCH in an LAA cell). With the increase in UCI feedback (e.g., increase in HARQ feedback due to code block group based HARQ feedback, etc.), the TB(s) transmitted in PUSCH may be subject to higher levels of error due to UCI multiplexing. There is a need to enhance the UCI multiplexing process to improve the efficiency of uplink transmission in case a high payload of UCI is multiplexed in a PUSCH. Example embodiment enhance the legacy UCI and/or HARQ feedback multiplexing processes. Some of the feature of the example embodiments may be combined to improve the efficiency in uplink transmission.

In an example embodiment, a wireless device may receive one or more messages comprising configuration parameters for one or more cells. In an example, the one or more cells may comprise a first cell. In an example, the one or more messages may comprise RRC messages. In an example, the wireless device may receive a downlink control information (DCI). The wireless device may receive the DCI in a downlink control channel, e.g., PDCCH/EPDCCH. The DCI may indicate parameters for transmitting at least one transport blocks (TB) on a first physical uplink shared channel (PUSCH) on the first cell. In an example, the transmission parameters indicated in the DCI for the at least one TB may include HARQ related parameters, power control related parameters, modulation and coding scheme (MCS), resource allocation parameters, etc. In an example, the DCI may indicate HARQ process ID for the at least one TB. In an example, the HARQ process ID for the at least one TB may be derived by the wireless device for example based on the uplink resources for transmission of the at least one TB. In an example, DCI may indicate a transmission timing for the at least one TB. In an example, the time granularity for determining the time between the DCI and the PUSCH may be based on the numerology pf the PUSCH. In an example, the parameters indicated in the DCI for transmission of the at least one TB may comprise a profile and/or index. In an example, RRC may configure a plurality of profiles for the wireless device. A profile in the plurality of profiles may comprise a numerology and/or TTI and/or one or more power-related parameters and/or service type of the at least one TB and/or one or more logical channels that may be included in the at least one TB and/or other parameters. In an example, the DCI for transmission of the at least one TB may indicate an index to a first profile in the plurality of profiles. At least some of the parameters indicated by the first profile may be visible to the MAC layer. For example, a first numerology and/or a first TTI and/or a first service type and/or the logical channels for including in the at least one TB that are indicated by the first profile may be visible to the MAC layer. In an example, the first profile index may be visible to the MAC layer and the parameters in the first profile may be known by the MAC layer by knowing the first profile index. In an example, the wireless device may transmit the at least one TB on a PUSCH with numerology and/or TTI and/or considering other parameters indicated in the DCI and/or the first profile.

In an example, the wireless device may construct the at least one TB employing the transmission parameters indicated by the DCI and/or the parameters indicated in the profile indicated by the DCI. The wireless device may transmit the at least one TB over the first PUSCH.

In an example embodiment, the wireless device may transmit/multiplex one or more uplink control information (UCIs) on the first PUSCH based on one or more criteria. In an example, the one or more UCI may comprise HARQ feedback. In an example, the one or more UCI may comprise other control information such as CSI and/or SR and/or beam measurement report and/or RI and/or PMI, etc. In an example, the one or more criteria may comprise the wireless device not being configured with simultaneous PUSCH and PUCCH transmission. In an example, the one or more criteria may comprise the first PUSCH being transmitted on a secondary cell with smallest cell index. In an example, the one or more criteria may comprise the first PUSCH being transmitted on a smallest cell index that is not a licensed assisted access (LAA) cell. In an example embodiment, the one or more criteria may comprise considering and/or may be based on the first profile indicated by the DCI for transmission of the at least one TB in the first PUSCH.

In an example embodiment, the one or more UCI may be transmitted/multiplexed on the first PUSCH in response to the first profile not being one of one or more profiles. In an example, the one or more profiles may be configured for the wireless device (e.g., with RRC configuration). In an example, the one or more profiles may be pre-configured profiles. In an example, the one or more profiles may be indicated to the wireless device (e.g., by a DCI, etc.).

In an example embodiment, the one or more UCI may be transmitted/multiplexed on the first PUSCH in response to the first TTI/numerology indicated by the first profile not being one of one or more TTIs/numerologies. In an example, the one or more TTIs/numerologies may be configured for the wireless device (e.g., with RRC configuration). In an example, the one or more TTIs/numerologies may be pre-configured TTIs/numerologies. In an example, the one or more TTIs/numerologies may be indicated to the wireless device (e.g., by a DCI, etc.).

In an example embodiment, the one or more UCI may be transmitted/multiplexed on the first PUSCH in response to one or more service types (e.g., URLLC) and/or logical channels not being mappable to the first profile and/or first TTI/numerology indicated by the first profile. In an example, the mapping between service types and/or logical channels to the profiles and/or TTIs/numerologies may be configured (e.g., with RRC configuration) for the wireless device and/or be pre-configured. In an example, the one or more service types and/or logical channels may be configured for the wireless device (e.g., with RRC configuration). In an example, the one or more service types and/or logical channels may be pre-configured service types. In an example, the one or more service types and/or logical channels may be indicated to the wireless device (e.g., by a DCI, etc.).

In an example embodiment, an uplink grant DCI scheduling a PUSCH, may comprise a field indicating whether the wireless device may multiplex one or more UCI in the PUSCH corresponding to the uplink grant. In an example, the uplink grant DCI may indicate whether the wireless device may multiplex one or more UCIs among a plurality of UCI in the PUSCH and/or whether the wireless device may not multiplex one or more second UCIs among a plurality of UCIs in the PUSCH. For example, the uplink grant may indicate that the wireless device may multiplex CSI in the PUSCH and may not multiplex HARQ feedback in the PUSCH. The wireless device may consider this indication when multiplexing UCI on the PUSCH. For example, the wireless device may multiplex one or more UCI in the PUSCH with smallest cell index that its corresponding DCI indicates that the one or more UCI may be multiplexed in the PUSCH and/or its corresponding DCI does not indicate that the one or more UCI may not be multiplexed in the PUSCH. In an example, wireless device may consider the indication in an uplink grant corresponding to a DCI along with other restrictions/rules (e.g., being the smallest cell index, not being an LAA cell, etc.) when deciding whether to multiplex UCI in a PUSCH.

Figure 15:
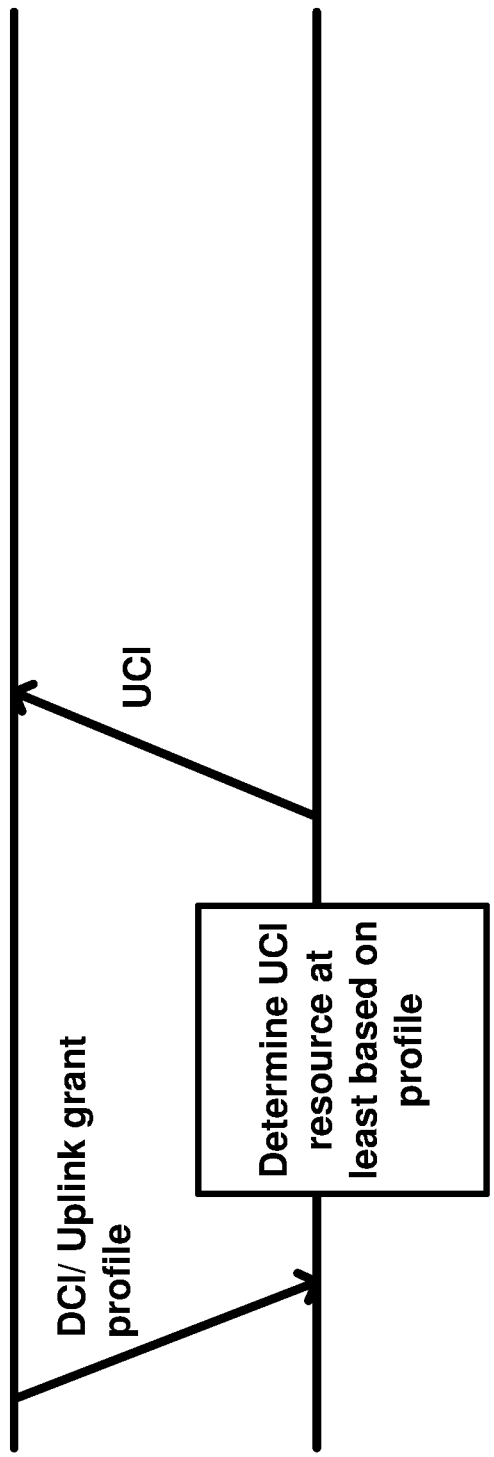
FIG. 15 is an example UCI multiplexing process as per an aspect of an embodiment of the present invention.

In an example embodiment, a wireless device may employ a method comprising receiving a DCI indicating parameters for transmitting at least one transport block on a first PUSCH. In an example, the parameters may comprise a profile and/or an index to one of a plurality of profiles. An example process is shown in FIG. 15. In an example, the profile may indicate at least a first TTI and/or numerology of the PUSCH. In an example, the wireless device may transmit/multiplex one or more UCI on the first PUSCH or a second PUSCH or a PUCCH at least based on the profile and/or the first TTI/numerology. In an example, the wireless device may not multiplex the one or more UCI in the first PUSCH in response to the first TTI/numerology being one of the one or more configured (e.g., RRC configured) and/or pre-configured TTIs/numerologies. In an example, one or more pre-configured and/or configured (e.g., RRC configured) service types may be mappable to the one or more configured/pre-configured TTIs/numerologies. In an example, the one or more UCI may comprise HARQ feedback.

In an example embodiment, a wireless device may receive one or more messages comprising configuration parameters for one or more cells. In an example, the one or more cells may comprise a first cell. In an example, the one or more messages may comprise RRC messages. In an example, the wireless device may receive a downlink control information (DCI). The wireless device may receive the DCI in a downlink control channel, e.g., PDCCH/EPDCCH. The DCI may indicate parameters for transmitting at least one transport blocks (TB) on a first physical uplink shared channel (PUSCH) on the first cell. In an example, the transmission parameters indicated in the DCI for the at least one TB may include HARQ related parameters, power control related parameters, modulation and coding scheme (MCS), resource allocation parameters, etc. In an example, the transmission parameters may indicate uplink resources for transmission of the at least one TB. In an example, the DCI may indicate HARQ process ID for the at least one TB. In an example, the HARQ process ID for the at least one TB may be derived by the wireless device for example based on the uplink resources for transmission of the at least one TB. In an example, DCI may indicate a transmission timing for the at least one TB. In an example, the time granularity for determining the time between the DCI and the PUSCH may be based on the numerology pf the PUSCH. In an example, the parameters indicated in the DCI for transmission of the at least one TB may comprise a profile and/or index. In an example, RRC may configure a plurality of profiles for the wireless device. A profile in the plurality of profiles may comprise a numerology and/or TTI and/or one or more power-related parameters and/or service type of the at least one TB and/or one or more logical channels that may be included in the at least one TB and/or other parameters. In an example, the DCI for transmission of the at least one TB may indicate an index to a first profile in the plurality of profiles. At least some of the parameters indicated by the first profile may be visible to the MAC layer. For example, a first numerology and/or a first TTI and/or a first service type and/or the logical channels for including in the at least one TB that are indicated by the first profile may be visible to the MAC layer. In an example, the first profile index may be visible to the MAC layer and the parameters in the first profile may be known by the MAC layer by knowing the first profile index. In an example, the wireless device may transmit the at least one TB on a PUSCH with numerology and/or TTI and/or considering other parameters indicated in the DCI and/or the first profile.

In an example, the wireless device may construct the at least one TB employing the transmission parameters indicated by the DCI and/or the parameters indicated in the profile indicated by the DCI. The wireless device may transmit the at least one TB over the first PUSCH.

In an example embodiment, the wireless device may puncture the first PUSCH by one or more UCI (e.g., HARQ feedback) or rate match the first PUSCH around the one or more UCI (e.g., HARQ feddback) based on one or more criteria. In an example, the one or more criteria may comprise puncturing the first PUSCH by the one or more UCI (e.g., HARQ feedback) or rate matching the first PUSCH around the one or more UCI (e.g., HARQ feddback) based on the first profile indicated by the DCI/uplink grant. In an example, the wireless device may puncture the first PUSCH by the one or more UCI (e.g., HARQ feedback) in response to the first profile being one of one or more profiles. In an example, the wireless device may not puncture the first PUSCH by the one or more UCI (e.g., HARQ feedback) (e.g., the wireless device may rate match the or more UCI (e.g., HARQ feedback) around the first PUSCH) in response to the first profile being one of one or more profiles. In an example, the one or more profiles may be configured (e.g., with RRC configuration) for the wireless device. In an example, the one or more profiles may be pre-configured. In an example, the one or more profiles may be indicated to the wireless device (e.g., by a DCI).

In an example embodiment, the one or more criteria may comprise puncturing the first PUSCH by the one or more UCI (e.g., HARQ feedback) or rate matching the first PUSCH around the one or more UCI (e.g., HARQ feddback) based on a first TTI/numerology indicated by the first profile indicated by the DCI/uplink grant. In an example, the wireless device may puncture the first PUSCH by the one or more UCI (e.g., HARQ feedback) in response to the first TTI/numerology being one of one or more TTIs/numerologies. In an example, the wireless device may not puncture the first PUSCH by the one or more UCI (e.g., HARQ feedback) (e.g., the wireless device may rate match the or more UCI (e.g., HARQ feedback) around the first PUSCH) in response to the first TTI/numerology being one of one or more TTIs/numerologies. In an example, the one or more TTIs/numerologies may be configured (e.g., with RRC configuration) for the wireless device. In an example, the one or more TTIs/numerologies may be pre-configured. In an example, the one or more TTIs/numerologies may be indicated to the wireless device (e.g., by a DCI).

In an example embodiment, the one or more criteria may comprise puncturing the first PUSCH by the one or more UCI (e.g., HARQ feedback) or rate matching the first PUSCH around the one or more UCI (e.g., HARQ feedback) based on a first service type and/or one or more first logical channels indicated by the first profile indicated by the DCI/uplink grant. In an example embodiment, the one or more criteria may comprise puncturing the first PUSCH by the one or more UCI (e.g., HARQ feedback) or rate matching the first PUSCH around the one or more UCI (e.g., HARQ feedback) based on a first service type and/or one or more first logical channels that are mappable to the first profile and/or TTI/numerology indicated by the first profile. In an example, the wireless device may puncture the first PUSCH by the one or more UCI (e.g., HARQ feedback) in response to the first service type and/or the one or more first logical channels indicated by the first profile (and/or mappable to the TTI/numerology indicated by the first profile) being one of one or more service types and/or one or more logical channels. In an example, the wireless device may not puncture the first PUSCH by the one or more UCI (e.g., HARQ feedback) (e.g., wireless device may rate match the one or more UCI (e.g., HARQ feedback) around the first PUSCH) in response to the first service type and/or one or more first logical channels indicated by the first profile (and/or mappable to the TTI/numerology indicated by the first profile) being one of one or more service types and/or one or more logical channels. In an example, the one or more service type may comprise URLLC. In an example, the one or more service types and/or one or more logical channels may be configured (e.g., with RRC configuration) for the wireless device. In an example, the one or more service types and/or one or more logical channels may be pre-configured. In an example, the one or more service types and/or one or more logical channels may be indicated to the wireless device (e.g., by a DCI).

In an example embodiment, an uplink grant DCI scheduling a PUSCH, may comprise a field indicating whether the wireless device may puncture the PUSCH by one or more UCI (e.g., HARQ feedback) or may rate match the PUSCH around one or more UCI (e.g., HARQ feedback). The wireless device may consider this indication when multiplexing the one or more UCI (e.g., HARQ feedback) on the PUSCH. In an example, wireless device may consider the indication in an uplink grant corresponding to a DCI along with other restrictions/rules (e.g., being the smallest cell index, not being an LAA cell, etc.) when deciding whether to multiplex UCI in the PUSCH.

In an example embodiment, the one or more criteria may comprise puncturing the first PUSCH by the one or more UCI (e.g., HARQ feedback) or rate matching the first PUSCH around the one or more UCI (e.g., HARQ feedback) based on a size of the at least one TB transmitted by the first PUSCH. In an example, the size of the at least one TB may be indicated in the uplink grant DCI. In an example, the one or more criteria may further comprise considering the size of the one or more UCI (e.g., HARQ feedback). In an example, the wireless device may consider both the size of the at least one TB and the size of the one or more UCI (e.g., HARQ feedback) when deciding whether to puncture the first PUSCH by the one or more UCI (e.g., HARQ feedback) or rate match the one or more UCI (e.g., HARQ feedback) around the first PUSCH. In an example, the wireless device may consider both the size of the at least one TB and the size of the one or more UCI (e.g., HARQ feedback) when deciding whether to multiplex the one or more UCI in the first PUSCH or not. The wireless device may consider both the size of the at least one TB and the size of the one or more UCI (e.g., HARQ feedback) along with other restrictions/rules (e.g., the cell index of the cell where the first PUSCH is transmitted, whether the cell that the first PUSCH is transmitted is LAA or not and/or the type of the cell that the first PUSCH is transmitted, the profile/index indicated in the uplink grant, etc.).

Figure 16:
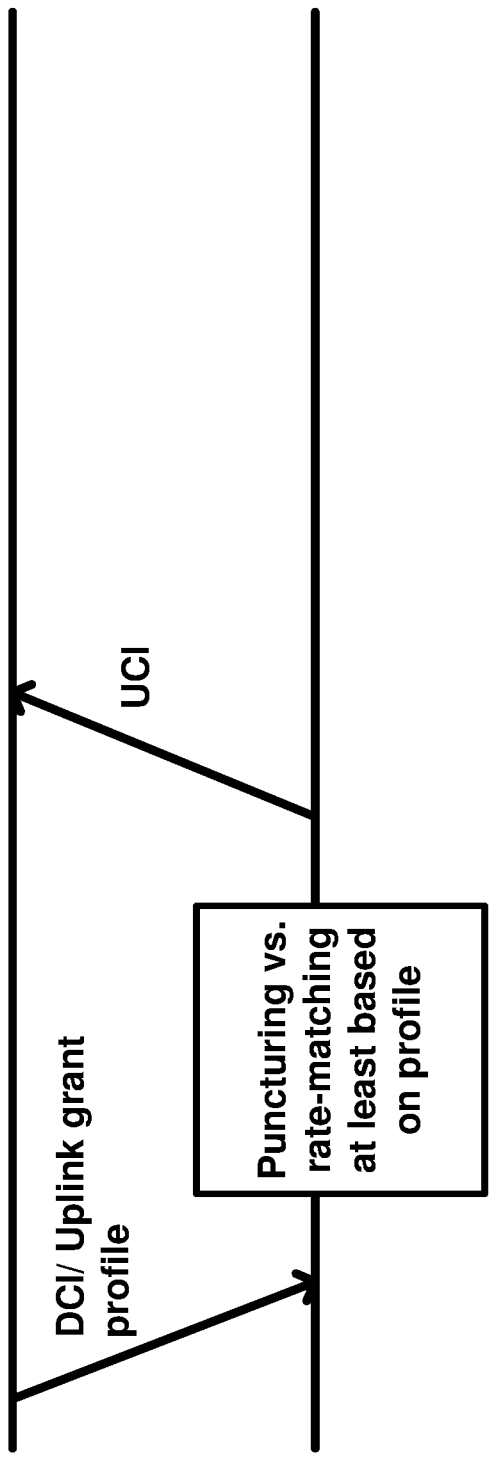
FIG. 16 is an example UCI multiplexing process as per an aspect of an embodiment of the present invention.

In an example embodiment, a wireless device may employ a method comprising receiving a DCI indicating parameters for transmitting at least one TB on a PUSCH. In an example, the parameters may indicate uplink resources for transmission of at least one TB. In an example, the parameters may indicate a profile and/or an index to one of a plurality of profiles. In an example, the profile may indicate at least one first TTI and/or numerology of the PUSCH. In an example, the wireless device may construct the at least one TB employing the parameters. An example process is shown in FIG. 16. In an example, the wireless device may puncture the PUSCH with one or more UCI or rate match the PUSCH around the one or more UCI at least based on the profile and/or the first TTI/numerology. The wireless device may transmit the at least one TB. In an example, the wireless device may rate match the PUSCH around the one or more UCI in response to the first TTI/numerology being one of one or more configured (e.g., RRC configured) and/or pre-configured TTIs/numerologies, otherwise the wireless device may puncture the PUSCH with the one or more UCI. In an example, the wireless device may rate match the PUSCH around the one or more UCI or puncture the PUSCH with the one or more UCI further based on a size of the at least one TB. In an example, the DCI may indicate the size of the at least one TB. In an example, one or more service types (e.g., URLL) may be mappable to the one or more configured/pre-configured TTIs/numerologies. In an example, the one or more UCI may comprise HARQ feedback.

In an example embodiment, a wireless device may receive one or more messages comprising configuration parameters for one or more cells. In an example, the one or more cells may comprise a first cell. In an example, the one or more messages may comprise RRC messages. In an example, the wireless device may receive a downlink control information (DCI). The wireless device may receive the DCI in a downlink control channel, e.g., PDCCH/EPDCCH. The DCI may indicate parameters for transmitting at least one transport blocks (TB) on a first physical uplink shared channel (PUSCH) on the first cell. In an example, the transmission parameters indicated in the DCI for the at least one TB may include HARQ related parameters, power control related parameters, modulation and coding scheme (MCS), resource allocation parameters, etc. In an example, the transmission parameters may indicate uplink resources for transmission of the at least one TB. In an example, the DCI may indicate HARQ process ID for the at least one TB. In an example, the HARQ process ID for the at least one TB may be derived by the wireless device for example based on the uplink resources for transmission of the at least one TB. In an example, DCI may indicate a transmission timing for the at least one TB. In an example, the time granularity for determining the time between the DCI and the PUSCH may be based on the numerology of the PUSCH. In an example, the parameters indicated in the DCI for transmission of the at least one TB may comprise a profile and/or index. In an example, RRC may configure a plurality of profiles for the wireless device. A profile in the plurality of profiles may comprise a numerology and/or TTI and/or one or more power-related parameters and/or service type of the at least one TB and/or one or more logical channels that may be included in the at least one TB and/or other parameters. In an example, the DCI for transmission of the at least one TB may indicate an index to a first profile in the plurality of profiles. At least some of the parameters indicated by the first profile may be visible to the MAC layer. For example, a first numerology and/or a first TTI and/or a first service type and/or the logical channels for including in the at least one TB that are indicated by the first profile may be visible to the MAC layer. In an example, the first profile index may be visible to the MAC layer and the parameters in the first profile may be known by the MAC layer by knowing the first profile index. In an example, the wireless device may transmit the at least one TB on a PUSCH with numerology and/or TTI and/or considering other parameters indicated in the DCI and/or the first profile.

In an example embodiment, the wireless device may multiplex one or more UCI on the first PUSCH and/or transmit on a PUCCH. In an example, the one or more UCI may comprise HARQ feedback. In an example, the one or more UCI may comprise periodic and/or aperiodic CSI and/or SR, etc. In an example, the wireless device may be capable of transmitting both PUSCH and PUCCH simultaneously. In an example embodiment, the wireless device may multiplex up to a first number and/or size of the one or more UCI (e.g., HARQ feedback) on the first PUSCH. In an example, the wireless device may puncture up to a first number and/or size of the one or more UCI (e.g., HARQ feedback) on the first PUSCH. In an example, the first number/size may be indicated by the uplink grant DCI. In an example, the uplink grant DCI may comprise a field, the value of the field may indicate the first number/size. In an example, the first number/size may be configured (e.g., with RRC configuration) for the wireless device. In an example, a mapping between a size of the at least one TB and the number/size for UCI multiplexing (e.g., puncturing) may be configured (e.g., with RRC configuration) for the wireless device and the wireless device may determine the first size/number for UCI multiplexing (e.g., puncturing) based on a size of the at least one TB (e.g., indicated by the uplink grant DCI). In an example, a plurality of sizes/numbers may be configured (e.g., with RRC configuration) for the wireless device and the DCI may indicate a number/size among the plurality of numbers/sizes. In an example, the uplink grant DCI may comprise a field and the value of the field may indicate an index to one of the plurality of the numbers/sizes for UCI multiplexing, the plurality of numbers/sizes being configured (e.g., with RRC configuration) for the wireless device.

In an example embodiment, the wireless device may transmit some remaining UCI of the one or more UCI on the PUCCH. In an example, the wireless device may transmit/multiplex first remaining UCI on a second PUSCH different from the first PUSCH and second remaining UCI on the PUCCH. In an example, the wireless device may ignore transmitting/multiplexing some remaining one or more UCI. In an example, the wireless device may ignore transmitting/multiplexing some remaining one or more UCI in response to the first number/size indicated to the wireless device having a first value. In an example, the wireless device may ignore transmitting/multiplexing some remaining one or more UCI in response to the wireless device not being capable of simultaneous PUSCH and PUCCH transmission and/or the first number/size indicated to the wireless device having a first value.

Figure 17:
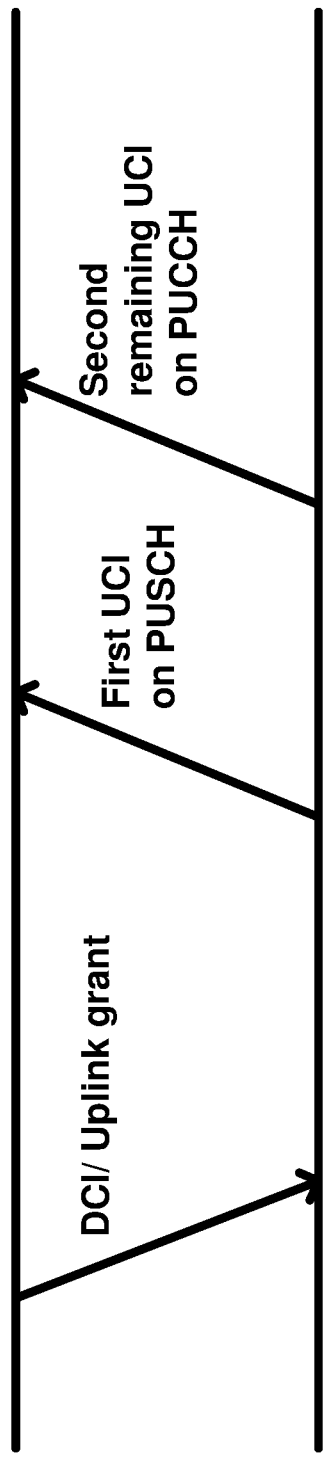
FIG. 17 is an example UCI multiplexing process as per an aspect of an embodiment of the present invention.

In an example embodiment, a wireless device may employ a method comprising receiving a DCI indicating parameters for transmitting at least one TB on a PUSCH. In an example, the wireless device may multiples a first number/size of UC (e.g., puncture the PUSCH with up to a first number/size of UCI. In an example, the first number/size may be RRC configured. In an example, the first/size may be pre-configured. In an example, the first number/size may be indicated in the DCI. In an example, a plurality of numbers/sizes may be configured and the DCI may indicate a number/size in the plurality of numbers/sizes. In an example, the wireless device may transmit a remaining number/size of the UCI using a PUCCH. An example process is shown in FIG. 17. In an example, the grant size may be indicated in the DCI.

In legacy UCI multiplexing procedure, one or more offset parameters may be configured for a wireless device. The one or more offset parameters may be employed by the wireless device for its UCI multiplexing procedures. For example, the one or more offset parameters may be employed by the wireless device to determine number of coded modulation symbols and/or coding/coding rates and/or resources associated with one or more UCI multiplexed in PUSCH. The one or more offset parameters are semi-statically configured and are independent of the characteristics of PUSCH (e.g., QoS requirements, service type, etc.). There is a need to improve the flexibility for indication of the one or more first parameters. Example embodiments enhance the processes for indicating the one or more first parameters for dynamic grants and/or grants activating the periodic resource allocation.

In an example embodiment, a wireless device may receive one or more messages comprising configuration parameters for one or more cells. In an example, the one or more cells may comprise a first cell. In an example, the one or more messages may comprise RRC messages. In an example, the one or more messages may comprise configuration parameters for a periodic resource allocation. In an example, the periodic resource allocation may comprise semi-persistent scheduling (SPS). In an example, the periodic resource allocation may comprise grant-free (GF) resource allocation. In an example, the configuration parameters for the periodic resource allocation may comprise a period and/or scheduling interval. In an example, the one or messages may comprise one or more first parameters (e.g., one or more first offset parameters) for determining resources for multiplexing one or more uplink control information (UCI) in a PUSCH. In an example, the one or more UCI may comprise HARQ feedback and/or rank indicator and/or precoding matrix indicator and/or other uplink control information. In an example, the one or more first parameters may be employed by the wireless device to determine a number of coded modulation symbols and/or a coding rate corresponding to the one or more uplink control information. In an example, the one or more first parameters may correspond to a first type and/or configuration of PUSCH. In an example, the first type of PUSCH may correspond to the periodic resource allocation.

In an example, the wireless device may receive a downlink control information (DCI). The wireless device may receive the DCI in a downlink control channel, e.g., PDCCH/EPDCCH. The DCI may indicate parameters for transmitting at least one transport blocks (TB) on a first physical uplink shared channel (PUSCH) on the first cell. In an example, the transmission parameters indicated in the DCI for the at least one TB may include HARQ related parameters, power control related parameters, modulation and coding scheme (MCS), resource allocation parameters, etc. In an example, the transmission parameters may indicate uplink resources for transmission of the at least one TB. In an example, the DCI may indicate HARQ process ID for the at least one TB. In an example, the HARQ process ID for the at least one TB may be derived by the wireless device for example based on the uplink resources for transmission of the at least one TB. In an example, DCI may indicate a transmission timing for the at least one TB. In an example, the time granularity for determining the time between the DCI and the PUSCH may be based on the numerology of the PUSCH. In an example, the parameters indicated in the DCI for transmission of the at least one TB may comprise a profile and/or index. In an example, RRC may configure a plurality of profiles for the wireless device. A profile in the plurality of profiles may comprise a numerology and/or TTI and/or one or more power-related parameters and/or service type of the at least one TB and/or one or more logical channels that may be included in the at least one TB and/or other parameters. In an example, the DCI for transmission of the at least one TB may indicate an index to a first profile in the plurality of profiles. At least some of the parameters indicated by the first profile may be visible to the MAC layer. For example, a first numerology and/or a first TTI and/or a first service type and/or the logical channels for including in the at least one TB that are indicated by the first profile may be visible to the MAC layer. In an example, the first profile index may be visible to the MAC layer and the parameters in the first profile may be known by the MAC layer by knowing the first profile index. In an example, the wireless device may transmit the at least one TB on a PUSCH with numerology and/or TTI and/or considering other parameters indicated in the DCI and/or the first profile.

In an embodiment, the first DCI may indicate activation of the periodic resource allocation, wherein the periodic resource allocation may be configured by the one or more messages. In an example, the first DCI may correspond to a dynamic uplink grant (e.g., not corresponding to the periodic resource allocation).

In an example, in response to the first DCI corresponding to the periodic resource allocation, the wireless device may multiplex the one or more UCI (e.g., HARQ feedback, etc.) employing the one or more first parameters indicated in the one or more messages. In an example, in response to the first DCI corresponding to the periodic resource allocation, the wireless device may determine resources for multiplexing the one or more UCIs in the first PUSH and/or determine the number of coded modulation symbols and/or the coding rate corresponding to the one or more UCI employing the one or more first parameters indicated in the one or more messages. In an example, in response to the first DCI corresponding to a dynamic grant and/or in response to the first DCI not corresponding to the periodic resource allocation, the wireless device may multiplex the one or more UCI (e.g., HARQ feedback, etc.) in the first PUSCH without employing the one or more first parameters indicated in the one or more messages. In an example, in response to the first DCI corresponding to a dynamic grant and/or in response to the first DCI not corresponding to the periodic resource allocation, the wireless device may determine resources for multiplexing the one or more UCIs in the first PUSH and/or determine the number of coded modulation symbols and/or the coding rate corresponding to the one or more UCI without employing the one or more first parameters indicated in the one or more messages.

In an example embodiment, a DCI indicating a dynamic uplink grant may indicate the one or more first parameter. The one or more first parameters indicated in the DCI may be employed by the wireless device for determining resources for multiplexing one or more uplink control information (UCI) in a PUSCH. In an example, the one or more UCI may comprise HARQ feedback and/or rank indicator and/or precoding matrix indicator and/or other uplink control information. In an example, the one or more first parameters may be employed by the wireless device to determine a number of coded modulation symbols and/or a coding rate corresponding to the one or more uplink control information.

In an example embodiment, in response to the first DCI corresponding to the periodic resource allocation, the wireless device may multiplex the one or more UCI (e.g., HARQ feedback, etc.) in the first PUSCH employing at least one of the one or more parameters in a most recent DCI (e.g., DCI indicating the most recent dynamic uplink grant). In an example, in response to the first DCI corresponding to the periodic resource allocation, the wireless device may determine resources for multiplexing the one or more UCIs in the first PUSH and/or determine the number of coded modulation symbols and/or the coding rate corresponding to the one or more UCI employing at least one of the one or more parameters in a most recent DCI (e.g., DCI indicating the most recent dynamic uplink grant).

Figure 18:
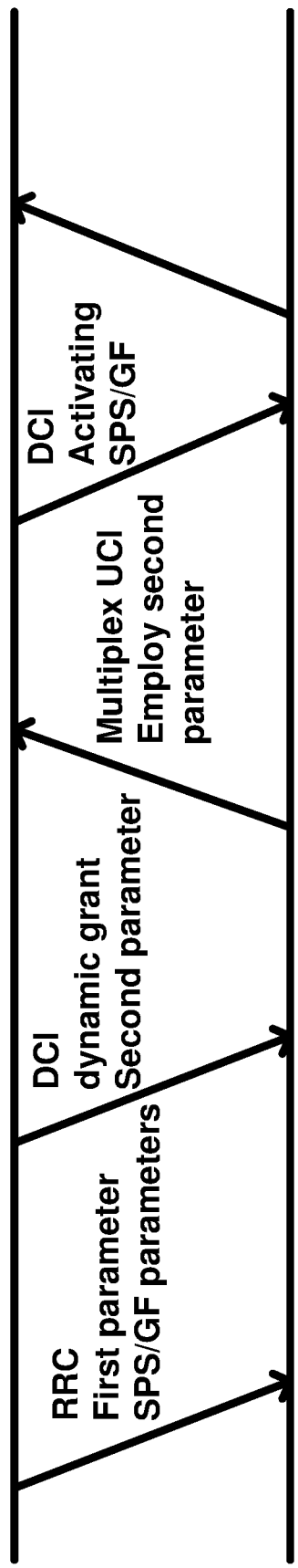
FIG. 18 is an example UCI multiplexing process as per an aspect of an embodiment of the present invention.

In an example embodiment, a wireless device may employ a method comprising receiving one or more messages. The one or more messages may comprise configuration parameters for a periodic resource allocation. In an example, the one or more messages may comprise a first parameter for determining resources for multiplexing one or more UCI in a first typ. PUSCH. In an example, the first type PUSCH may correspond to the periodic resource allocation. In an example, the wireless device may receive a DCI indicating parameters for transmitting at least one TB in a first PUSCH. In an example, the wireless device may multiplex, in response to the first PUSCH being the first type PUSCH, the one or more UCI in the first PUSCH employing the first parameter. Otherwise, in an example, the wireless device may multiplex the one or more UCI in the first PUSCH without employing the first parameter. In an example, the wireless device may transmit the at least one TB. In an example, the periodic resource allocation may be semi-persistent scheduling. In an example, the periodic resource allocation may be grant-free resource allocation. In an example, the first parameter may be an offset parameter used to determine a number of coded modulation symbols and/or a coding rate. In an example, the one or more UCI may comprise HARQ feedback. An example process is shown in FIG. 18.

The legacy procedure for data multiplexing employ a skipping parameter to skip an uplink grant in response to the skipping parameter being configured and the wireless device having no data to transmit. The wireless device may skip an uplink grant even if the wireless device has one or more UCI (e.g., HARQ feedback) to transmit. With the base station indicating to a wireless device to transmit/multiplex one or more UCI (e.g., HARQ feedback), the legacy procedure for skipping may lead to inefficient performance. There is a need to enhance the legacy skipping procedures. Example embodiments enhance the skipping process and the behavior of wireless device in response to base station requesting one or more UCI (e.g., HARQ feedback) in an uplink grant.

In an example embodiment, a wireless device may receive one or more messages comprising configuration parameters for one or more cells. In an example, the one or more cells may comprise a first cell. In an example, the one or more messages may comprise RRC messages. In an example, the one or more messages may comprise one or more skipping parameters. In an example, the one or more skipping parameters may indicate skipping transmission of a TB in response to one or more conditions. In an example, the skipping parameter may indicate skipping generating a media access control (MAC) protocol data unit (PDU) in response to one or more conditions. In an example, the one or more conditions may comprise the wireless device receiving an uplink grant and the wireless device having not having data for transmission.

In an example, the wireless device may receive a downlink control information (DCI). The wireless device may receive the DCI in a downlink control channel, e.g., PDCCH/EPDCCH. The DCI may indicate parameters for transmitting at least one transport blocks (TB) on a first physical uplink shared channel (PUSCH) on the first cell. In an example, the transmission parameters indicated in the DCI for the at least one TB may include HARQ related parameters, power control related parameters, modulation and coding scheme (MCS), resource allocation parameters, etc. In an example, the transmission parameters may indicate uplink resources for transmission of the at least one TB. In an example, the DCI may indicate HARQ process ID for the at least one TB. In an example, the HARQ process ID for the at least one TB may be derived by the wireless device for example based on the uplink resources for transmission of the at least one TB. In an example, DCI may indicate a transmission timing for the at least one TB. In an example, the time granularity for determining the time between the DCI and the PUSCH may be based on the numerology of the PUSCH. In an example, the parameters indicated in the DCI for transmission of the at least one TB may comprise a profile and/or index. In an example, RRC may configure a plurality of profiles for the wireless device. A profile in the plurality of profiles may comprise a numerology and/or TTI and/or one or more power-related parameters and/or service type of the at least one TB and/or one or more logical channels that may be included in the at least one TB and/or other parameters. In an example, the DCI for transmission of the at least one TB may indicate an index to a first profile in the plurality of profiles. At least some of the parameters indicated by the first profile may be visible to the MAC layer. For example, a first numerology and/or a first TTI and/or a first service type and/or the logical channels for including in the at least one TB that are indicated by the first profile may be visible to the MAC layer. In an example, the first profile index may be visible to the MAC layer and the parameters in the first profile may be known by the MAC layer by knowing the first profile index. In an example, the wireless device may transmit the at least one TB on a PUSCH with numerology and/or TTI and/or considering other parameters indicated in the DCI and/or the first profile.

In an example embodiment, a multiplexing and assembly entity in the wireless device may ignore the skipping parameter and may create a MAC PDU in response to the DCI scheduling the first PUSCH indicating one or more first parameters for multiplexing one or more HARQ feedback in the first PUSCH. In an example, the one or more first parameters in the DCI may nay indicate resources for transmission of HARQ feedback. In an example, the one or more first parameters may indicate one or more second parameters for multiplexing one or more UCI (e.g., HARQ feedback) in the first PUSCH. In an example, the one or more second parameters may be employed by the wireless device for determining the resources for multiplexing one or more UCI (e.g., HARQ feedback) in the first PUSCH. In an example, the one or more second parameters may be employed by the wireless device to determine a number of coded modulation symbols and/or a coding rate corresponding to the one or more UCI (e.g., HARQ feedback).

In an example embodiment, a wireless device may employ a method comprising receiving one or more messages comprising configuration parameters. In an example, the configuration parameters may comprise a skipping parameter. In an example, the wireless device may receive a DCI comprising transmission parameters for at least one TB on a PUSCH. In an example, the wireless device may ignore the skipping parameter in response to the DCI comprising one or more first parameters for multiplexing one or more HARQ feedback in the PUSCH. In an example, in response to having no data to transmit, the wireless device may determine whether to skip an uplink grant based on a parameter indicated by the RRC (e.g., the skipping parameter) and one or more parameters indicated by a DCI (e.g., the DCI indicating the uplink grant). In an example, the wireless device may transmit the at least TB. In an example, the skipping parameter may indicate skipping generating a MAC PDCU in response to the wireless device having no data to transmit. In an example, the one or more first parameters may indicate resources for transmission of HARQ feedback. In an example, the one or more first parameters may be employed by the wireless device to determine resources for UCI multiplexing in the PUSCH. In an example, the one or more first parameters may be employed by the wireless device to determine a number of coded modulation symbols and/or coding rate for the UCI.

In an example, a wireless device may multiplex uplink control information (UCI) in an uplink data channel and may transmit the UCI with a transport block. In an example, a wireless device may transmit UCI via uplink control channel. The number of resources for transmission of the uplink control information via the uplink data channel are determined based on one or more offset parameters. When the UCI is multiplexed in the uplink data channel and transmitted with a transport block, it may have some impact on decoding performance of the transport block at the base station depending on the number of resources. For example, if a number of resources of the UCI is large, it may increase decoding error of the transport block at the base station.

A base station my assign uplink radio resources to one or more wireless devices using dynamic grants or configured grants (periodic resource allocation). In the legacy procedures, a base station transmits to a wireless device the one or more offset parameters using the same mechanism for both dynamic grants and configured grants. For example, a base station may transmit one or more RRC messages comprising the one or more offset parameters that semi-statically configures the one or more offset values for dynamic and configured grants. For example, a base station may transmit one or more downlink control information (physical layer signals) comprising the one or more offset parameters that dynamically configures the one or more offset values for dynamic and configured grants. Implementation of legacy mechanism may reduce uplink signaling overhead and increase uplink decoding error rates when dynamic and configured grants are implemented. There is a need to enhance existing mechanisms for configuration of a number of UCI resources in the uplink data channel and enhance UCI multiplexing in the uplink when dynamic and configured grants are implemented. Example embodiments implement different signaling mechanisms for dynamic grants and configured grants to indicate the one or more offset values. Example embodiments may increase downlink signaling overhead, however example embodiment may decrease uplink decoding errors and therefore increase overall air interface spectral efficiency. Example embodiments implement enhanced signaling mechanisms between a base station and a wireless device to improve uplink spectral efficiency and reduce decoding error rates when dynamic and configured grants are implemented.

Figure 20:
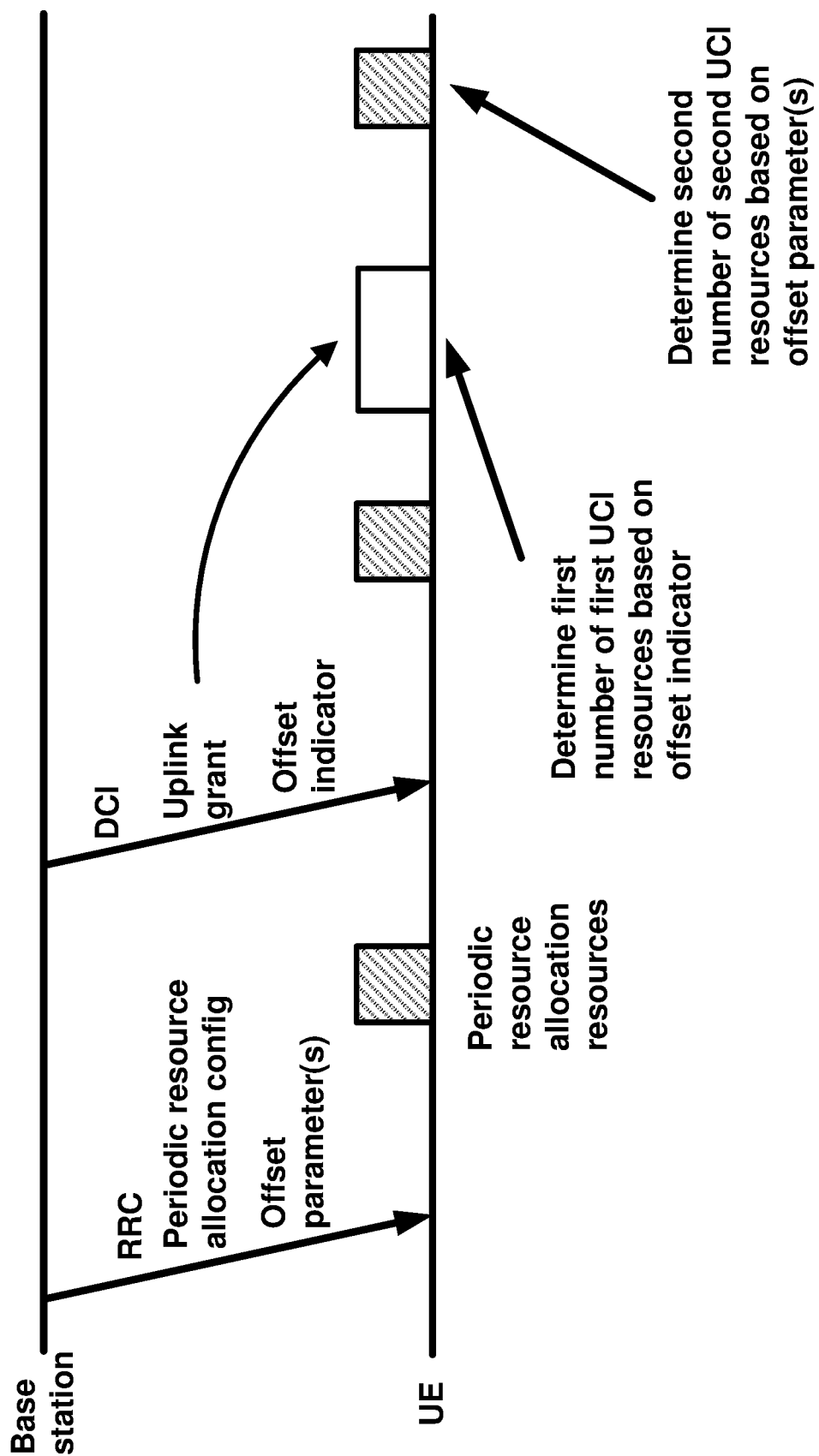
FIG. 20 is an example UCI multiplexing process as per an aspect of an embodiment of the present invention.

In an example embodiment and as shown in FIG. 20, a wireless device may receive one or more messages comprising: configuration parameters for a periodic resource allocation indicating a first plurality of uplink resources of an uplink data channel of a cell; and one or more offset parameters for determining a number of uplink control information (UCI) resources. The wireless device may receive a downlink control information comprising: an uplink grant indicating uplink radio resources of the uplink data channel of the cell; and an offset indicator value. The wireless device may transmit a first transport block and one or more first UCI via the uplink radio resources of the uplink data channel of the cell, wherein: the uplink radio resources comprise first resources of the one or more first UCI; and a first number of the first resources are determined based on the offset indicator value. The wireless device may transmit a second transport block and one or more second UCI via one of the first plurality of uplink resources of the uplink data channel of the cell, wherein: the one of the first plurality of uplink resources comprise second resources of the one or more second UCI; and a second number of the second resources are determined based on the one or more offset parameters.

In an example, the one or more first UCI may comprise one or more first hybrid automatic repeat request (HARQ) feedback information. In an example, the one or more second UCI may comprise one or more second HARQ feedback information. In an example, the one or more first HARQ feedback may be for one or more first downlink transmissions. In an example, the one or more second HARQ feedback may be for one or more second downlink transmissions. In an example, the one or more first downlink transmissions may correspond to one or more first downlink control information. In an example, the first transport block may be transmitted in a first slot. In an example, one or more first parameters in the one or more first downlink control information may indicate transmission of the one or more first HARQ feedback in the first slot.

In an example, the configuration parameters of the periodic resource allocation may comprise a periodicity parameter. The first plurality of uplink radio resources may be determined based on the periodicity. In an example, the one or more first UCI or the one or more second UCI may be multiplexed in the uplink data channel. In an example, the first plurality of uplink radio resources may correspond to a plurality of configured grants. In an example, the downlink control information may indicate a numerology of the uplink data channel. In an example, the one or more first UCI may be multiplexed in the uplink data channel by rate matching the uplink data channel. In an example, the one or more first UCI may be multiplexed in the uplink data channel by puncturing the uplink data channel. In an example, the one or more second UCI are multiplexed in the uplink data channel by rate matching the uplink data channel. In an example, the one or more second UCI may be multiplexed in the uplink data channel by puncturing the uplink data channel. In an example, the first transport block comprises data from one or more logical channels may be based on a numerology of the uplink data channel.

The skipping procedure enables a wireless device to ignore an uplink grant when the wireless device has not data to transmit. In legacy processes, the wireless may not multiplex UCI in the uplink data channel when an uplink grant is skipped due to lack of data at the wireless for transmission based on the uplink grant. The base station may, using a DCI comprising an uplink grant, dynamically indicate one or more offset to the wireless device to multiplex UCI based on the one or more offset parameters. The UCI (for example comprising HARQ feedback, CSI, etc.) may be critical for network performance and skipping transmission of the UCI may lead to performance degradation including throughput loss and increased latency. Example embodiments enhance the UCI multiplexing processes when a wireless device is configured with skipping.

Figure 21:
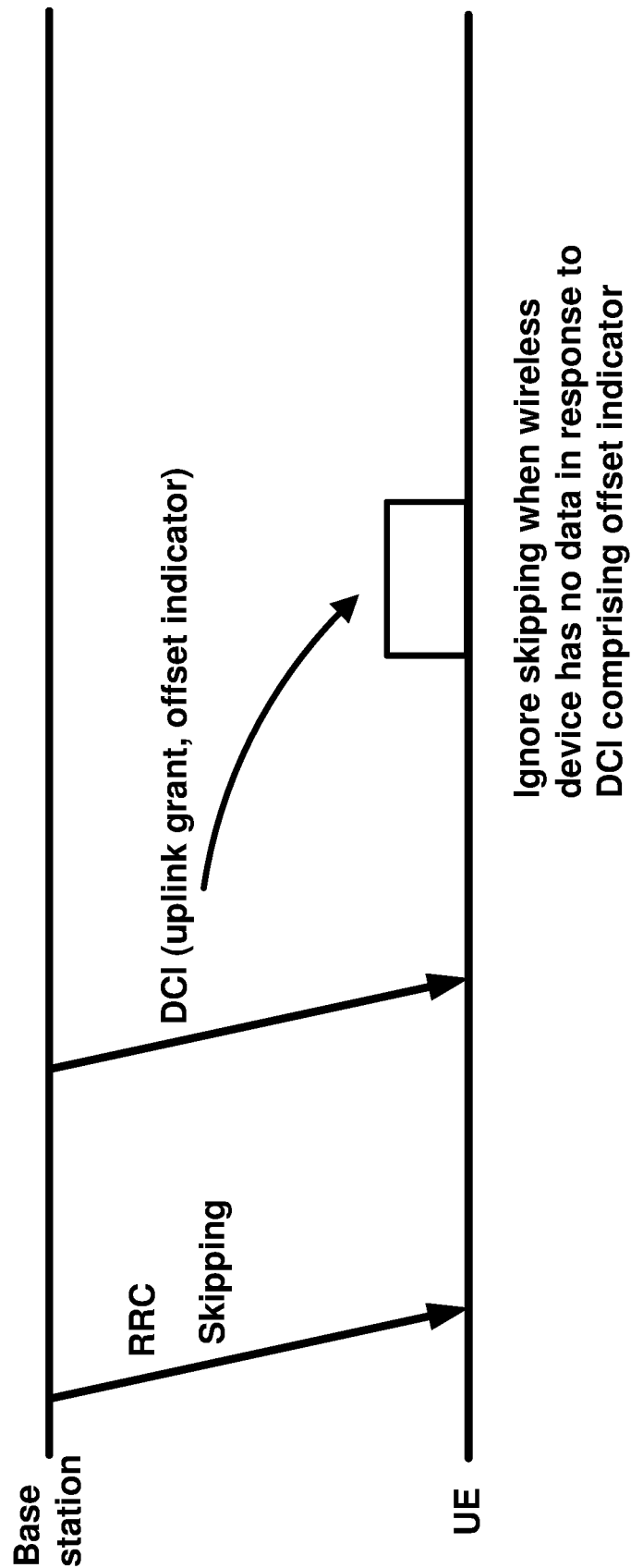
FIG. 21 is an example skipping process as per an aspect of an embodiment of the present invention.

In an example embodiment and as shown in FIG. 21, a wireless device may receive one or more messages comprising configuration parameters comprising a skipping parameter. The wireless device may receive a downlink control information indicating: transmission parameters for transmission of a transport block via an uplink data channel and an offset indicator value for determining a number of resources of one or more uplink control information in the uplink data channel. The wireless device may ignore the skipping parameter when the wireless device has no data for the transport block in response to the downlink control information comprising the offset indicator value. The wireless device may transmit the one or more uplink control information via the uplink data channel. In an example, the skipping parameter may indicate skipping the transmission of the transport block when the wireless device has no data for the transport block. In an example, the one or more uplink control information may comprise one or more hybrid automatic repeat request feedback information. In an example, the ignoring the skipping parameter may comprise creating a medium access control packet. In an example, the one or more uplink control information may be transmitted by puncturing the uplink data channel. In an example, the one or more uplink control information may be transmitted by rate matching the uplink data channel. In an example, the one or more uplink control information may be multiplexed in the uplink data channel based on a multiplexing process based on a size of the uplink control information. In an example, the transmission parameters indicate uplink radio resources for the transmission of the transport block. In an example, the downlink control information indicates a numerology of the uplink data channel. The wireless device may have no data in logical channels that can be transmitted via a transmission duration corresponding to the numerology. In an example, the one or more uplink control information may comprise one or more channel state information. In an example, a transmission time of the transport block is based on the numerology of the uplink data channel.

The uplink control information (UCI) may be multiplexed in uplink data channel and transmitted with a transport block or the UCI transmitted via uplink control channel. When the UCI is multiplexed in the uplink data channel and transmitted with a transport block, it has impact on the decoding performance of the transport block at the base station. For example, if the number of resources of the UCI is large, it may increase the decoding error of the transport block at the base station. The legacy procedures for multiplexing uplink control information do not consider the data content of and/or logical channels multiplexed in the transport block. The legacy procedures also do not consider the numerology/TTI duration corresponding to the uplink data channel or the size of transport block when multiplexing UCI. The transport block may comprise data from logical channels that are QoS sensitive (e.g., ultra-reliable low-latency communication (URLLC) data). The transport block may be transmitted via an uplink data channel that corresponds to a numerology/TTI duration that is used for transmission of QoS sensitive. Also, the size of the transport block may be such that the multiplexed UCI leads to increased decoding error of transport blocks. The legacy procedures lead to increased decoding error performance of the transport blocks at the base station leading to degraded network performance including throughput loss or increased latency. Example embodiments enhance the UCI multiplexing process.

Figure 24:
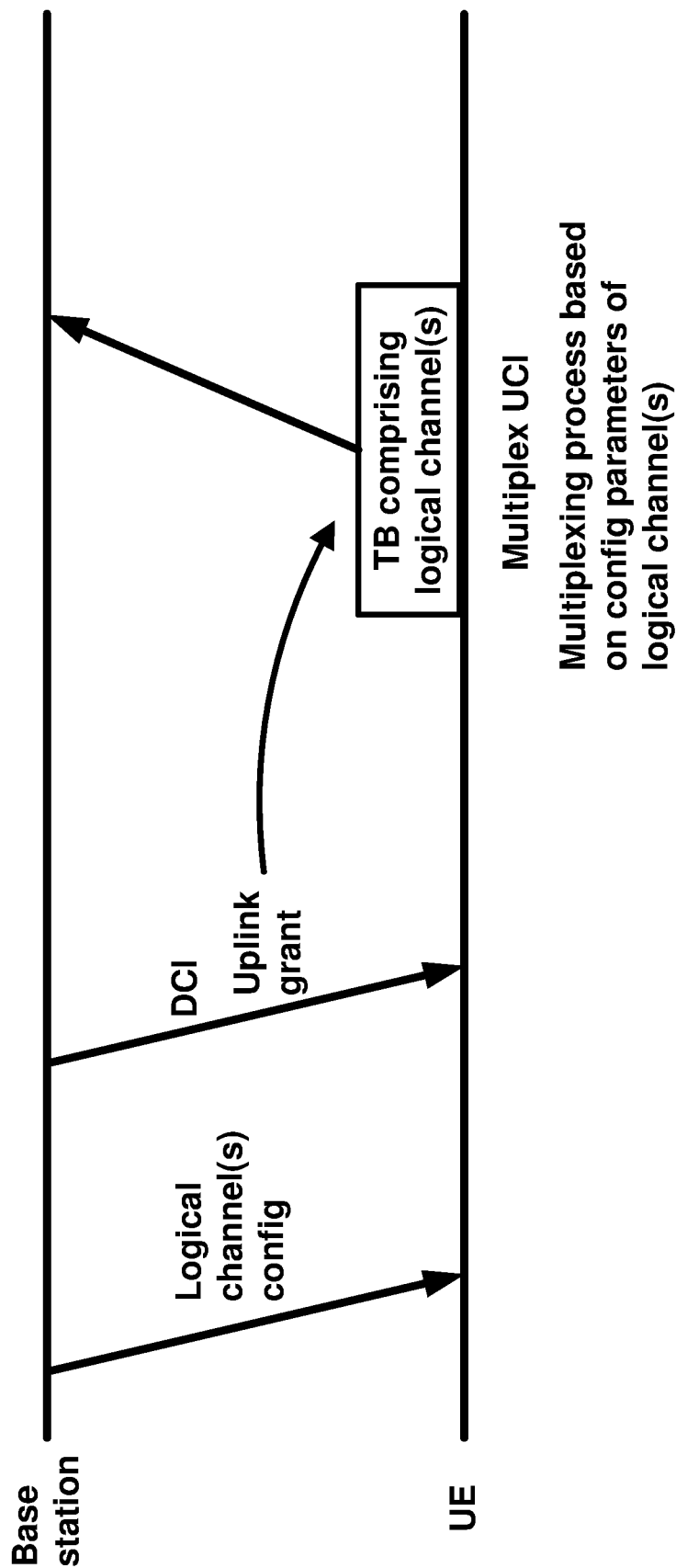
FIG. 24 is an example UCI multiplexing process as per an aspect of an embodiment of the present invention.

In an example embodiment and as shown in FIG. 24, a wireless device may receive one or more messages comprising configuration parameters of one or more logical channels. The wireless device may select a multiplexing process for transmitting uplink control information via an uplink channel employed for transmission of a transport block, wherein: the transport block comprises data of the one or more logical channels; and the selecting is based on the configuration parameters of the one or more logical channels. In an example, the wireless device may multiplex the uplink control information in the uplink channel employing the multiplexing process. The wireless device may transmit the transport block and the uplink control information via the uplink channel. In an example, the one or more logical channels may correspond to one or more service types. In an example, the one or more service types may comprise ultra-reliable low-latency communications. In an example, the wireless device may receive a downlink control information indicating transmission parameters of the transport block. In an example, the downlink control information may indicate a numerology of the uplink channel; and the configuration parameters of the one or more logical channels may indicate that data of the one or more logical channels can be transmitted via a transmission duration corresponding to the numerology. In an example, the downlink control information may indicate a time domain resource assignment; a transmission time of the transport block may be based on the time domain resource assignment and a numerology of the uplink channel. In an example, the multiplexing process is selected from a plurality of multiplexing processes comprising: a rate matching of the uplink channel and a puncturing of the uplink channel. In an example, the configuration parameters of the one or more logical channels may indicate one or more first transmission durations; and data of the one or more logical channels may be transmitted employing uplink grants that result in a transmission duration shorter than or equal to the one or more first transmission durations. In an example, the configuration parameters of the one or more logical channels may comprise one or more logical channel identifiers. In an example, the configuration parameters of the one or more logical channels may indicate one or more priorities. In an example, the uplink control information may comprise one or more hybrid automatic repeat request feedback.

Figure 25:
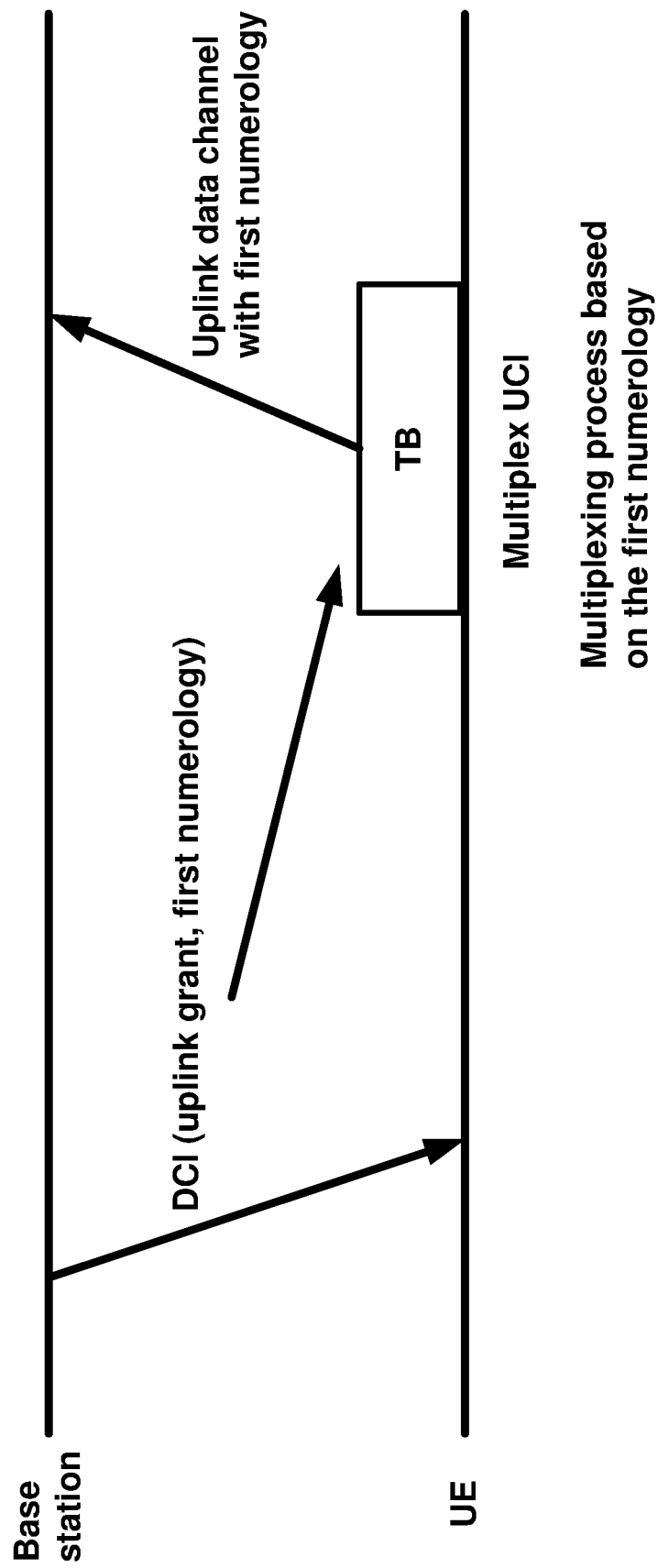
FIG. 25 is an example UCI multiplexing process as per an aspect of an embodiment of the present invention.

In an example embodiment and as shown in FIG. 25, a wireless device may receive a a downlink control information for transmission of a transport block via an uplink data channel, wherein the downlink control information indicates a first numerology of the uplink data channel. The wireless device may select, based on the first numerology, a multiplexing process for transmitting uplink control information via the uplink data channel employed for transmission of the transport block. The wireless device may multiplex the uplink control information in the uplink data channel employing the multiplexing process. In an example, the multiplexing process may be based on a first transmission time interval corresponding to the first numerology. In an example, the multiplexing process may be based on one or more logical channels that can be transmitted employing uplink grants that result in a transmission duration that is smaller than or equal to the first transmission duration. In an example, the multiplexing process may be based on whether the one or more logical channels correspond to a first service type. In an example, the first service type may be ultra-reliable low-latency communications. In an example, the multiplexing process is selected from a plurality of multiplexing processes comprising: a rate matching of the uplink data channel and a puncturing of the uplink data channel. In an example, the wireless device may receive configuration parameters of a plurality of logical channels, wherein the transport block comprises data of one or more logical channels in the plurality of logical channels based on the first numerology.

Figure 26:
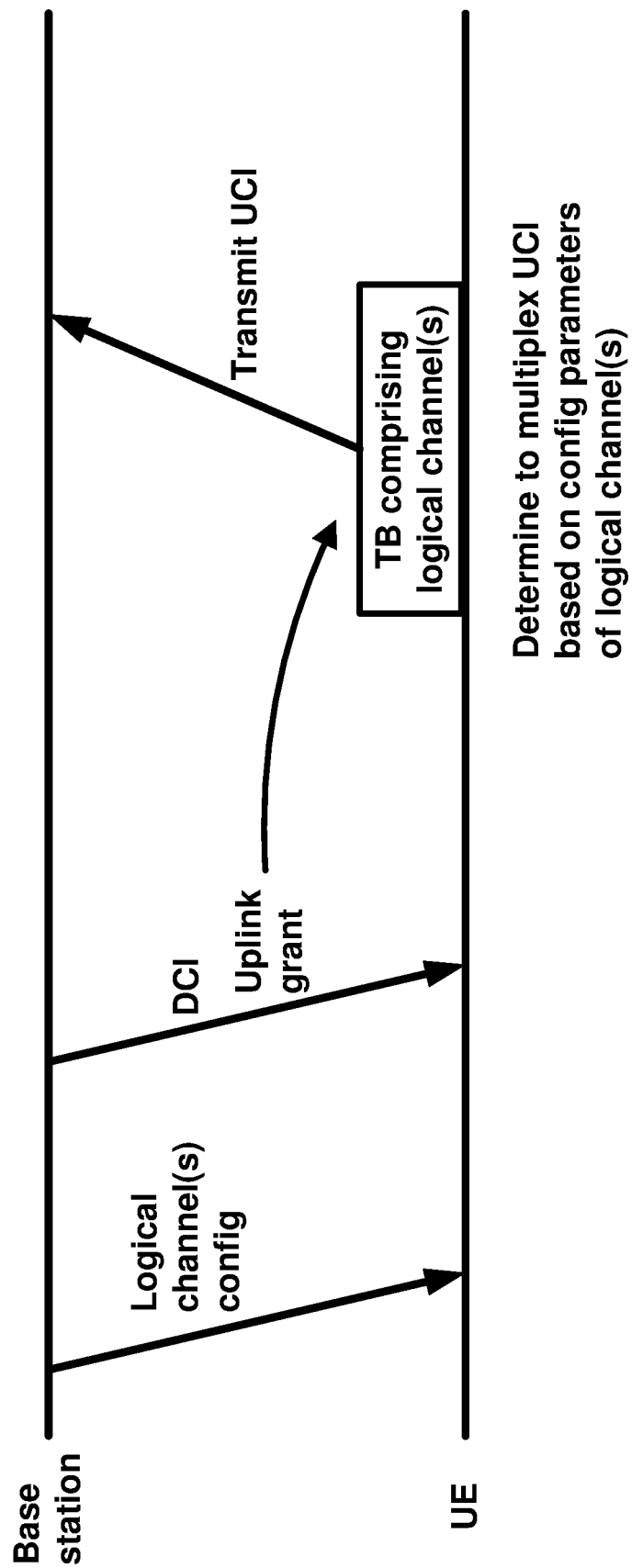
FIG. 26 is an example UCI multiplexing process as per an aspect of an embodiment of the present invention.

In an example embodiment and as shown in FIG. 26, a wireless device may receive one or more messages comprising configuration parameters of one or more logical channels. The wireless device may receive a downlink control information comprising transmission parameters of a transport block for transmission via an uplink channel, wherein the transport block comprises data of the one or more logical channels. The wireless device may determine to multiplex uplink control information in the uplink channel based on the configuration parameters of the one or more logical channels. The wireless device may transmit the uplink control information via the uplink channel based on the determining. In an example, the downlink control information may indicate a numerology. In an example, the configuration parameters of the one or more logical channels may indicate one or more transmission durations. A transmission duration corresponding to the numerology may be shorter than or equal to the one or more transmission durations. In an example, the uplink control information is multiplexed by one of puncturing the uplink channel or rate matching the uplink channel. In an example, the downlink control information may indicate a time domain resource assignment. A transmission time of the transport block may be based on the time domain resource assignment and a numerology of the uplink channel. In an example, the transmission parameters may indicate uplink radio resources for transmission of the transport block. In an example, configuration parameters of the one or more logical channels may comprise one or more logical channel identifiers. In an example, the configuration parameters of the one or more logical channels indicate one or more priorities. In an example, the one or more logical channels may correspond to one or more service types comprising ultra-reliable low-latency communications. In an example, the uplink control information comprise hybrid automatic repeat request feedback. In an example, the determining may be based on whether the one or more logical channels comprise one or more first logical channels.

Figure 27:
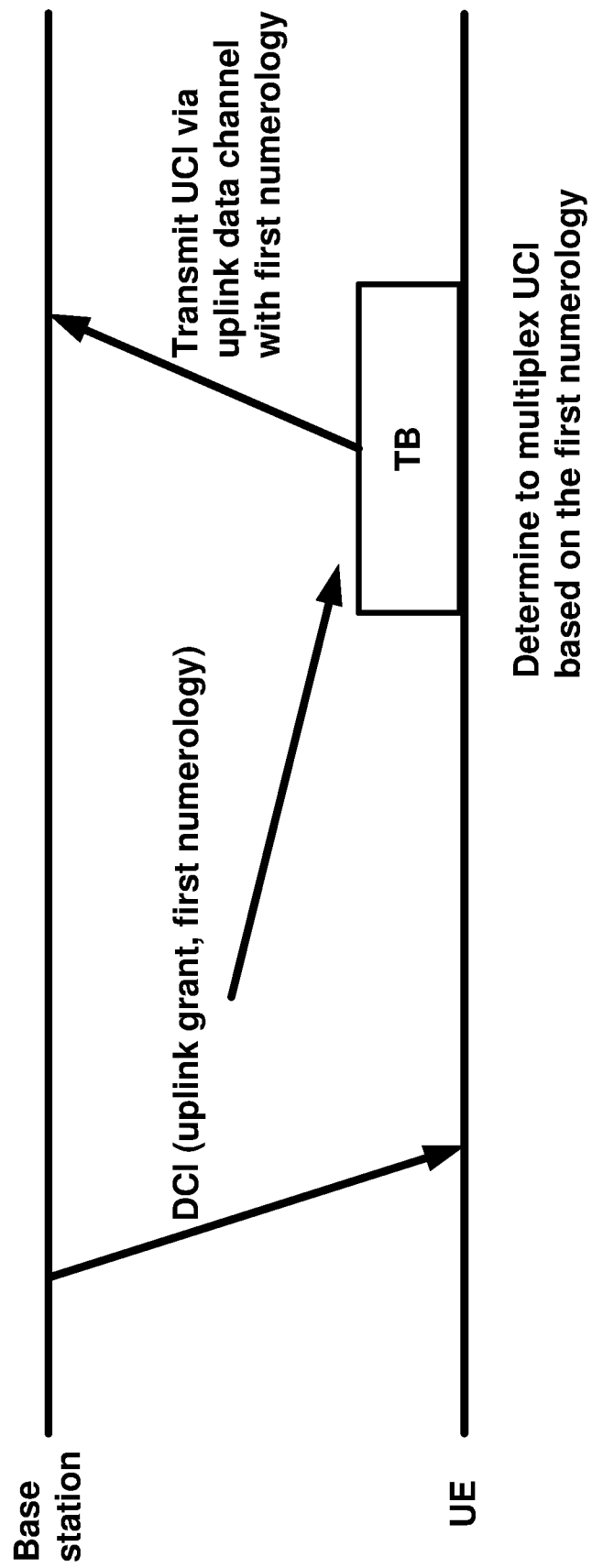
FIG. 27 is an example UCI multiplexing process as per an aspect of an embodiment of the present invention.

In an example embodiment and as shown in FIG. 27, the wireless device may receive a downlink control information for transmission of a transport block via an uplink data channel, wherein the downlink control information indicates a first numerology of the uplink data channel. The wireless device may determine to multiplex uplink control information in the uplink data channel based on the first numerology. The wireless device may transmit the uplink control information via the uplink data channel based on the determining. In an example, the determining may be based on a first transmission time interval corresponding to the first numerology. In an example, the determining may be based on one or more logical channels that can be transmitted employing uplink grants that result in a transmission duration that is smaller than or equal to the first transmission duration. In an example, the determining may be based on whether the one or more logical channels correspond to a first service type. In an example, the first service type is ultra-reliable low-latency communications.

Figure 28:
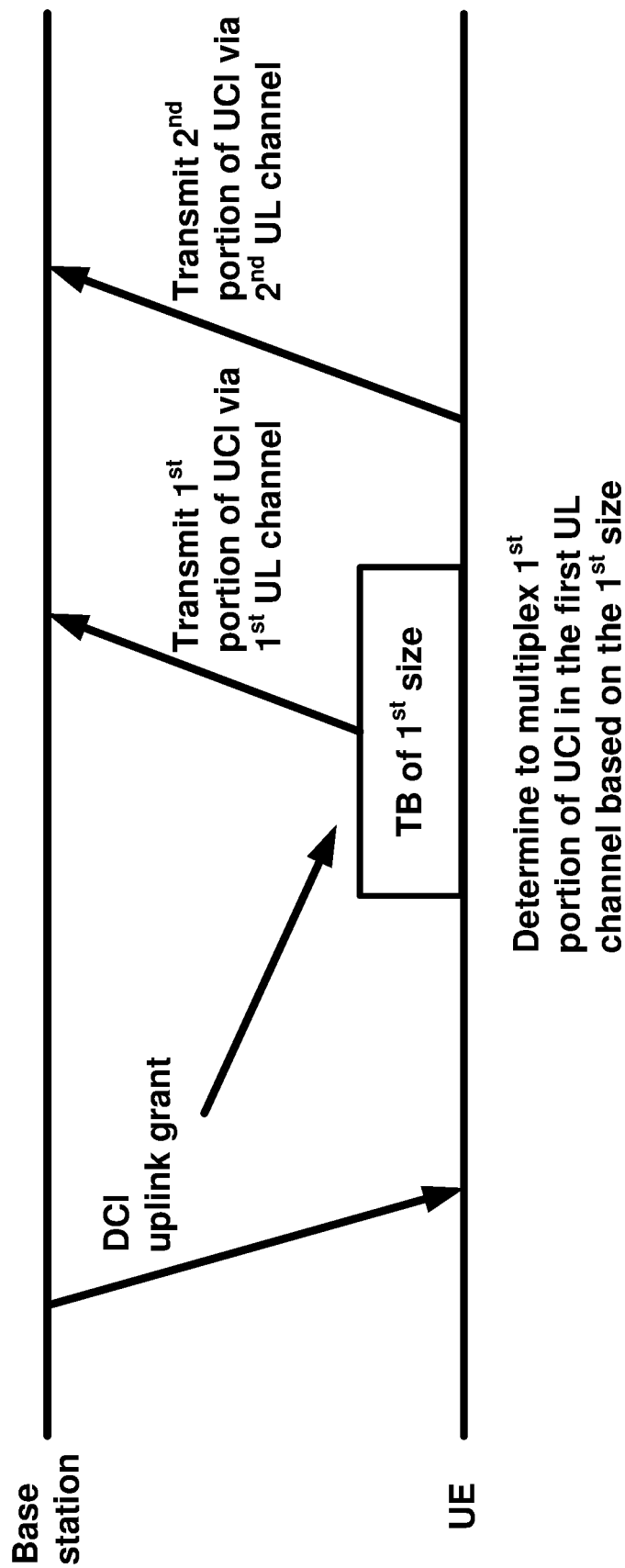
FIG. 28 is an example UCI multiplexing process as per an aspect of an embodiment of the present invention.

In an example embodiment and as shown in FIG. 28, a wireless device may receive a downlink control information comprising transmission parameters for a transport block of a first size for transmission via a first uplink channel. The wireless device may determine to multiplex a first portion of uplink control information in the first uplink channel based on the first size. The wireless device may transmit the first portion of the uplink control information via the first uplink channel based on the determining. The wireless device may transmit a second portion of the uplink control information via a second uplink channel. In an example, the second uplink channel is an uplink control channel. In an example, the second uplink channel is an uplink data channel. In an example, the first portion of the uplink control information is multiplexed in the first uplink channel by one of a plurality of multiplexing processes comprising: puncturing the first uplink channel and rate matching the first uplink channel. In an example, the wireless device may receive one or more configuration parameters indicating simultaneous transmission on the first uplink channel and the second uplink channel. In an example, the second portion of the uplink control information may be a remaining portion of the uplink control information. In an example, the downlink control information may indicate a numerology of the first uplink channel and the transport block comprises data of one or more logical channels based on configuration parameters of the one or more logical channels and the numerology. In an example, the downlink control information indicates a time domain resource assignment and a transmission time of the transport block is based on the time domain resource assignment and a numerology of the first uplink channel. In an example, the transmission parameters indicate uplink radio resources for transmission of the transport block. In an example, the uplink control information may comprise hybrid automatic repeat request feedback information.

In an example, downlink assignments transmitted on the PDCCH/EPDCCH may indicate if there is a transmission on a DL-SCH for a particular MAC entity and provide the relevant HARQ information. In an example, the MAC entity may be configured with a C-RNTI and/or Semi-Persistent Scheduling C-RNTI and/or or Temporary C-RNTI. The MAC entity may monitor PDCCH for a Serving Cell to detect PDCCH candidates associated with its configured RNTIs. In an example there may be one HARQ entity at the MAC entity for a Serving Cell which maintains a number of parallel HARQ processes. A HARQ process may be associated with a HARQ process identifier. The HARQ entity may direct HARQ information and associated TBs received on the DL-SCH to the corresponding HARQ processes.

In an example, to transmit on the UL-SCH, the MAC entity may need a valid uplink grant. The MAC entity may receive the uplink grant dynamically on the PDCCH or in a Random Access Response or the uplink grant may be configured semi-persistently or preallocated by RRC. In an example, the MAC layer may receive HARQ information from lower layers. When the physical layer is configured for uplink spatial multiplexing, the MAC layer may receive at least two grants from lower layers. In an example, there may be one HARQ entity at the MAC entity for a serving cell with configured uplink. The HARQ entity for the serving cell may maintain a number of parallel HARQ processes allowing transmissions to take place continuously while waiting for the HARQ feedback on the successful or unsuccessful reception of previous transmissions.

Figure 19:
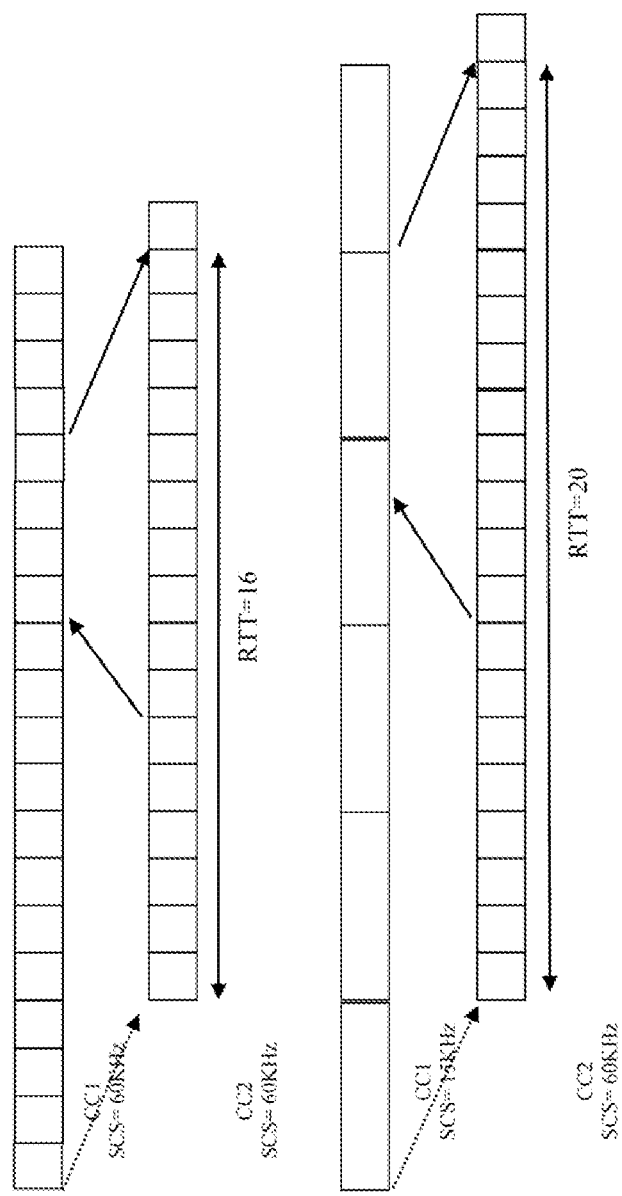
FIG. 19 is an example diagram depicting various numerologies of scheduling and scheduled cell as per an aspect of an embodiment of the present invention.

In an example, for cross-carrier scheduling for carriers with different numerology, there may be an impact on minimum HARQ RTT timing. In an example, the impact may be related to the timing relationship including DCI-to-data and data-to-ACK timing. In an example, if the gNB and UE processing timing is not changed, the minimum HARQ RTT timing may be increased in response to numerology of PDCCH/DCI and/or HARQ-ACK (e.g., in PUCCH or PUSCH) being different from numerology of data (e.g., PDSCH or PUSCH). In an example, the HARQ RTT may increase in response to slot duration of DCI/HARQ-ACK being larger than the slot duration of data. An example scenario is shown in FIG. 19 wherein the HARQ RTT time in cross-carrier scheduling is larger than the self-carrier scheduling. Consequently, the wireless device may be scheduled with a maximum number of HARQ processes while the RTT corresponding to a first scheduled HARQ process and/or all of the scheduled HARQ processes may not be elapsed yet (or a corresponding HARQ RTT timer(s) may be running). The wireless device may not be scheduled with a new uplink/downlink transmission if at least one of the RTTs corresponding to one of the HARQ processes elapses (e.g., the corresponding HARQ RTT timer stops). The legacy procedure for monitoring PDCCH candidates monitoring may lead to increased battery power consumption by the wireless device. There is a need to enhance wireless device PDCCH monitoring process when HARQ RTT is larger than a maximum number of HARQ processes in response to differences in numerologies of scheduling PDCCH and scheduled PDSCH/PUSCH.

The numerology of a scheduling cell/bandwidth part and a scheduled cell/bandwidth part (e.g., for both uplink or downlink scheduling) may be different. Due to the differences in numerologies and subcarrier spacings, the slot lengths/symbol durations of the scheduling cell/bandwidth part and the scheduled cell/bandwidth part can be different. It is possible that all of HARQ processes are scheduled and their corresponding HARQ RTT timer are simultaneously running. The legacy procedures require the wireless device to continue monitoring the control channel even if all of the HARQ processes are currently scheduled. This leads to increased battery power consumption. Example embodiments enhance the control channel monitoring processes.

In an example, a wireless device may receive one or more messages comprising configuration parameters for a plurality of cells. The plurality of cells may comprise a primary cell and one/or more secondary cells. The plurality of cells may comprise a first cell. The one or more messages may comprise a first hybrid automatic repeat request (HARQ) process number. In an example, the first HARQ process number may be a maximum number of HARQ processes. In an example, the first number of HARQ processes may be maximum number of HARQ processes in downlink. In an example, the one or more messages may comprise a second HARQ process number. In an example, the second HARQ process number may be maximum number of HARQ processes in uplink. In an example, the maximum number of HARQ processes may indicate the maximum number of HARQ processes a wireless device may be scheduled during a first duration. In an example, the first duration may be a HARQ round trip time (RTT). The one or more messages may be RRC messages.

In an example, the wireless device may receive a downlink control information (DCI) indicating a downlink assignment for downlink transmission on the first cell. In an example, the DCI/downlink assignment may indicate transmission parameters for at least one transport block. In an example, the at least one transport block may correspond to a HARQ process ID. In an example, the DCI indicating the downlink assignment may indicate the HARQ process ID corresponding to the at least one transport block. In an example, in response to receiving the DCI and/or the downlink transmission, the wireless device may start a HARQ RTT timer corresponding to the HARQ process ID associated with the at least one transport block.

In an example embodiment, a wireless device may receive a plurality of downlink assignment DCIs and/or may receive a plurality of PDSCHs in response to receiving a plurality of downlink assignment DCIs. The wireless device may start a plurality of HARQ RTT timers. In an example, the wireless device may stop monitoring PDCCH/EPDCCH candidates for one or more first radio network temporary identifier (RNTI) in response to a number of running HARQ RTT timers being equal to the first HARQ process number (e.g., maximum number of HARQ processes in downlink). In an example, the one or more first RNTI may comprise a C-RNTI. The one or more first RNTI may comprise one or more other RNTIs. In an example, the number of running HARQ RTT timers may be equal to the first HARQ process number (e.g., maximum number of HARQ processes in downlink) in response to as many as the maximum number of HARQ processes in downlink being scheduled and RTT time corresponding to neither of the HARQ processes being elapsed. In an example embodiment, the wireless device may stop monitoring PDCCH/EPDCCH candidates for the first RNTI in response to as many as the maximum number of HARQ processes in downlink being scheduled and HARQ RTT time corresponding to neither of the HARQ processes being elapsed.

In an example, the wireless device may receive a downlink control information (DCI) indicating an uplink grant for uplink transmission on the first cell. In an example, the DCI/uplink grant may indicate transmission parameters for at least one transport block. In an example, the at least one transport block may correspond to a HARQ process ID. In an example, the DCI indicating the uplink grant may indicate the HARQ process ID corresponding to the at least one transport block. In an example, the HARQ process ID corresponding to the at least one transport block may be derived by the wireless device for example, based on resources used for transmission of the at least one transport block. In an example, in response to the uplink transmission of the at least one transport block, the wireless device may start an uplink HARQ RTT timer corresponding to the HARQ process ID associated with the at least one transport block.

In an example embodiment, the wireless device may stop monitoring PDCCH/EPDCCH candidates for one or more first radio network temporary identifier (RNTI) in response to a number of running uplink HARQ RTT timers being equal to the second HARQ process number (e.g., maximum number of HARQ processes in uplink). In an example, the one more first RNTI may comprise a C-RNTI. The one or more RNTIs may comprise one or more other RNTIs. In an example, the number of running uplink HARQ RTT timers may be equal to the second HARQ process number (e.g., a maximum number of HARQ processes in uplink) in response to as many as the maximum number of HARQ processes in uplink being scheduled and RTT time corresponding to neither of the HARQ processes being elapsed. In an example embodiment, the wireless device may stop monitoring PDCCH/EPDCCH candidates for the first RNTI in response to as many as the maximum number of HARQ processes in uplink being scheduled and RTT time corresponding to neither of the HARQ processes being elapsed. In an example embodiment, the wireless device may stop monitoring PDCCH/EPDCCH candidates for the first RNTI in response to as many as the maximum number of HARQ processes in uplink being scheduled and the wireless device does not receive ACK for any of the scheduled HARQ processes.

In an example embodiment, a wireless device may employ a method comprising receiving one or more messages comprising configuration parameters for a plurality of cells. The plurality of cells may comprise a first cell. In an example, the configuration parameters may comprise a first HARQ process number. In an example, the wireless device may receive one or more DCIs indicating downlink assignment (uplink grant) for a downlink (uplink) transmission on the first cell. The downlink assignment (uplink grant) may correspond to a first HARQ process. The wireless device may start, in response to the downlink (uplink) transmission, a HARQ round trip time (RTT) timer corresponding to the first HARQ process. The wireless device may stop monitoring one or more RNTIs in response to a number of running HARQ RTT timers being equal to the first HARQ process number. In an example, the first HARQ process number may indicate a maximum number of HARQ processes. In an example, the one or more RNTIs may comprise C-RNTI.

Figure 22:
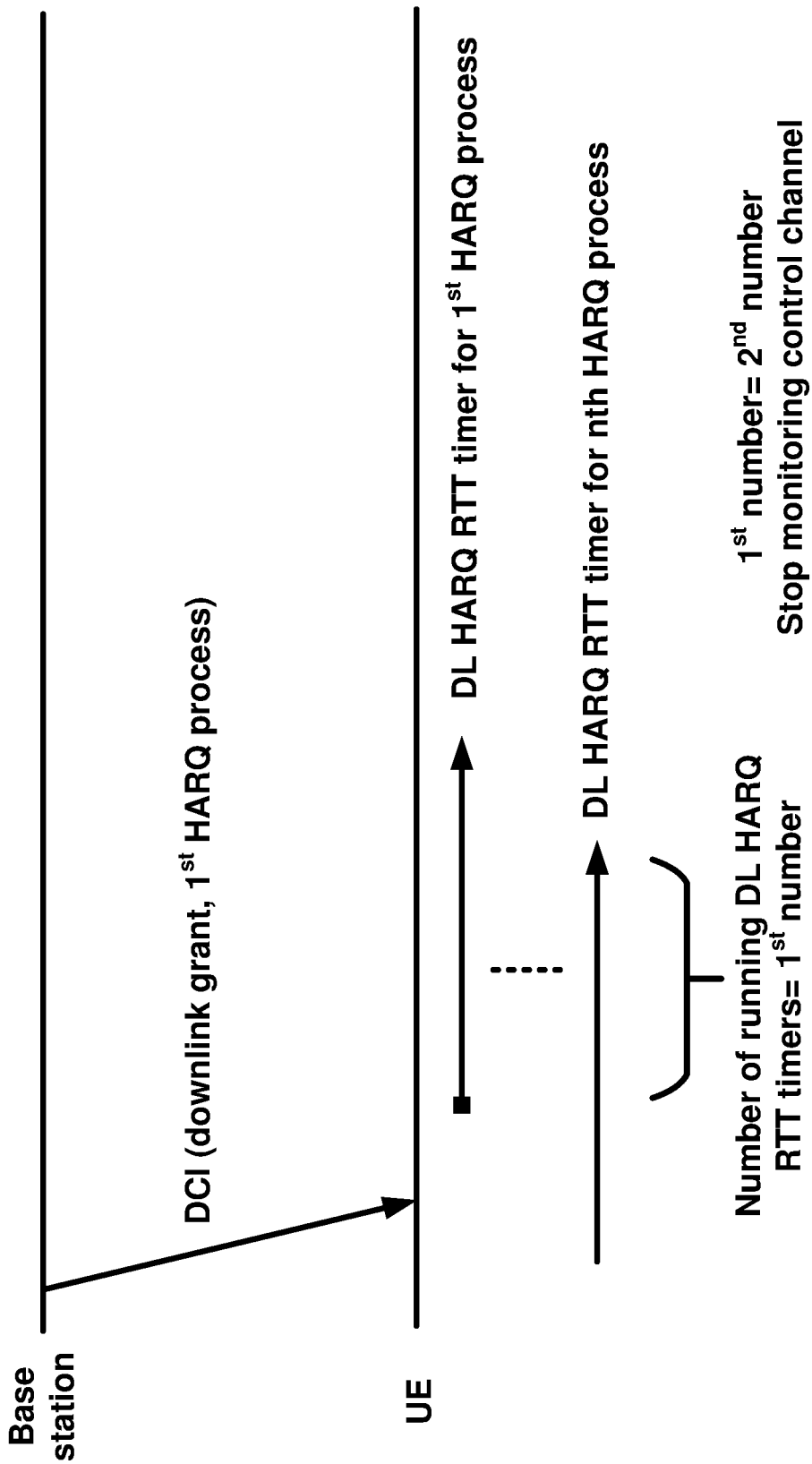
FIG. 22 is an example control channel monitoring as per an aspect of an embodiment of the present invention.

In an example embodiment and as shown in FIG. 22, a wireless device may receive a downlink grant for reception of a transport block associated with a first downlink hybrid automatic repeat request (HARQ) process of a cell. The wireless device may start a downlink HARQ round-trip-time timer of the first downlink HARQ process of the cell in response to receiving the downlink grant, wherein the starting the downlink HARQ round-trip-time timer increases a number of running downlink HARQ round-trip-time timers of downlink HARQ processes of the cell to a first number. The wireless device may stop monitoring a control channel for the cell in response to the first number being equal to a second number. In an example, the wireless device may receive one or more messages comprising configuration parameters of the cell, the one or more messages indicating one or more numerologies. In an example, the one or more messages indicate the second number. In an example, he one or more messages indicate a first radio network identifier. The stopping monitoring the control channel may comprise stopping monitoring the control channel for the first radio network temporary identifier. In an example, the downlink control grant may be received via a downlink control channel associated with a first numerology and the transport block may be received via a downlink data channel associated with a second numerology. In an example, the downlink grant indicates the second numerology. In an example, a first symbol duration associated with the first numerology may be larger than a second symbol duration associated with the second numerology. In an example, the second number may be a maximum number of downlink HARQ processes of the cell. In an example, the downlink grant may indicate the first downlink HARQ process.

Figure 23:
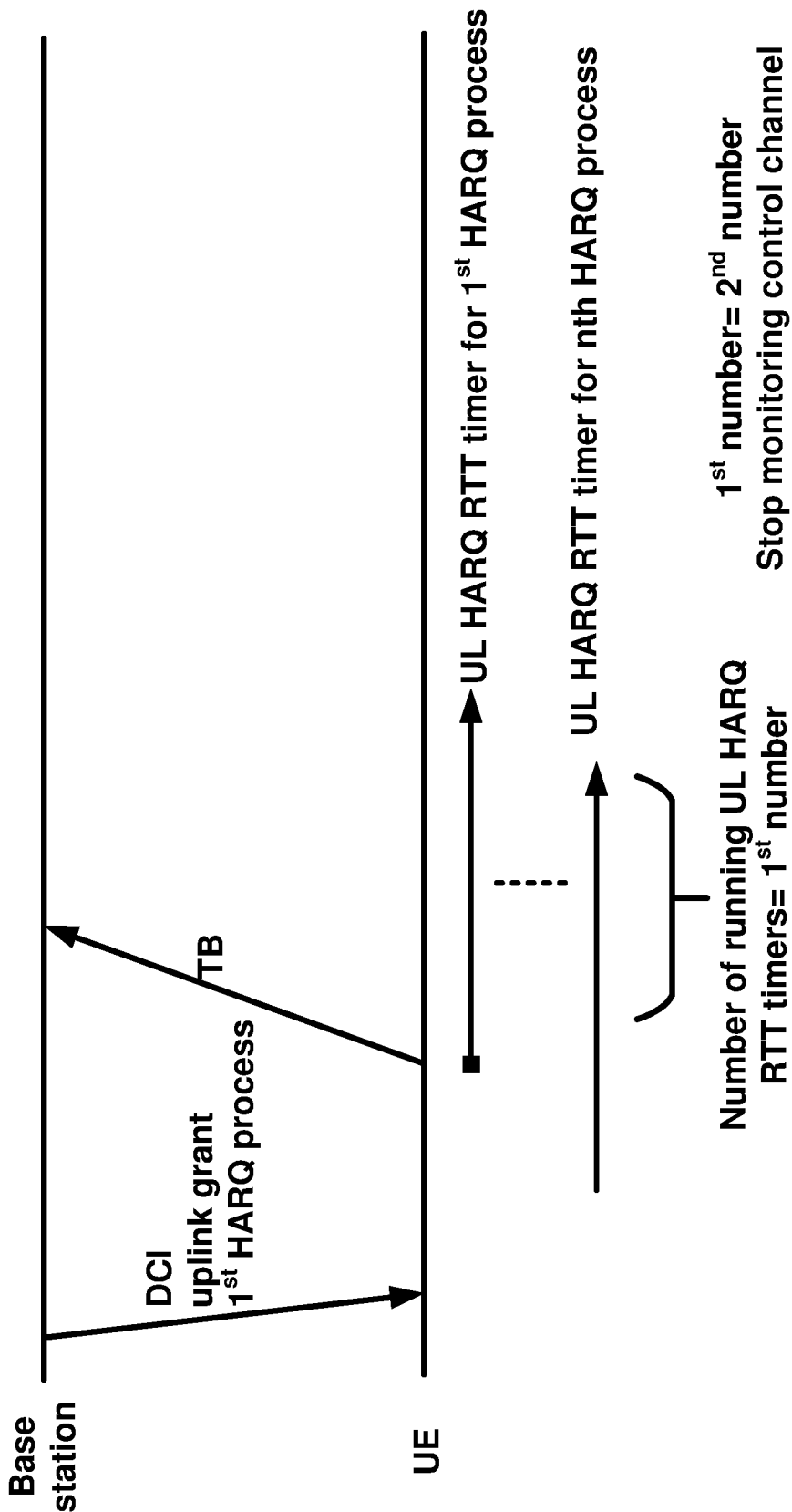
FIG. 23 is an example control channel monitoring as per an aspect of an embodiment of the present invention.

In an example embodiment and as shown in FIG. 23, a wireless device may receive an an uplink grant for transmission of a transport block associated with a first uplink hybrid automatic repeat request (HARQ) process of a cell. The wireless device may start an uplink HARQ round-trip-time timer of the first uplink HARQ process of the cell in response to transmitting the transport block, wherein the starting the uplink HARQ round-trip-time timer increases a number of running uplink HARQ round-trip-time timers of uplink HARQ processes of the cell to a first number. The wireless device may monitoring a control channel for the cell in response to the first number being equal to a second number. In an example, the wireless device nay receive one or more messages comprising configuration parameters of the cell, the one or more messages indicating one or more numerologies. In an example, the one or more messages may indicate the second number. In an example, the one or more messages may indicate a first radio network identifier and the stopping monitoring the control channel may comprise stopping monitoring the control channel for the first radio network temporary identifier. In an example, the uplink grant may be received via a downlink control channel associated with a first numerology and the transport block is transmitted via an uplink data channel associated with a second numerology. In an example, the first numerology may be different from the second numerology. In an example, the uplink grant may indicate the second numerology. In an example, a first symbol duration associated with the first numerology may be larger than a second symbol duration associated with the second numerology. In an example, the second number may be a maximum number of uplink HARQ processes of the cell. In an example, the uplink grant may indicate the first uplink HARQ process.

According to various embodiments, a device such as, for example, a wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 29 is an example flow diagram as per an aspect of an embodiment of the present disclosure. At 2910, a wireless device may receive one or more messages. The one or more messages may comprise: configuration parameters for a periodic resource allocation indicating a first plurality of uplink resources of an uplink data channel of a cell. The one or more messages may comprise one or more offset parameters for determining a number of uplink control information (UCI) resources. At 2920, the wireless device may receive a downlink control information. The downlink control information may comprise an uplink grant indicating uplink radio resources of the uplink data channel of the cell. The downlink control information may comprise an offset indicator value. At 2930, a first transport block and one or more first UCI may be transmitted via the uplink radio resources of the uplink data channel of the cell. The uplink radio resources may comprise first resources of the one or more first UCI. A first number of the first resources may be determined based on the offset indicator value. At 2940, a second transport block and one or more second UCI may be transmitted via one of the first plurality of uplink resources of the uplink data channel of the cell. The one of the first plurality of uplink resources may comprise second resources of the one or more second UCI. A second number of the second resources may be determined based on the one or more offset parameters.

According to an embodiment, the one or more first UCI may comprise one or more first hybrid automatic repeat request (HARQ) feedback information. According to an embodiment, the one or more second UCI may comprise one or more second HARQ feedback information. According to an embodiment, the one or more first HARQ feedback may be for one or more first downlink transmissions. The one or more second HARQ feedback may be for one or more second downlink transmissions. According to an embodiment, the one or more first downlink transmissions may correspond to one or more first downlink control information. The first transport block is transmitted in a first slot. One or more first parameters in the one or more first downlink control information may indicate transmission of the one or more first HARQ feedback in the first slot. According to an embodiment, the configuration parameters of the periodic resource allocation may comprise a periodicity parameter. The first plurality of uplink radio resources may be determined based on the periodicity. According to an embodiment, the one or more first UCI or the one or more second UCI may be multiplexed in the uplink data channel. According to an embodiment, the first plurality of uplink radio resources may correspond to a plurality of configured grants. According to an embodiment, the downlink control information may indicate a numerology of the uplink data channel. According to an embodiment, the one or more first UCI may be multiplexed in the uplink data channel by rate matching the uplink data channel. According to an embodiment, the one or more first UCI may be multiplexed in the uplink data channel by puncturing the uplink data channel. According to an embodiment, the one or more second UCI may be multiplexed in the uplink data channel by rate matching the uplink data channel. According to an embodiment, the one or more second UCI may be multiplexed in the uplink data channel by puncturing the uplink data channel. According to an embodiment, the first transport block may comprise data from one or more logical channels based on a numerology of the uplink data channel.

Figure 30:
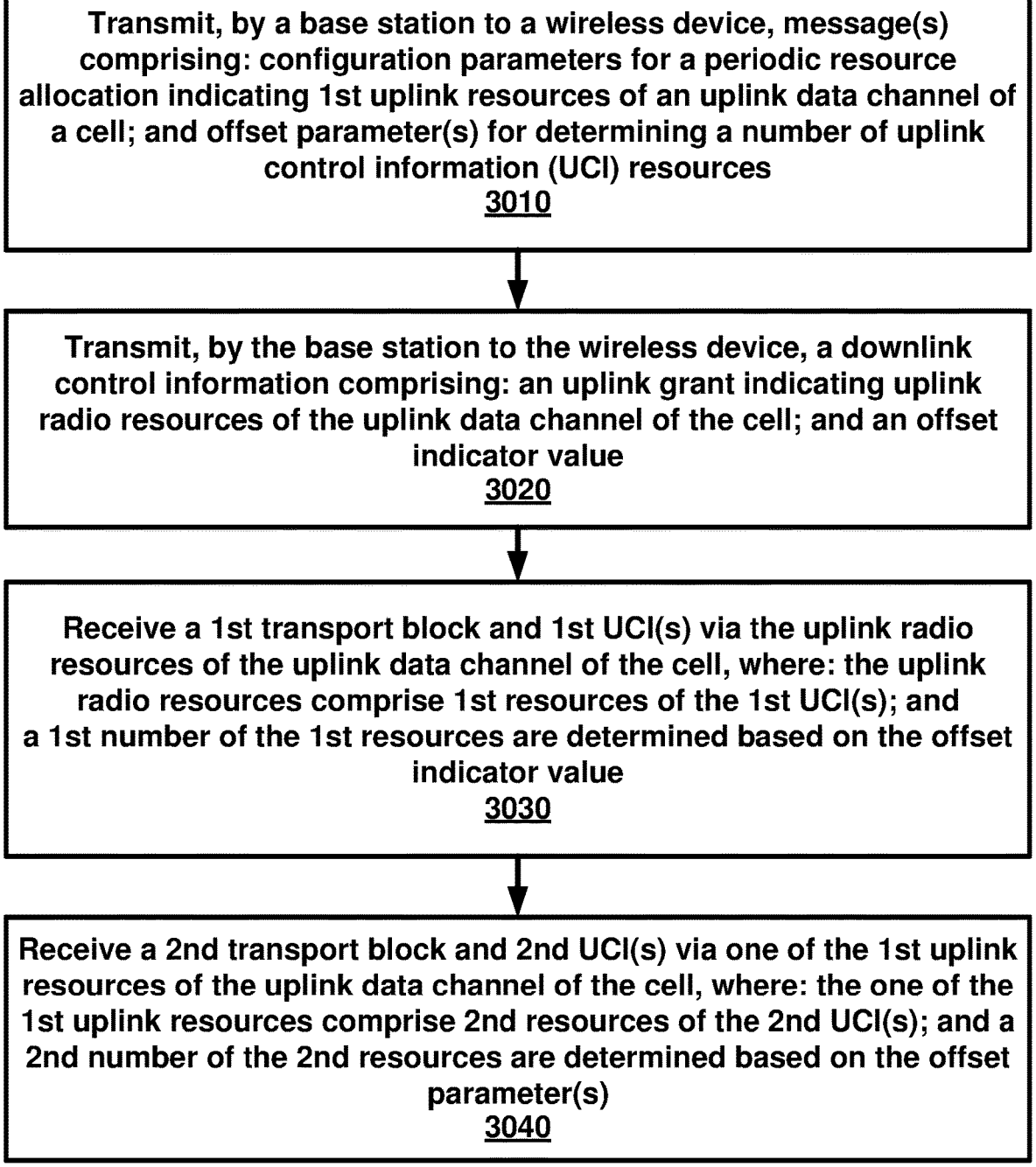
FIG. 30 is a flow diagram of an aspect of an embodiment of the present disclosure.

FIG. 30 is an example flow diagram as per an aspect of an embodiment of the present disclosure. At 3010, a base station may transmit to a wireless device, one or more messages. The one or more messages may comprise configuration parameters for a periodic resource allocation indicating a first plurality of uplink resources of an uplink data channel of a cell. The one or more messages may comprise one or more offset parameters for determining a number of uplink control information (UCI) resources. At 3020, the base station may transmit to the wireless device, downlink control information. The downlink control information may comprise an uplink grant indicating uplink radio resources of the uplink data channel of the cell. The downlink control information may comprise an offset indicator value. At 3030, a first transport block and one or more first UCI may be received via the uplink radio resources of the uplink data channel of the cell. The uplink radio resources may comprise first resources of the one or more first UCI. A first number of the first resources may be determined based on the offset indicator value. At 3040, a second transport block and one or more second UCI may be received via one of the first plurality of uplink resources of the uplink data channel of the cell. The one of the first plurality of uplink resources may comprise second resources of the one or more second UCI. A second number of the second resources may be determined based on the one or more offset parameters.

According to an embodiment, the one or more first UCI may comprise one or more first hybrid automatic repeat request (HARQ) feedback information. According to an embodiment, the one or more second UCI may comprise one or more second HARQ feedback information. According to an embodiment, the one or more first HARQ feedback may be for one or more first downlink transmissions. According to an embodiment, the one or more second HARQ feedback may be for one or more second downlink transmissions. According to an embodiment, the one or more first downlink transmissions may correspond to one or more first downlink control information. According to an embodiment, the first transport block may be transmitted in a first slot. According to an embodiment, one or more first parameters in the one or more first downlink control information may indicate transmission of the one or more first HARQ feedback in the first slot. According to an embodiment, the configuration parameters of the periodic resource allocation may comprise a periodicity parameter. According to an embodiment, the first plurality of uplink radio resources may be determined based on the periodicity. According to an embodiment, the one or more first UCI or the one or more second UCI may be multiplexed in the uplink data channel. According to an embodiment, the first plurality of uplink radio resources may correspond to a plurality of configured grants. According to an embodiment, the downlink control information may indicate a numerology of the uplink data channel. According to an embodiment, the one or more first UCI may be multiplexed in the uplink data channel by rate matching the uplink data channel. According to an embodiment, the one or more first UCI may be multiplexed in the uplink data channel by puncturing the uplink data channel. According to an embodiment, the one or more second UCI may be multiplexed in the uplink data channel by rate matching the uplink data channel. According to an embodiment, the one or more second UCI may be multiplexed in the uplink data channel by puncturing the uplink data channel. According to an embodiment, the first transport block may comprise data from one or more logical channels based on a numerology of the uplink data channel.

FIG. 31 is an example flow diagram as per an aspect of an embodiment of the present disclosure. At 3110, a wireless device may receive a radio resource control message. The radio resource control message may indicate a plurality of first uplink resources for a periodic resource allocation of an uplink data channel of a cell. The radio resource control message may indicate one or more offset parameters. At 3120, a downlink control information may be received. The downlink control information may indicate second uplink resources of the uplink data channel. The downlink control information may indicate an offset indicator value. At 3130, at least one second uplink control information (UCI) may be transmitted via second resources of the second uplink resources. A second number of the second resources may be determined based on the offset indicator value. At 3140, at least one first UCI may be transmitted via first resources of one of the plurality of first uplink resources. A first number of the first resources may be determined based on the one or more offset parameters. According to an embodiment, the at least one first UCI may comprise at least one first hybrid automatic repeat request feedback. The method of claim 53 or 54, wherein the at least one second UCI may comprise at least one second hybrid automatic repeat request feedback.

Figure 32:
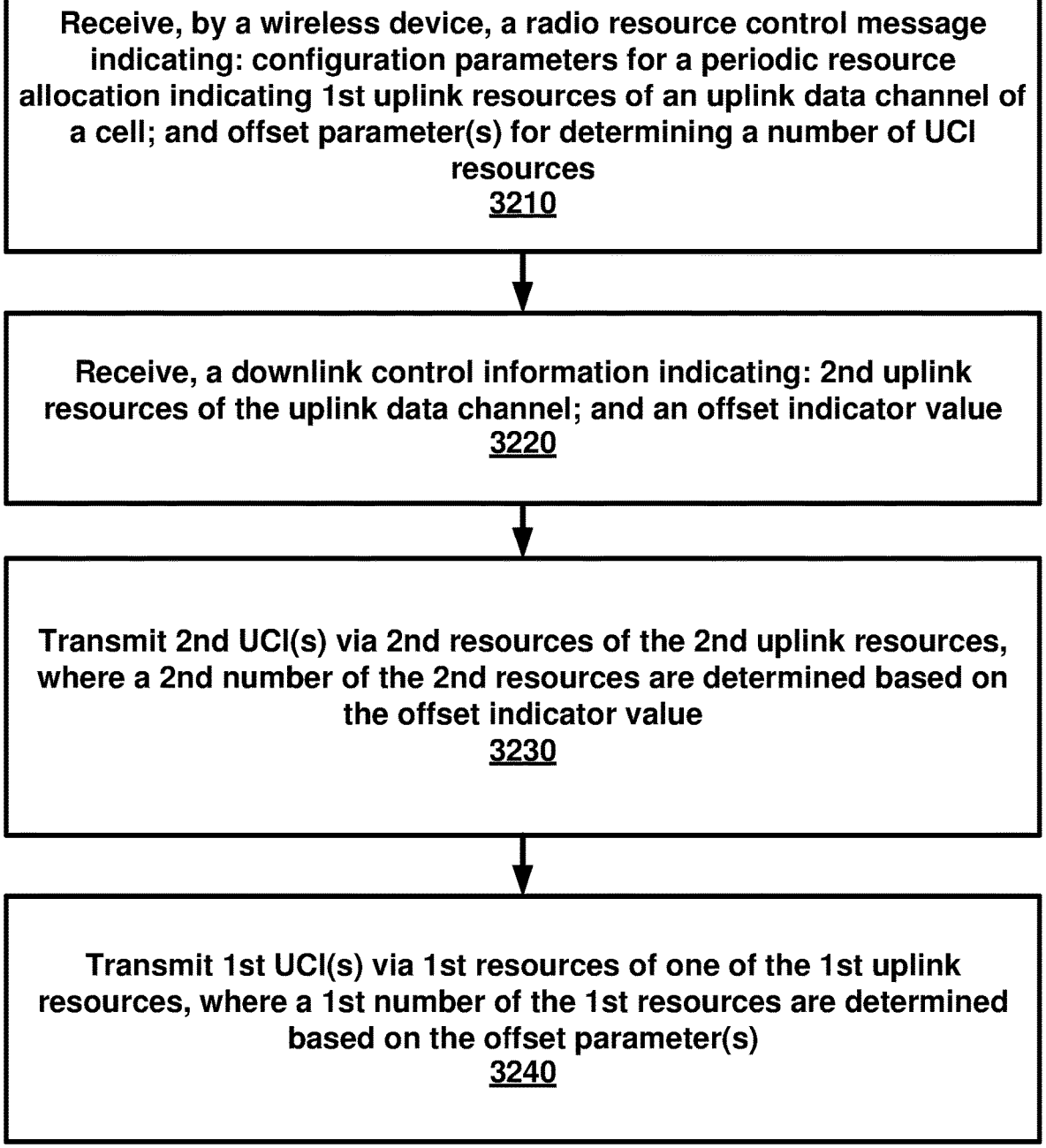
FIG. 32 is a flow diagram of an aspect of an embodiment of the present disclosure.

FIG. 32 is an example flow diagram as per an aspect of an embodiment of the present disclosure. At 3210, a wireless device may receive a radio resource control message. The radio resource control message may indicate configuration parameters for a periodic resource allocation indicating a first plurality of uplink resources of an uplink data channel of a cell. The radio resource control message may indicate one or more offset parameters for determining a number of uplink control information (UCI) resources. At 3220, a downlink control information may be received. The downlink control information may indicate second uplink resources of the uplink data channel. The downlink control information may indicate an offset indicator value. At 3230, at least one second uplink control information (UCI) may be transmitted via second resources of the second uplink resources. A second number of the second resources maybe determined based on the offset indicator value. At 3240, at least one first UCI may be transmitted via first resources of one of the plurality of first uplink resources. A first number of the first resources may be determined based on the one or more offset parameters. According to an embodiment, the at least one first UCI may comprise at least one first hybrid automatic repeat request feedback. According to an embodiment, the at least one second UCI may comprise at least one second hybrid automatic repeat request feedback.

FIG. 33 is an example flow diagram as per an aspect of an embodiment of the present disclosure. At 3310, a base station may transmit a radio resource control message. The radio resource control message may indicate a plurality of first uplink resources for a periodic resource allocation of an uplink data channel of a cell. The radio resource control message may indicate one or more offset parameters. At 3320, a downlink control information may be transmitted. The downlink control information may indicate second uplink resources of the uplink data channel. The downlink control information may indicate an offset indicator value. At 3330, at least one second uplink control information (UCI) may be received via second resources of the second uplink resources. A second number of the second resources may be determined based on the offset indicator value. At 3340, at least one first UCI may be received via first resources of one of the plurality of first uplink resources. A first number of the first resources may be determined based on the one or more offset parameters. According to an embodiment, the at least one first UCI may comprise at least one first hybrid automatic repeat request feedback. According to an embodiment, the at least one second UCI may comprise at least one second hybrid automatic repeat request feedback.

FIG. 34 is an example flow diagram as per an aspect of an embodiment of the present disclosure. At 3410, a base station may transmit a radio resource control message. The radio resource control message may indicate configuration parameters for a periodic resource allocation indicating a first plurality of uplink resources of an uplink data channel of a cell. The radio resource control message may indicate one or more offset parameters for determining a number of uplink control information (UCI) resources. At 3420, a downlink control information may be transmitted. The downlink control information may indicate second uplink resources of the uplink data channel. The downlink control information may indicate an offset indicator value. At 3430, at least one second uplink control information (UCI) may be received via second resources of the second uplink resources. A second number of the second resources may be determined based on the offset indicator value. At 3440, at least one first UCI may be received via first resources of one of the plurality of first uplink resources. A first number of the first resources may be determined based on the one or more offset parameters. According to an embodiment, the at least one first UCI may comprise at least one first hybrid automatic repeat request feedback. According to an embodiment, the at least one second UCI may comprise at least one second hybrid automatic repeat request feedback.

FIG. 35 is an example flow diagram as per an aspect of an embodiment of the present disclosure. At 3510, a wireless device may receive one or more messages. The one or more messages may comprise configuration parameters comprising a skipping parameter. At 3520, a downlink control information may be received. The downlink control information may indicate transmission parameters for transmission of a transport block via an uplink data channel. The downlink control information may indicate an offset indicator value for determining a number of resources of one or more uplink control information in the uplink data channel. At 3530, the skipping parameter may be ignored when the wireless device has no data for the transport block in response to the downlink control information comprising the offset indicator value. At 3540, the one or more uplink control information may be transmitted via the uplink data channel.

According to an embodiment, the skipping parameter may indicate skipping the transmission of the transport block when the wireless device has no data for the transport block. According to an embodiment, the one or more uplink control information may comprise one or more hybrid automatic repeat request feedback information. According to an embodiment, the ignoring the skipping parameter may comprise creating a medium access control packet. According to an embodiment, the one or more uplink control information may be transmitted by puncturing the uplink data channel. According to an embodiment, the one or more uplink control information may be transmitted by rate matching the uplink data channel. According to an embodiment, the one or more uplink control information may be multiplexed in the uplink data channel based on a multiplexing process based on a size of the uplink control information. According to an embodiment, the transmission parameters may indicate uplink radio resources for the transmission of the transport block. According to an embodiment, the downlink control information may indicate a numerology of the uplink data channel. According to an embodiment, the wireless device has no data in logical channels that can be transmitted via a transmission duration corresponding to the numerology. According to an embodiment, the one or more uplink control information may comprise one or more channel state information. According to an embodiment, a transmission time of the transport block may be based on the numerology of the uplink data channel.

Figure 36:
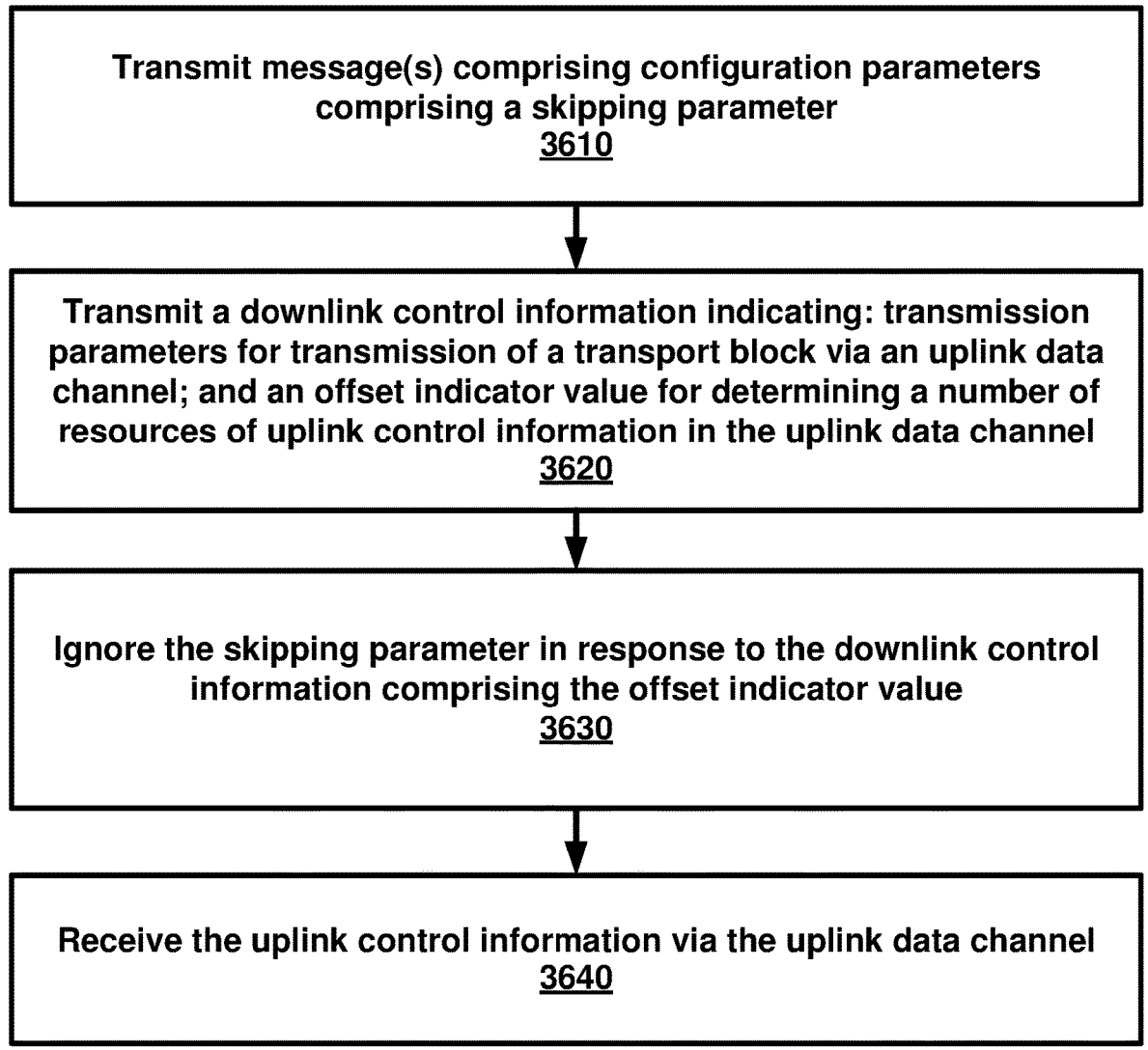
FIG. 36 is a flow diagram of an aspect of an embodiment of the present disclosure.

FIG. 36 is an example flow diagram as per an aspect of an embodiment of the present disclosure. At 3610, one or more messages may be transmitted by a base station to a wireless device. The one or more messages may comprise configuration parameters comprising a skipping parameter. At 3620, a downlink control information may be transmitted. The downlink control information may indicate transmission parameters for transmission of a transport block via an uplink data channel. The downlink control information may indicate an offset indicator value for determining a number of resources of one or more uplink control information in the uplink data channel. At 3630, the skipping parameter may be ignored in response to the downlink control information comprising the offset indicator value. At 3640, the one or more uplink control information may be received via the uplink data channel.

According to an embodiment, the skipping parameter may indicate skipping the transmission of the transport block when the wireless device has no data for the transport block. According to an embodiment, the one or more uplink control information may comprise one or more hybrid automatic repeat request feedback information. According to an embodiment, the ignoring the skipping parameter may comprise receiving a medium access control packet. According to an embodiment, the uplink data channel may be punctured by the one or more uplink control information. According to an embodiment, the uplink data channel may be rate matched by the one or more uplink control information. According to an embodiment, the one or more uplink control information may be multiplexed in the uplink data channel based on a multiplexing process based on a size of the uplink control information. According to an embodiment, the transmission parameters may indicate uplink radio resources for the transmission of the transport block. According to an embodiment, the downlink control information may indicate a numerology of the uplink data channel. According to an embodiment, the wireless device has no data in logical channels that can be transmitted via a transmission duration corresponding to the numerology. According to an embodiment, the one or more uplink control information may comprise one or more channel state information. According to an embodiment, a reception time of the transport block may be based on the numerology of the uplink data channel.

Figure 37:
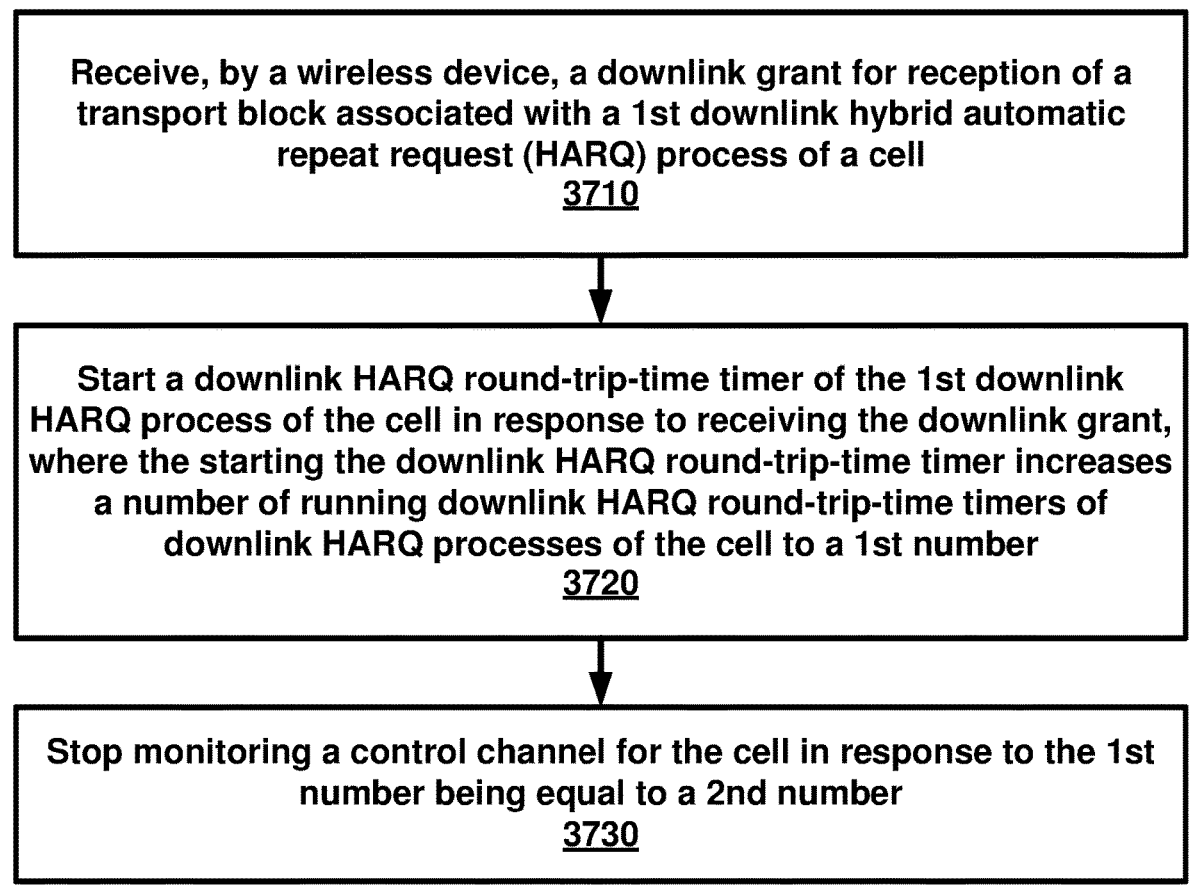
FIG. 37 is a flow diagram of an aspect of an embodiment of the present disclosure.

FIG. 37 is an example flow diagram as per an aspect of an embodiment of the present disclosure. At 3710, a wireless device may receive a downlink grant for reception of a transport block associated with a first downlink hybrid automatic repeat request (HARQ) process of a cell. At 3720, a downlink HARQ round-trip-time timer of the first downlink HARQ process of the cell may be started in response to receiving the downlink grant. The starting of the the downlink HARQ round-trip-time timer may increase a number of running downlink HARQ round-trip-time timers of downlink HARQ processes of the cell to a first number. At 3730, the wireless device may stop monitoring a control channel for the cell in response to the first number being equal to a second number.

According to an embodiment, one or more messages comprising configuration parameters of the cell may be received. The one or more messages may indicate one or more numerologies. According to an embodiment, the one or more messages may indicate the second number. According to an embodiment, the one or more messages may indicate a first radio network identifier. According to an embodiment, the stopping monitoring the control channel may comprise stopping monitoring the control channel for the first radio network temporary identifier. According to an embodiment, the downlink control grant may be received via a downlink control channel associated with a first numerology. According to an embodiment, the transport block may be received via a downlink data channel associated with a second numerology. According to an embodiment, the first numerology may be different from the second numerology. According to an embodiment, the downlink grant may indicate the second numerology. According to an embodiment, a first symbol duration associated with the first numerology may be larger than a second symbol duration associated with the second numerology. According to an embodiment, the second number may be a maximum number of downlink HARQ processes of the cell. According to an embodiment, the downlink grant may indicate the first downlink HARQ process.

FIG. 38 is an example flow diagram as per an aspect of an embodiment of the present disclosure. At 3810, a wireless device may receive an uplink grant for transmission of a transport block associated with a first uplink hybrid automatic repeat request (HARQ) process of a cell. At 3820, an uplink HARQ round-trip-time timer of the first uplink HARQ process of the cell may be started in response to transmitting the transport block. The starting the uplink HARQ round-trip-time timer may increase a number of running uplink HARQ round-trip-time timers of uplink HARQ processes of the cell to a first number. At 3830, the wireless device may stop monitoring a control channel for the cell in response to the first number being equal to a second number.

According to an embodiment, one or more messages may be received. The one or more messages may comprise configuration parameters of the cell. The one or more messages may indicate one or more numerologies. According to an embodiment, the one or more messages may indicate the second number. According to an embodiment, the one or more messages may indicate a first radio network identifier. According to an embodiment, the stopping monitoring the control channel may comprise stopping monitoring the control channel for the first radio network temporary identifier. According to an embodiment, the uplink grant may be received via a downlink control channel associated with a first numerology. According to an embodiment, the transport block may be transmitted via an uplink data channel associated with a second numerology. According to an embodiment, the first numerology may be different from the second numerology. According to an embodiment, the uplink grant may indicate the second numerology. According to an embodiment, a first symbol duration associated with the first numerology may be larger than a second symbol duration associated with the second numerology. According to an embodiment, the second number may be a maximum number of uplink HARQ processes of the cell. According to an embodiment, the uplink grant may indicate the first uplink HARQ process.

FIG. 39 is an example flow diagram as per an aspect of an embodiment of the present disclosure. At 3910, a wireless device may receive one or more messages. The one or more messages may comprise configuration parameters of one or more logical channels. At 3920, a multiplexing process for transmitting uplink control information may be selected via an uplink channel employed for transmission of a transport block. The transport block may comprise data of the one or more logical channels. The selecting may be based on the configuration parameters of the one or more logical channels. At 3930, the uplink control information may be multiplexed in the uplink channel employing the multiplexing process. At 3940, the transport block and the uplink control information may be transmitted via the uplink channel.

According to an embodiment, the one or more logical channels may correspond to one or more service types. According to an embodiment, the one or more service types may comprise ultra-reliable low-latency communications. According to an embodiment, a downlink control information may be received. The downlink control information may indicate transmission parameters of the transport block. According to an embodiment, the downlink control information may indicate a numerology of the uplink channel. According to an embodiment, the configuration parameters of the one or more logical channels may indicate that data of the one or more logical channels can be transmitted via a transmission duration corresponding to the numerology. According to an embodiment, the downlink control information may indicate a time domain resource assignment. According to an embodiment, a transmission time of the transport block may be based on the time domain resource assignment and a numerology of the uplink channel. According to an embodiment, the multiplexing process may be selected from a plurality of multiplexing processes comprising: a rate matching of the uplink channel; and a puncturing of the uplink channel. According to an embodiment, the configuration parameters of the one or more logical channels may indicate one or more first transmission durations. According to an embodiment, data of the one or more logical channels may be transmitted employing uplink grants that result in a transmission duration shorter than or equal to the one or more first transmission durations. According to an embodiment, the configuration parameters of the one or more logical channels may comprise one or more logical channel identifiers. According to an embodiment, the configuration parameters of the one or more logical channels may indicate one or more priorities. According to an embodiment, the uplink control information may comprise one or more hybrid automatic repeat request feedback.

FIG. 40 is an example flow diagram as per an aspect of an embodiment of the present disclosure. At 4010, a wireless device may receive a downlink control information for transmission of a transport block via an uplink data channel. The downlink control information may indicate a first numerology of the uplink data channel. At 4020, the wireless device may select, based on the first numerology, a multiplexing process for transmitting uplink control information via the uplink data channel employed for transmission of the transport block. At 4030, the uplink control information may be multiplexed in the uplink data channel employing the multiplexing process. At 4040, the transport block and the uplink control information may be transmitted via the uplink data channel.

According to an embodiment, the multiplexing process may be based on a first transmission time interval corresponding to the first numerology. According to an embodiment, the multiplexing process may be based on one or more logical channels that can be transmitted employing uplink grants that result in a transmission duration that may be smaller than or equal to the first transmission duration. According to an embodiment, the multiplexing process may be based on whether the one or more logical channels may correspond to a first service type. According to an embodiment, the first service type may be ultra-reliable low-latency communications. According to an embodiment, the multiplexing process may be selected from a plurality of multiplexing processes comprising: a rate matching of the uplink data channel; and a puncturing of the uplink data channel. According to an embodiment, configuration parameters of a plurality of logical channels may be received. The transport block may comprise data of one or more logical channels in the plurality of logical channels based on the first numerology.

FIG. 41 is an example flow diagram as per an aspect of an embodiment of the present disclosure. At 4110, a base station may transmit a downlink control information for transmission of a transport block via an uplink data channel. The downlink control information may indicate a first numerology of the uplink data channel. At 4120, the transport block and uplink control information may be received via the uplink data channel. The uplink control information may be multiplexed in the uplink data channel based on a multiplexing process. The multiplexing process may be selected based on the first numerology.

According to an embodiment, the multiplexing process may be based on a first transmission time interval corresponding to the first numerology. According to an embodiment, the multiplexing process may be based on one or more logical channels that can be transmitted employing uplink grants that result in a transmission duration that may be smaller than or equal to the first transmission duration. According to an embodiment, the multiplexing process may be based on whether the one or more logical channels may correspond to a first service type. According to an embodiment, the first service type may be ultra-reliable low-latency communications. According to an embodiment, the multiplexing process may be selected from a plurality of multiplexing processes comprising: a rate matching of the uplink data channel; and a puncturing of the uplink data channel. According to an embodiment, configuration parameters of a plurality of logical channels may be transmitted. The transport block may comprise data of one or more logical channels in the plurality of logical channels based on the first numerology.

Figure 42:
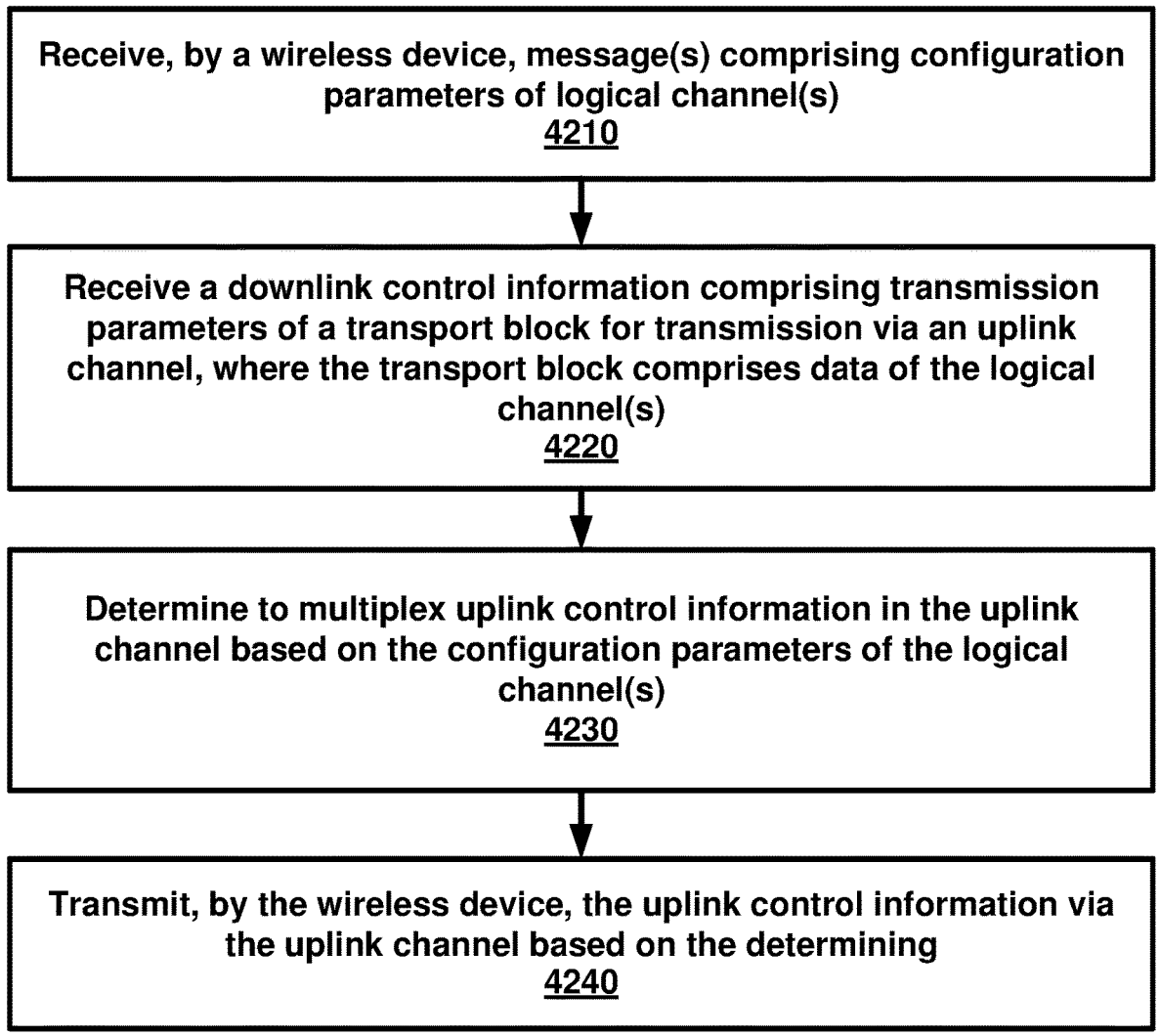
FIG. 42 is a flow diagram of an aspect of an embodiment of the present disclosure.

FIG. 42 is an example flow diagram as per an aspect of an embodiment of the present disclosure. At 4210, a wireless device may receive one or more messages. The one or more messages may comprise configuration parameters of one or more logical channels. At 4220, a downlink control information may be received. The downlink control information may comprise transmission parameters of a transport block for transmission via an uplink channel. The transport block may comprise data of the one or more logical channels. At 4230, it may be determined to multiplex uplink control information in the uplink channel based on the configuration parameters of the one or more logical channels. At 4240, the wireless device may transmit the uplink control information via the uplink channel based on the determining.

According to an embodiment, the downlink control information may indicate a numerology. According to an embodiment, the configuration parameters of the one or more logical channels may indicate one or more transmission durations. According to an embodiment, a transmission duration corresponding to the numerology may be shorter than or equal to the one or more transmission durations. According to an embodiment, the uplink control information may be multiplexed by one of: puncturing the uplink channel; or rate matching the uplink channel. According to an embodiment, the downlink control information may indicate a time domain resource assignment. According to an embodiment, a transmission time of the transport block may be based on the time domain resource assignment and a numerology of the uplink channel. According to an embodiment, the transmission parameters may indicate uplink radio resources for transmission of the transport block. According to an embodiment, the configuration parameters of the one or more logical channels may comprise one or more logical channel identifiers. According to an embodiment, the configuration parameters of the one or more logical channels may indicate one or more priorities. According to an embodiment, the one or more logical channels may correspond to one or more service types comprising ultra-reliable low-latency communications. According to an embodiment, the uplink control information may comprise hybrid automatic repeat request feedback. According to an embodiment, the determining may be based on whether the one or more logical channels may comprise one or more first logical channels.

FIG. 43 is an example flow diagram as per an aspect of an embodiment of the present disclosure. At 4310, a wireless device may rceive a downlink control information for transmission of a transport block via an uplink data channel. The downlink control information may indicate a first numerology of the uplink data channel. At 4320, it may be determined to multiplex uplink control information in the uplink data channel based on the first numerology. At 4330, the wireless device may transmit the uplink control information via the uplink data channel based on the determining.

According to an embodiment, the determining may be based on a first transmission time interval corresponding to the first numerology. According to an embodiment, the determining may be based on one or more logical channels that can be transmitted employing uplink grants that result in a transmission duration that may be smaller than or equal to the first transmission duration. According to an embodiment, the determining may be based on whether the one or more logical channels may correspond to a first service type. According to an embodiment, the first service type may be ultra-reliable low-latency communications. According to an embodiment, the uplink control information may be multiplexed in the uplink data channel based on a multiplexing process in a plurality of multiplexing processes comprising: a rate matching of the uplink data channel; and a puncturing of the uplink data channel. According to an embodiment, configuration parameters of a plurality of logical channels may be received. The transport block may comprise data of one or more logical channels in the plurality of logical channels based on the first numerology.

FIG. 44 is an example flow diagram as per an aspect of an embodiment of the present disclosure. At 4410, a base station may transmit a downlink control information for transmission of a transport block via an uplink data channel. The downlink control information may indicate a first numerology of the uplink data channel. At 4420, it may be determined that uplink control information may be multiplexed in the uplink data channel based on the first numerology. At 4430, the base station may receive the uplink control information via the uplink data channel based on the determining.

According to an embodiment, the determining may be based on a first transmission time interval corresponding to the first numerology. According to an embodiment, the determining may be based on one or more logical channels that can be transmitted employing uplink grants that result in a transmission duration that may be smaller than or equal to the first transmission duration. According to an embodiment, the determining may be based on whether the one or more logical channels may correspond to a first service type. According to an embodiment, the first service type may be ultra-reliable low-latency communications. According to an embodiment, the uplink control information may be multiplexed in the uplink data channel based on a multiplexing process in a plurality of multiplexing processes comprising: a rate matching of the uplink data channel; and a puncturing of the uplink data channel. According to an embodiment, configuration parameters of a plurality of logical channels may be transmitted. The transport block may comprise data of one or more logical channels in the plurality of logical channels based on the first numerology.

Figure 45:
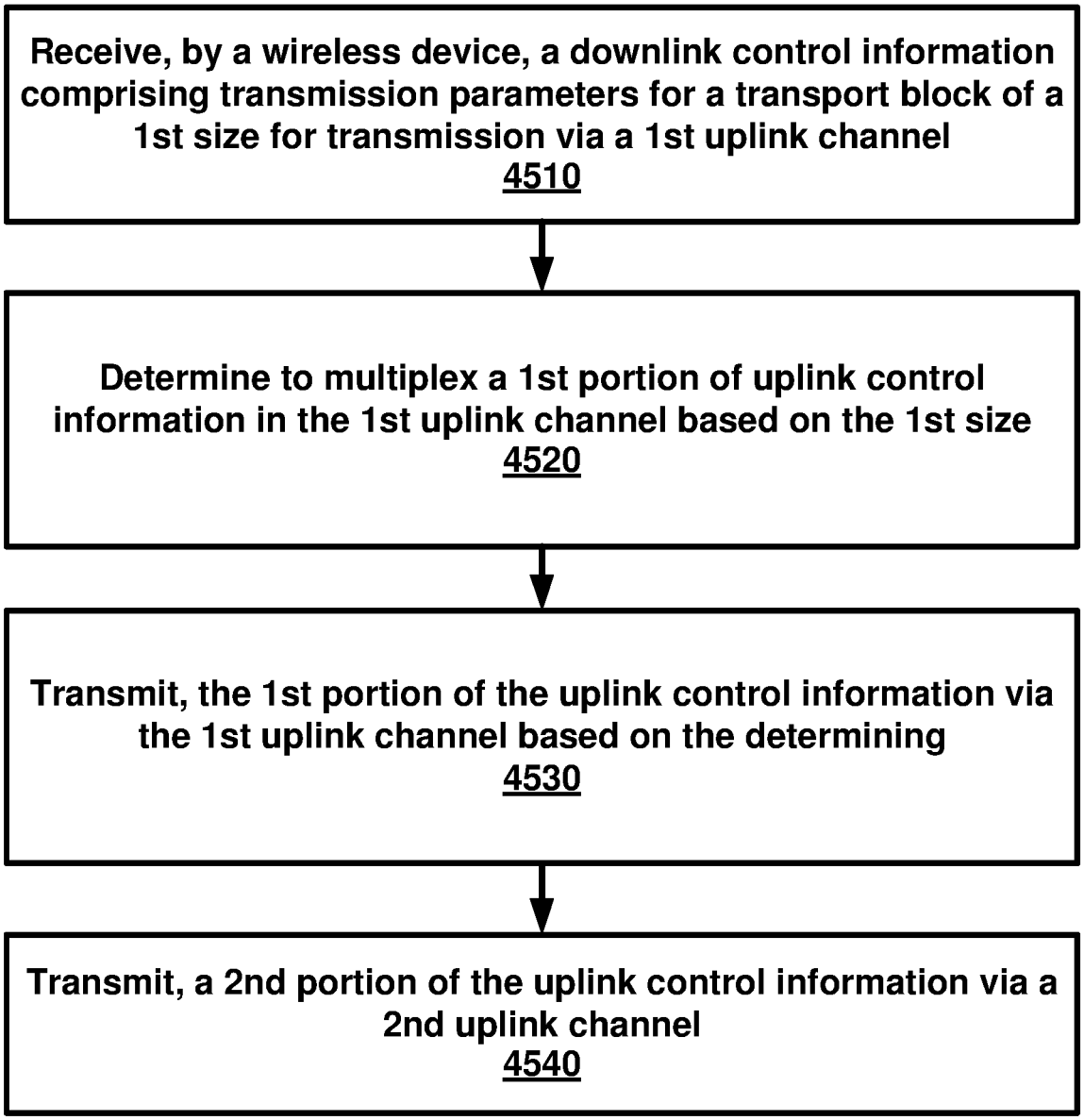
FIG. 45 is a flow diagram of an aspect of an embodiment of the present disclosure.

FIG. 45 is an example flow diagram as per an aspect of an embodiment of the present disclosure. At 4510, a wireless device may receive a downlink control information. The downlink control information may comprise transmission parameters for a transport block of a first size for transmission via a first uplink channel. At 4520, it may be determined to multiplex a first portion of uplink control information in the first uplink channel based on the first size. At 4530, the first portion of the uplink control information may be transmitted via the first uplink channel based on the determining. At 4540, a second portion of the uplink control information may be transmitted via a second uplink channel.

According to an embodiment, the second uplink channel may be an uplink control channel. According to an embodiment, the second uplink channel may be an uplink data channel. According to an embodiment, the first portion of the uplink control information may be multiplexed in the first uplink channel by one of a plurality of multiplexing processes comprising: puncturing the first uplink channel; or rate matching the first uplink channel. According to an embodiment, receiving one or more configuration parameters may be received. The one or more configuration parameters may indicate simultaneous transmission on the first uplink channel and the second uplink channel. According to an embodiment, the second portion of the uplink control information may be a remaining portion of the uplink control information. According to an embodiment, the downlink control information may indicate a numerology of the first uplink channel. According to an embodiment, the transport block may comprise data of one or more logical channels based on configuration parameters of the one or more logical channels and the numerology. According to an embodiment, the downlink control information may indicate a time domain resource assignment. According to an embodiment, a transmission time of the transport block may be based on the time domain resource assignment and a numerology of the first uplink channel. According to an embodiment, the transmission parameters may indicate uplink radio resources for transmission of the transport block. According to an embodiment, the uplink control information may comprise hybrid automatic repeat request feedback information.

Figure 46:
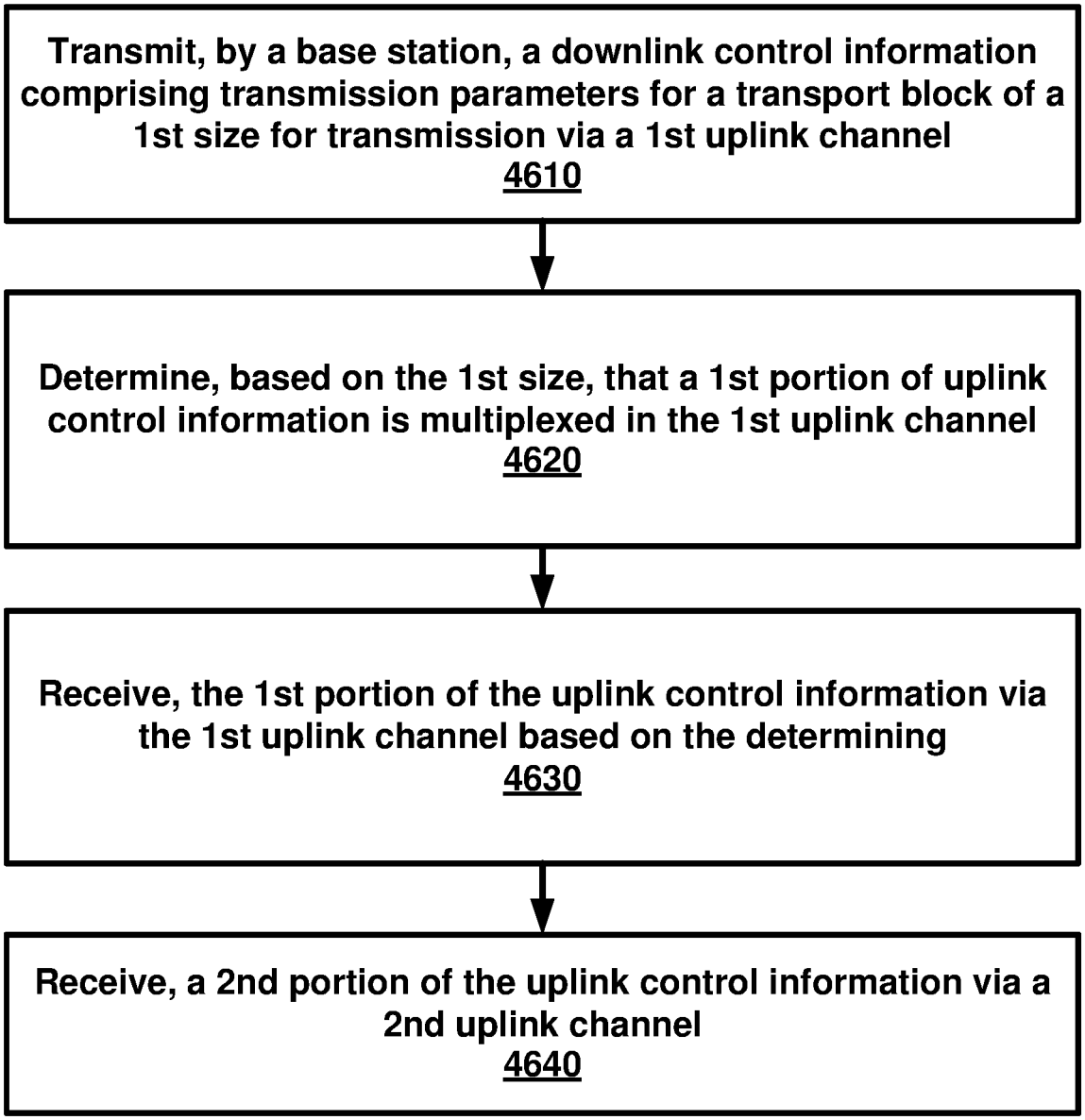
FIG. 46 is a flow diagram of an aspect of an embodiment of the present disclosure.

FIG. 46 is an example flow diagram as per an aspect of an embodiment of the present disclosure. At 4610, a base station may transmit a downlink control information. The downlink control information may comprise transmission parameters for a transport block of a first size for transmission via a first uplink channel. At 4620, it may be determined, based on the first size, that a first portion of uplink control information may be multiplexed in the first uplink channel. At 4630, the first portion of the uplink control information may be received via the first uplink channel based on the determining. At 4640, a second portion of the uplink control information may be received via a second uplink channel.

According to an embodiment, the second uplink channel may be an uplink control channel. According to an embodiment, the second uplink channel may be an uplink data channel. According to an embodiment, the first portion of the uplink control information may be multiplexed in the first uplink channel by one of a plurality of multiplexing processes comprising: puncturing the first uplink channel; or rate matching the first uplink channel. According to an embodiment, one or more configuration parameters may be transmitted. The one or more configuration parameters may indicate simultaneous transmission on the first uplink channel and the second uplink channel. According to an embodiment, the second portion of the uplink control information may be a remaining portion of the uplink control information. According to an embodiment, the downlink control information may indicate a numerology of the first uplink channel. According to an embodiment, the transport block may comprise data of one or more logical channels based on configuration parameters of the one or more logical channels and the numerology. According to an embodiment, the downlink control information may indicate a time domain resource assignment. According to an embodiment, a reception time of the transport block may be based on the time domain resource assignment and a numerology of the first uplink channel. According to an embodiment, the transmission parameters may indicate uplink radio resources for transmission of the transport block. According to an embodiment, the uplink control information may comprise hybrid automatic repeat request feedback information.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:
1. A wireless device comprising:
one or more processors; and
memory storing instructions that, when executed by the one or more processors, cause the wireless device to:
receive one or more radio resource control messages, wherein the one or more radio resource control messages indicate first uplink resources, of an uplink data channel, for a periodic resource allocation; the one or more radio resource control messages further indicate a first offset parameter for uplink control information (UCI) transmission via the periodic resource allocation; and the one or more radio resource control messages further indicate a plurality of second offset parameters for UCI transmission via a dynamic uplink grant;

determine a number of the first uplink resources based on the first offset parameter;

transmit a first UCI via the first uplink resources;

receive a downlink control information, wherein the downlink control information comprises the dynamic uplink grant indicating second uplink resources of the uplink data channel; and the downlink control information further comprises an offset indicator field indicating one of the plurality of second offset parameters indicated by the one or more radio resource control messages; the one of the plurality of second offset parameters is configured for determining a number of the second uplink resources for multiplexing a second UCI;

determine the number of the second uplink resources for multiplexing the second UCI based on the offset indicator field; and transmit the second UCI via the second uplink resources.

2. The wireless device of claim 1, wherein:

the one or more radio resource control messages further indicate a periodicity parameter for the periodic resource allocation; and the first uplink resources are determined based on the periodicity parameter.

3. The wireless device of claim 1, wherein:

the first UCI comprises one or more first hybrid automatic repeat request (HARQ) feedback information; and the second UCI comprises one or more second HARQ feedback information.

4. The wireless device of claim 1, wherein the first UCI or the second UCI are multiplexed in the uplink data channel.

5. The wireless device of claim 1, wherein the first uplink resources correspond to a plurality of configured grants.

6. The wireless device of claim 1, wherein the downlink control information indicates a numerology of the uplink data channel.

7. The wireless device of claim 1, wherein the first UCI are multiplexed in the uplink data channel by rate matching the uplink data channel.

8. The wireless device of claim 1, wherein the first UCI are multiplexed in the uplink data channel by puncturing the uplink data channel.

9. The wireless device of claim 1, wherein the second UCI are multiplexed in the uplink data channel by rate matching the uplink data channel.

10. A system comprising:

a base station comprising:

one or more first processors; and first memory storing first instructions that, when executed by the one or more first processors, cause the base station to transmit one or more radio resource control messages, wherein the one or more radio resource control messages indicate first uplink resources, of an uplink data channel, for a periodic resource allocation; the one or more radio resource control messages further indicate a first offset parameter for uplink control information (UCI) transmission via the periodic resource allocation; and the one or more radio resource control messages further indicate a plurality of second offset parameters for UCI transmission via a dynamic uplink grant; and a wireless device comprising:

one or more second processors; and second memory storing second instructions that, when executed by the one or more second processors, cause the wireless device to:

receive the one or more radio resource control messages;

determine a number of the first uplink resources based on the first offset parameter;

transmit a first UCI via the first uplink resources;

receive a downlink control information, wherein the downlink control information comprises the dynamic uplink grant indicating second uplink resources of the uplink data channel; and the downlink control information further comprises an offset indicator field indicating one of the plurality of second offset parameters indicated by the one or more radio resource control messages; the one of the plurality of second offset parameters is configured determining a number of the second uplink resources for multiplexing a second UCI;

determine the number of the second uplink resources for multiplexing the second UCI based on the offset indicator field; and transmit the second UCI via the second uplink resources.

11. The wireless device of claim 1, wherein the second UCI are multiplexed in the uplink data channel by puncturing the uplink data channel.

12. The wireless device of claim 2, wherein the first UCI or the second UCI are multiplexed in the uplink data channel.

13. The wireless device of claim 2, wherein the first uplink resources correspond to a plurality of configured grants.

14. The wireless device of claim 2, wherein the downlink control information indicates a numerology of the uplink data channel.

15. The wireless device of claim 2, wherein:

the first UCI comprises one or more first HARQ feedback information; and the second UCI comprises one or more second HARQ feedback information.

16. The wireless device of claim 3, wherein:

the one or more first HARQ feedback information are for one or more first downlink transmissions; and the one or more second HARQ feedback information are for one or more second downlink transmissions.

17. The wireless device of claim 6, wherein a first transport block is transmitted via the second uplink resources and comprises data from one or more logical channels based on the numerology.

18. The wireless device of claim 17, wherein the first transport block comprises data from one or more logical channels based on the numerology.

19. The wireless device of claim 15, wherein:

the one or more first HARQ feedback information are for one or more first downlink transmissions; and the one or more second HARQ feedback information are for one or more second downlink transmissions.

20. The wireless device of claim 16, wherein:

the one or more first downlink transmissions correspond to one or more first downlink control information;

a first transport block is transmitted via the second uplink resources in a first slot; and one or more first parameters in the one or more first downlink control information indicate transmission of the one or more first HARQ feedback information in the first slot.

* * * * *